United States Patent [19]

Midgely et al.

[11] Patent Number: 5,592,611
[45] Date of Patent: Jan. 7, 1997

[54] STAND-IN COMPUTER SERVER

[75] Inventors: Christopher W. Midgely, Framingham; John W. Webb, Sutton; John L. Acott, Westborough, all of Mass.

[73] Assignee: Network Integrity, Inc., Marlborough, Mass.

[21] Appl. No.: 403,307

[22] Filed: Mar. 14, 1995

[51] Int. Cl.⁶ ..................................... G06F 11/34
[52] U.S. Cl. ........................ 395/182.02; 379/221
[58] Field of Search .................. 395/181, 182.01, 395/182.02, 182.05, 180; 379/220, 219, 221; 364/242.94, 242.95, 284.4, 927.96, 940.62, 940.64

[56] References Cited

U.S. PATENT DOCUMENTS

| | | | |
|---|---|---|---|
| 4,800,488 | 1/1989 | Agrawal et al. | 364/200 |
| 5,005,122 | 4/1991 | Griffin et al. | 364/200 |
| 5,185,693 | 2/1993 | Loftis et al. | 364/187 |
| 5,227,778 | 7/1993 | Vacon et al. | 370/94.1 |
| 5,325,527 | 6/1994 | Cwikowski et al. | 395/200 |
| 5,341,477 | 8/1994 | Pitkin et al. | 395/200 |
| 5,396,613 | 3/1995 | Hollaar | 395/181 |
| 5,408,619 | 4/1995 | Oran | 395/325 |
| 5,410,543 | 4/1995 | Seitz et al. | 370/85.13 |
| 5,418,945 | 5/1995 | Carter et al. | 395/725 |
| 5,459,837 | 10/1995 | Caccavale | 395/200.01 |

FOREIGN PATENT DOCUMENTS

| | | |
|---|---|---|
| WO94/17473 | 8/1994 | WIPO . |
| WO94/17474 | 8/1994 | WIPO . |

OTHER PUBLICATIONS

White Paper, "St. Bernard Software Open File Manager", Mar. 7, 1995.

*Primary Examiner*—Robert W. Beausoliel, Jr.
*Assistant Examiner*—Albert Décady
*Attorney, Agent, or Firm*—Fish & Richardson P.C.

[57] ABSTRACT

An Integrity Server computer for economically providing a stand-in computer, replacing a failed server of a network. The invention provides methods for re-establishing connections between clients and servers, and communicating packets between network nodes, to allow the Integrity Server to stand-in for a failed server without requiring reconfiguration of the network clients when a server fails. In one method, the Integrity Server publishes the name of the failed server, in addition to its normal name, when the failed server becomes inaccessible. In a second method, a first channel accepts network packets addressed to the failed server, and forwards them to a second channel for service.

17 Claims, 4 Drawing Sheets

Microfiche Appendix Included
(2829 Microfiche, 58 Pages)

| NCP description | NCP number | Server name/info | Volume name/number | File pathname | Extended Attributes | NDS information |
|---|---|---|---|---|---|---|
| Alloc Permanent Directory Handle | 22 18 | | X | X | | |
| Alloc Temporary Directory Handle | 22 19 | | X | X | | |
| Convert Path to Dir Entry | 23 244 | | X | X | | |
| Create File 510 | 67 | | X 512 | X 514 | | |
| Create New File | 77 | | X | X | | |
| Deallocate Directory Handle | 22 10 | | | | | |
| Duplicate Extended Attributes 520 | 86 05 | | X 522 | X 524 | X 526 | |
| Enumerate Extended Attribute | 86 04 | | X | X | X | |
| Get Effective Directory Rights | 87 29 | | X | X | | |
| Get Directory Information | 22 45 | | X | | | |
| Get Directory Path | 22 01 | | X | X | | |
| Get File Server Information | 23 17 | X | | | | |
| Ping NDS 530 | 104 | | | | | X 522 |
| Read Extended Attribute | 86 03 | | X | X | X | |
| Set File Attributes | 70 | | X | X | | |
| Set File Extended Attribute | 79 | | X | X | X | |

FIG. 3

STAND-IN COMPUTER SERVER

REFERENCE TO PACKET TRACE APPENDIX

This application contains Appendix A and Appendix B. Appendices A and B are each arranged into two columns. The left column is a trace of packets exchanged in a network with all servers operational, and the right column juxtaposes the corresponding packets exchanged in a network with an Integrity Server standing-in for a failed server.

REFERENCE TO MICROFICHE APPENDIX

A microfiche appendix is attached to this application. The appendix, which includes a source code listing of an embodiment of the invention, includes 2,829 frames on 58 microfiche.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The invention relates to computer fault recovery.

When a server in a computer network fails, it is known to continue to operate the network in a degraded mode.

It is also known to provide a replacement server, for instance when a server has suffered a failure that cannot be repaired. In such replacement, the software environment of the failed server is recreated, by copying the software of the failed server (and, for instance, to restore a backup of the files from the failed file server) to the replacement server, and to reboot the replacement server under the name of the failed server.

SUMMARY OF THE INVENTION

The invention provides methods for quickly providing a stand-in for a failed server; the stand-in provides the services of the failed server. The invention uses conventional hardware, rather than custom-engineered (and therefore expensive) fault-tolerant hardware, and begins to offer its stand-in services very quickly.

In general, in a first aspect, the invention features a method for providing the services of a network server node to client nodes when the server node is unavailable. In the method, a stand-in server node publishes as a second name the name of the unavailable server node, and client nodes request services from the stand-in server node by requesting services by the name of the unavailable server node.

In a second aspect, the invention features a method for a stand-in server to transparently service requests from the clients of an unavailable server node. A connection is established between a client node and a stand-in server node, by the client node requesting a connection to a primary server node other than the stand-in server, and the stand-in server responds to the client's connection request representing itself as able to provide the services of the unavailable server. A first request message is transmitted from the client node to the stand-in server requesting a service of the unavailable server. The first request message is received at a forwarding channel of the stand-in server, and a second request message is generated from the forwarding channel to a service channel of the stand-in server. The second request message is serviced at the service channel, which is configured to provide all services of the unavailable server. A first response message is generated, addressed to the forwarding channel. At the forwarding channel, a second response message is generated addressed to the client node.

Preferred embodiments of these two aspects may feature the following. Request messages from the client are received at a first socket of the stand-in server, and corresponding request messages are sent from the first socket to a second socket for actual performance of the services requested by the request messages. For at least some of the messages directed by the client node to the unavailable server and received at the first socket, the request message is serviced in the forwarding channel, and a reply sent to the client node without sending a corresponding request message to the second socket. For at least some of the messages directed by the client node to the unavailable server and received at the first socket, the contents of the request message are altered before sending a corresponding request message to the second socket. Similarly, the content of some response packets are altered during the return trip from the server to the client.

The invention has many advantages, listed in the following paragraphs.

The invention provides high-reliability access to the services of a network server. When a server under the protection of the invention goes down, either because of failure, maintenance, or network reconfiguration, the invention provides a hot standby Integrity Server that can immediately stand in and provide the services of the downed server. The invention provides that one Integrity Server node can protect many network servers, providing cost-effective fault resilience. Clients of the protected servers can access the services of the Integrity Server without modifying software or procedures. Because the Integrity Server is an entire redundant computer node, it is still available even if the entire primary server is unavailable. The Integrity Server can also protect against certain kinds of network failures.

Other advantages and features of the invention will become apparent from the following description of preferred embodiments, from the drawings, and from the claims.

BRIEF DESCRIPTION OF THE DRAWING

FIG. 3 is a table of some of the packet types in the NetWare Core Protocol and the actions that the File Server of the Integrity Server takes in rerouting and responding to each.

DESCRIPTION OF PREFERRED EMBODIMENTS

A commercial embodiment of the invention is available from Network Integrity, Inc. of Marlboro, Mass.

Overview

Figure 1A:
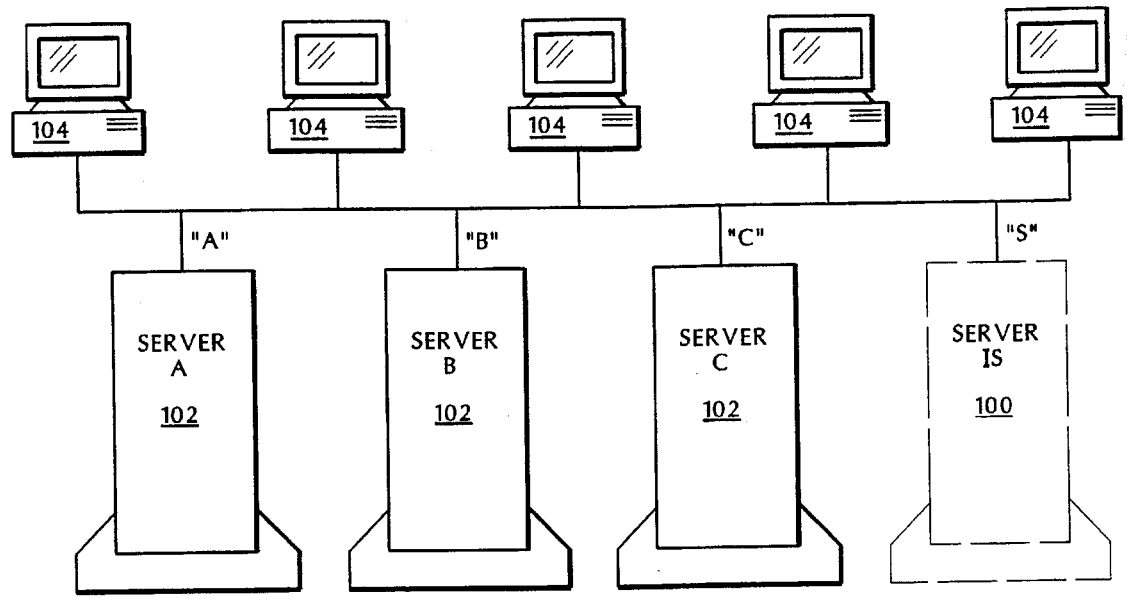
FIGS. 1a and 1b are block diagrams of a computer network, showing servers, client nodes, and an Integrity Server, and the network automatically reconfiguring itself as a server fails.
Figure 1B:
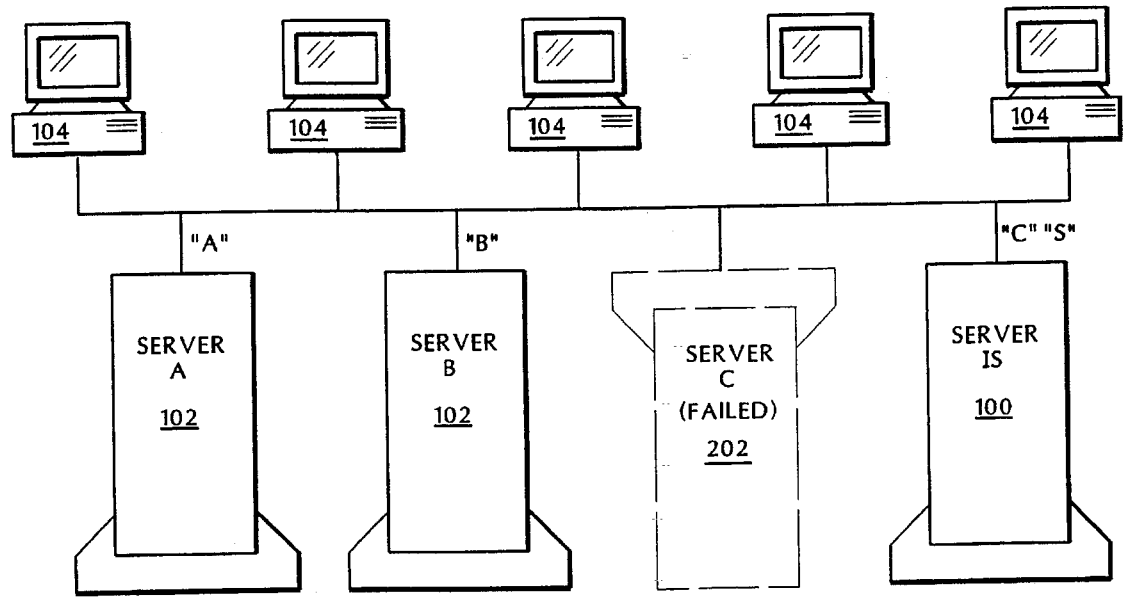

Referring to FIGS. 1a and 1b, when any protected server 102 of a network goes down, Integrity Server 100 stands-in to provide the services of the failed server 102. Integrity Server 100 is a conventional network computer node.

Referring to FIG. 1a, as long as all servers 102 of a network are functioning normally, all clients 104 simply request services from servers 102 using conventional network protocols and requests. During this time, called "protection mode," Integrity Server 100, at least in its role of protecting servers 102, is essentially invisible to all clients 104.

Referring to FIG. 1b, after one of servers 202 fails, Integrity Server 100 enters "stand-in mode" (either automatically or on operator command). Integrity Server 100 assumes the identity of failed server 202 during connect requests, and intercepts network packets sent to failed server 202 to provide most of the services ordinarily provided by failed server 202. Clients 104 still request data from failed server 202 using unaltered protocols and requests. However, these requests are actually serviced by Integrity Server 100. This stand-in service is almost instantaneous.

In a preferred use, an agent process continuously scans the files of file servers 102, and snapshots copies of any recently-changed or recently-created files to Integrity Server 100. During protection mode, Integrity server 100 manages these snapshots on its tape and disk storage. When any of file servers 102 fails, Integrity Server 100 stands-in to provide the files of the failed server.

Figure 2:
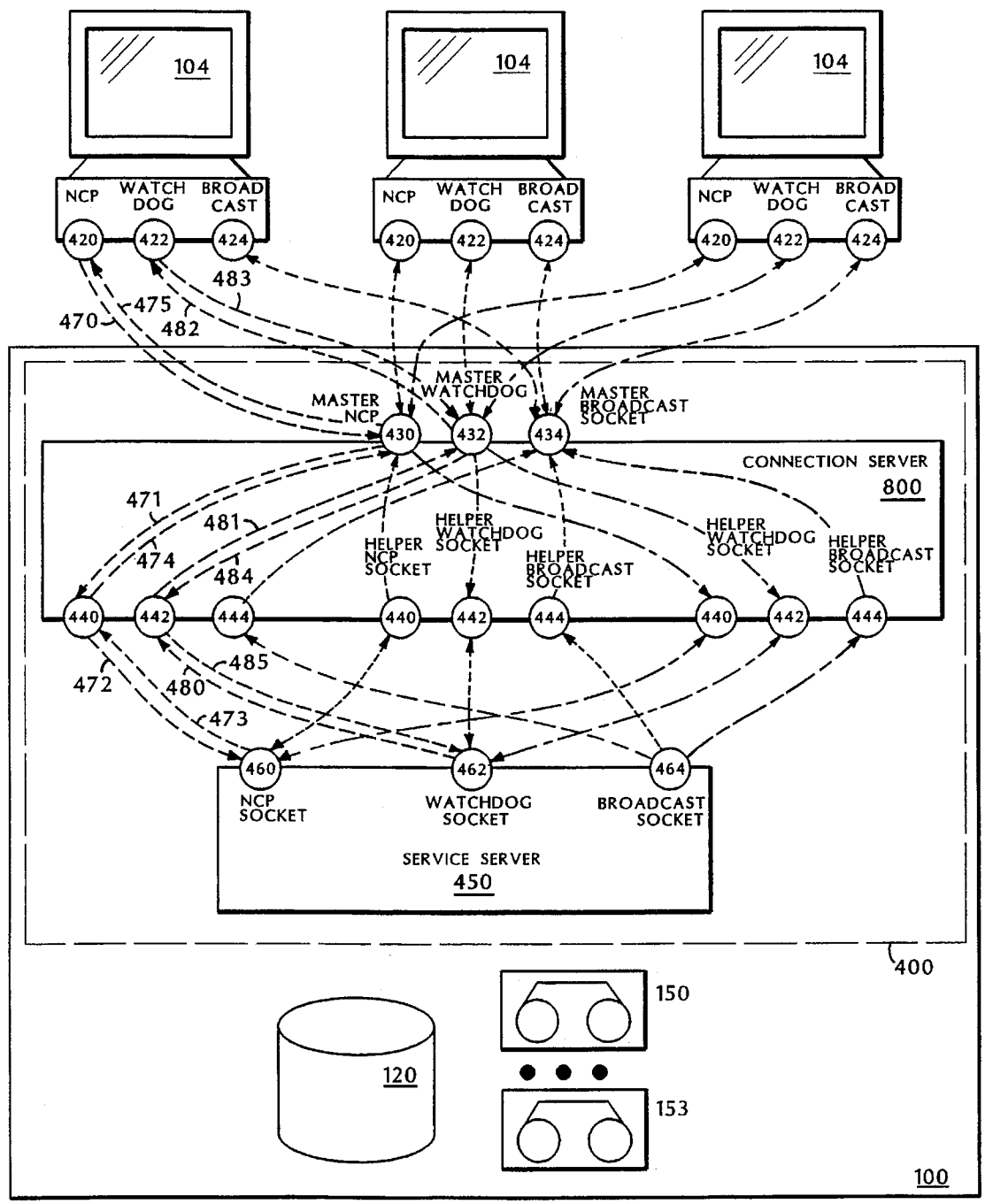
FIG. 2 is a block diagram showing the travel of several packets to/from client nodes from/to/through the Integrity Server.

Referring to FIG. 2, if a protected server 202 becomes unavailable, whether for scheduled maintenance or failure, either a human system manager or an automatic initiation program may invoke the Integrity Server's stand-in mode for the failed server. In stand-in mode, the Integrity Server provides users with transparent access to the services normally provided by the unavailable server.

When a protected server 202 goes down, NetWare detects the loss of communication and signals the Integrity Server. The Integrity Server either waits a previously-defined amount of time and then begins to stand-in for the protected server, or waits for instructions from the system manager. When Integrity Server 100 assumes stand-in mode for a failed server 202, Integrity Server 100 executes a previously-established policy to identify itself to the network as the failed server 202 and executes a Netware compatible instruction file defined by the system manager, and then services all requests for failed server 202 from the network. Users who lost their connection to failed server 202 are connected to Integrity Server 100 when they login again, either manually using the same login method they normally use, or automatically by their standard client software. Login requests and server service requests are intercepted by Integrity Server 100 and serviced in a fully transparent manner to all users and server administrators. The complete transition requires less than a minute and does not require the Integrity Server 100 to reboot.

As stand-in begins, Integrity Server 100 advertises the name of failed protected server 202 on the network via the Server Advertisement Protocol (SAP), and emulates the failed server's 202 NetWare Core Protocol (NCP) connections with users (clients) as they login. This action causes other network members to "see" Integrity Server 100 as failed protected server 202. Packets from a client to the failed server are intercepted and serviced by the Integrity Server.

Note that Stand-In Management requires in-depth knowledge of packet format and currently is specific to a given application and transport protocol, i.e., NCP over IPX. Support for other application/transport protocol pairs, such as AFP (AppleTalk Filing Protocol) over ATP (AppleTalk Transaction Protocol) and NFS (Network File System) over TCP/IP, follows the design provided here.

Referring to FIG. 2, Connection Management 400 provides for the advertising and emulation of the low level connection-oriented functions of a Novell NetWare server. Network services during stand-in are divided into two areas: Connection Server 800 and Service Server 450. Service Server 450 is an unmodified copy of NetWare, which provides the actual services to emulate those of failed server 202. Connection Server 800 is the Integrity Server software acting as a "forwarding post office" to reroute packets from client nodes to Service Server 450. Connection Server 800 appears to clients 104 to provide the NetWare services of failed server 202. In fact, for most service request packets, Connection Server 800 receives the packets, alters them, and forwards them to Service Server 450 for service. For other purposes, including testing and debugging, Connection Server 800 and Service Server 450 can be run on different physical NetWare servers, which permits easy analysis of packets that pass between them. However, normally they both run on the same machine, and therefore packets between them which are passed in software without ever being transmitted on a physical wire.

A normal NetWare connection between a client and a server uses three pairs of sockets: a pair of NCP sockets, a pair of Watchdog sockets, and a pair of Broadcast sockets. (A "socket" is a software equivalent of having multiple hardware network ports on the back panel of the computer. Though there may be only a single wire actually connecting two computers in a network, each message on that wire has tags identifying the sockets from which the message was sent and to which it is directed. Once the message is received, the destination socket number is used to route the message to the correct software destination within the receiving computer.) In a normal NetWare session, a client requests a service by sending a packet from its NetWare Core Protocol (NCP) socket to the server's NCP socket. The server performs the service and replies with a response packet (an acknowledgement is required even if no response per se is) from the server's NCP socket back to the client's. The server uses its Watchdog socket to poll the client and ensure that the client is healthy: the server sends a packet from its Watchdog socket to the client's Watchdog socket, and the client responds with an acknowledgement from the client's Watchdog socket to the server's. The server uses its Broadcast socket to send unsolicited messages to the clients that require no response; typically no messages are sent from clients to servers on Broadcast sockets. NCP, Watchdog, and Broadcast socket numbers in a group are assigned consecutive socket numbers.

In the Integrity Server's Stand-in Services Connection Management module 400, multiple triplets of sockets are used to manage packets. Each triplet includes an NCP, a Watchdog, and a Broadcast socket. Each client has an NCP 420, Watchdog 422, and Broadcast 424 socket; the client communicates with the Stand-in server using these in exactly the same manner that it would use if the original server had not failed. The Service Server's NCP 460, Watchdog 462, and Broadcast 464 sockets are the Integrity Server's normal NetWare three server's sockets. Connection Server 800 presents a server face to client 104, using Master NCP 430, Master Watchdog 432, and Master Broadcast 434 sockets, and a client face to Service Server 450, using Helper NCP 440, Helper Watchdog 442, and Helper Broadcast 444 sockets, one such triplet of helper sockets corresponding to each client 104. Connection Server 800 serves as a "forwarding Post Office," receiving client packets addressed to the virtual failed server and forwarding them through the client's corresponding helper sockets 440, 442, 444 to the Service Server 450, and receiving replies from the Service Server 450 at the client's corresponding helper sockets 440, 442, 444 and forwarding them through the Connection Server's sockets 430, 432, 434 back to client's sockets 420, 422, 424.

To establish a connection, Integrity Server 100 advertises itself as a server using the standard NetWare Service Advertising Protocol (SAP) functions, broadcasting the name of failed server 202 and the IPX socket number for its Master NCP socket 430. Once this SAP is broadcast to the rest of the network, it appears that the protected server is available for providing services, though the client will use the network address for the Connection Server's Master NCP socket 430 rather then the NCP socket of failed server 202.

When a client 104 requests a service, for instance opening a file, it sends a packet 470 from client NCP socket 420 to Master NCP socket 430. This request packet is indistinguishable from a packet that would have requested the same service from failed server 202, except for the destination address. The packet is received at Master NCP socket 430. Connection Server 800 optionally alters the contents of the packet 471, and forwards the altered packet 472 from Helper NCP socket 440 to the Service Server's NCP socket 460. Service Server 450 performs the requested service, and replies with a response packet 473 back to Helper NCP socket 440. When response packet 473 is received at Helper NCP socket 440, Connection Management optionally filters the packet and forward it 475 to the requesting client's NCP socket 420.

Some request packets 470 are serviced in Connection Server 800 and a reply packet 475 returned without passing the request on to Service Server 450. For example, if the client queries the stand-in server for a service that was available on the real protected server (even though it is down and may be emulated by the Integrity Server that does offer the requested services) Connection Server 800 will handle the query and return a denial without passing the request on to Service Server 450.

Each client 104 has a corresponding set of Helper sockets 440–444. This allows the Service Server 450 to believe that multiple clients are communicating on unique connections thought to be on different clients 104, when the connections are actually from multiple Helper triplets 440–444 of a single Connection Server 800. The single Connection Server, in turn, communicates with the real clients 104.

During stand-in, a poll from Service Server's Watchdog socket 462 will be received by Connection Management at Helper Watch Dog socket 442, which will subsequently forward the poll 482 to client 104 as if the poll had originated at Master Watch Dog socket 432. If client 104 is still alive, it will send a response 483 to Master Watch Dog socket 432. When Connection Management receives the response 483 at Master Watch Dog socket 432, it will forward the response packet 485 to the Service Server's Watchdog socket 462 as though the response had originated at the Connection Server's Helper Watchdog socket 442 corresponding to the client 104.

A NetWare broadcast is sent by a server to its clients by sending a message to a client's broadcast socket 424 indicating that a message is waiting. Client 104 responds by sending an NCP request, and the message itself is sent from the server to the client as the response to this NCP request. During stand-in, the Service Server will send the broadcast message to Helper Broadcast Socket 444 corresponding to client 104. Connection Management receives this, and forwards it to the client's Broadcast socket 424 as though the broadcast had originated at the Master Broadcast Socket 434.

Packet Redirection

Packet Management is a component that provides for the analysis and modification of NetWare NCP packets received via the IPX protocol, via IPX tunnelled through IP (Internet Protocol) or IP routed to IPX via NWIP. This allows a network client to believe that a server, with its volumes and files, actually exists when in fact it is being emulated by the Integrity Server. Packet Management is used by Connection Management to examine packets and change their contents so that the Integrity Server's server names, volume names, path names and other server specific information appear to be those of the protected server being emulated. The process of changing NCP requests and responses within Packet Management is called Packet Filtering.

Packet Management works in combination with Connection Management. Connection Management is responsible for maintaining the actual communications via IPX Sockets.

IPX packets contain source and destination addresses, each including the network number, the node number and the socket number. Within the IPX header there is a packet type. Only packet types of NCP, coming from an NCP socket, are processed by the packet filtering system.

NCP packets are communicated within IPX packets. NCP packets start with a two byte header that indicates the type of packet: a request, response, create service connection, or destroy service connection.

Most NCP packets contain a connection number. This connection number is recorded by Connection Management, along with the original IPX address, in a lookup table. The table is used to route packets through Connection Server 800. Each entry of the lookup table maintains the correspondence between the IPX net/node/socket address 420–424 of a client (for a request packet 470) and a set of helper sockets 440–444 (from which the forwarded request packet 472 is to be sent) and an NCP connection number. The lookup table is also used on the return trip, to map the helper socket number 440–444 at which a reply packet 473 is received to a destination socket 420–424 to forward the reply packet 475. The lookup table is also used when net/node/socket addresses must be altered in the contents of packets. As long as the NCP connection number is available, the IPX address can be retrieved.

When the Connection Server 800 receives a "Create Service Connection" packet, Connection Server 800 creates a new triplet of helper sockets facing the Service Server 450, and enters an entry into the lookup table.

Most packets contain a sequence number. The sequence number is used by the server to make sure that none of the requests/responses are lost. Since the Packet Management system will sometimes decide to send a packet back to the workstation without routing it to the server, the sequence number can be different between the workstation and the server. The packet filter code is responsible for altering the sequence number to maintain agreement between client and server. Packet sequence number information is also maintained in the table.

Request packets contain a function code, used by Packet Management to determine which filter should be used. Response packets do not contain the function code, so request packets are tracked such that the matching result packet (by sequence number) is identified as a response to a particular function.

The following types of information are filtered within NCP packets:

Server Names: For NCP requests, the protected server Name will be changed to the Integrity Server's name within the packet. For responses, the Integrity Server's name will be changed back to the emulated protected server's name.

File Path Names. A file path name in an NCP request will be changed to a corresponding path within the Integrity Server's file system that corresponds to the requested file path. Inverse transformations are performed on paths in NCP response packets that include pathnames in the portion of the Integrity Server's file system emulating the server's file system.

Volume Numbers: For NCP requests, volume numbers are changed to the number of the volume on which the failed server's file system is being emulated by the Integrity Server. For NCP responses, volume names are changed back to the failed server's volume number.

other types of information: server statistics, bindery object ID's, etc.

FIG. 3 is a table listing some of the Netware Core Protocol packet types, and some of the attributes within each packet that Connection Server 800 modifies. For instance, the "Create File" entry 510 of the table shows that a Create File request packet 470 has its volume name/number 512 and file pathname 514 changed by Connection Server 800 before the packet is forwarded 472 to the Service Server 450. Similarly, the volume name/number and file pathname may have to be altered by Connection Server 800 before a response packet 473 is forwarded 475 to client 104. Similarly, a request packet 470 of type "Duplicate Extended Attributes" 520 has its volume name/number 522, file pathname 524, and extended attributes altered before the packet is forwarded 472. A "Ping NDS" packet 530 has its Netware Directory Services information altered 532 by Connection Server 800 (specifically, when standing-in for a NetWare version 3 protected server, Connection Server 800 alters the response packet to state that the emulated server cannot provide NetWare Directory Services, even though Service Server 450, which is a NetWare version 4, initially responded that it could provide such services).

Generally, any packet that contains a server name, a volume name, or pathname referring to a failed protected server, or contains extended attribute information for a directory or file from the emulated server, or NDS (NetWare Directory Services), or bindery information, must potentially be modified, and a packet filter written for the packet type.

Locating a Server

Referring to Appendix A, a protocol of exchanged messages is used to establish a communication link between client 104 and a server (either a NetWare server 102 or Integrity Server 100). In the stand-in case, the Integrity Server's Connection Server (800 of FIG. 2) emulates the failed server's connection establishment protocol. Appendix A is in two columns: the left column shows a packet trace of a connection being established in a normal setting where all server nodes of a network are functional, and the right column shows the corresponding trace for establishing the same connection in a network where one of the protected servers has failed, and the Integrity Server is emulating the services of the failed server. Corresponding packets are arranged next to each other.

To establish a connection, Novell NetWare uses two families of packets. The first family includes a "Service Advertising Protocol" (SAP) packet, periodically broadcast by each server in the network to advertise the server's name and the services that the server offers. A server typically broadcasts a SAP packet on a prearranged schedule, typically once per minute or so, or may broadcast a SAP in response to a ping broadcast by a client. (The Integrity Server broadcasts a SAP packet with the name of the emulated server when stand-in begins.) The second family includes the "Scan Bindery Object" requests and responses used by NetWare 3.x version servers, initiated by a client node to seek the nearest server nodes. The third family includes the NDS (NetWare Directory Services) requests and responses, initiated by a client node to scan an enterprise-wide "yellow pages" of network services.

Referring to Appendix A, in packet number 1 (602) of the regular protocol, protected server PIGGY advertises that it provides directory server (604) and file server (606) services. In packet 224 (610), Integrity Server 100 advertises that it is a directory server (612) and file server (614). Note here that PIGGY's is advertised as having a network/node address of "0000 3469/0050 4947 4759" (616) and BEAKER is advertised as having a network address of "0000 3559/4245 414B 4552" (618).

In the corresponding packet 620 of the trace taken from a network in which Integrity Server BEAKER is standing in for failed server PIGGY, BEAKER advertises that it is a file server named PIGGY (622), a directory server named BEAKER (624), and a file server named BEAKER (626). The network address for all of these services is advertised as "0000 3559/4245 414B 4552" (628). Thus, this same network/node address is advertised as having two different logical names. The different services are distinguished by their socket numbers. Note that normal NetWare servers 102 are advertised at socket number 0x0453 (which the trace-generator recognizes as special, and shows as "NCP" (630)). Because BEAKER's NCP socket is already in use (626), the file services of PIGGY are advertised as having a unique socket address (0x0001 (632) in the example).

Figure 4:
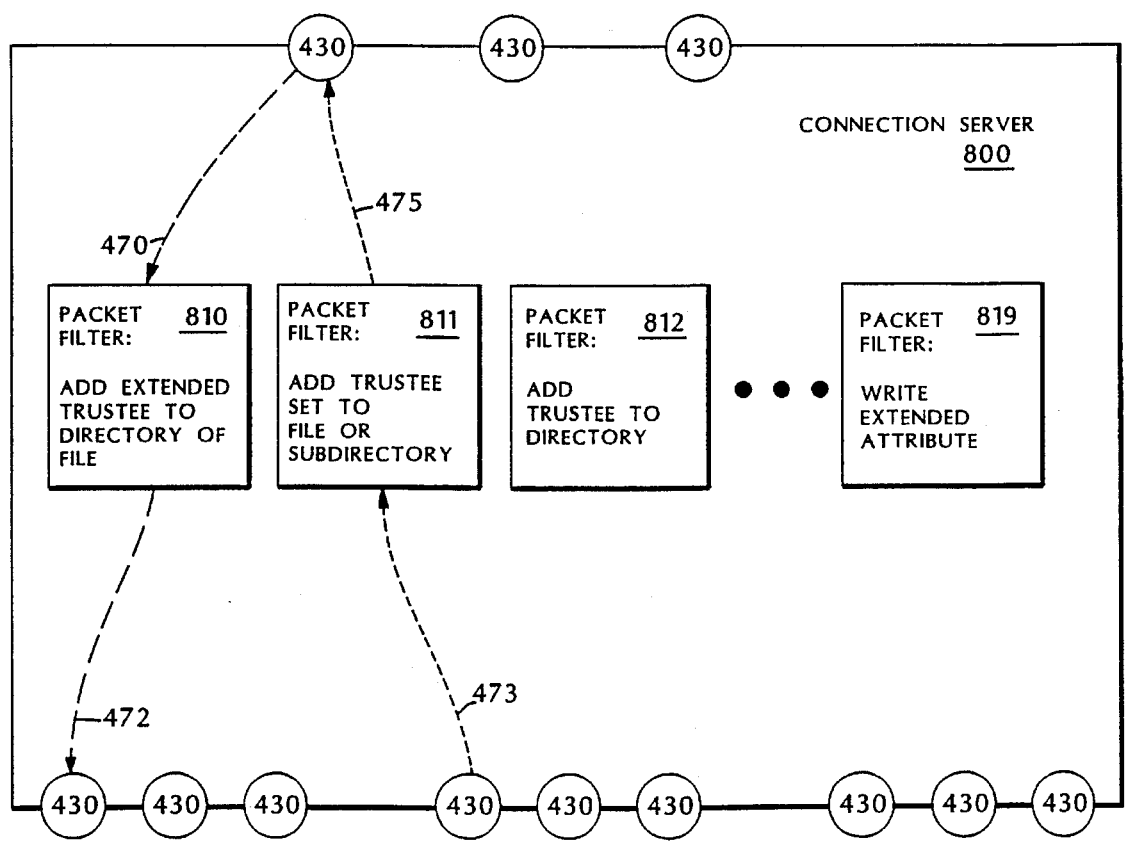
FIG. 4 is a block diagram of the Connection Server portion of an Integrity Server.

Before a user logs in, a client node has to inquire from the network what servers are available. In either the regular or stand-in case, the client workstation broadcasts a "Nearest Server Query" packet 640. This packet is an exception to the normal rule that broadcast packets are not replied to; any number of servers (including zero) may reply to the nearest server query packet. In the traces of FIG. 4, servers ROBIN and SNUFFY reply (642,643) to the client's nearest query in either case. In the normal case, servers BEAKER and PIGGY also reply (645,646). In the stand-in case, server PIGGY has failed, and thus only BEAKER responds (648). Each server responds with only one net/node/socket address, the last one in its service table, and thus BEAKER responds with the net/node/socket and name for emulated server PIGGY (649).

Each server has a local directory of local and network services, called the bindery. Thus, to obtain full information about all servers on the network, once the client has a name and net/node/socket for a single server, the client can query this single server for detailed information about all servers. The remainder of Appendix A shows the conversation between the client node and the first server to respond to the client's query, in this case ROBIN in both cases shown. The client sends a "Scan Bindery Object" request packet 660, with "last object seen" 662 equal to 0xFFFFFFFF to indicate that the query is beginning. ROBIN replies with a packet 664 describing server ROBIN 666. The client then queries 668 for the next server in the bindery, using the object ID 670 obtained in the previous response 664 to indicate 672 that the next server query should return the next server, in this case SNUFFY 674 in packet 676.

The next reply packets 678, 680, which tell the client node about server PIGGY 682, 684, might be expected to show a divergence between the normal case and the stand-in case. (Recall that PIGGY is the server that is actually in service in the left column, and is being stood-in for by node BEAKER in the right column.) However, because the Scan Bindery Object reply packet 678, 680 does not contain the net/node/socket address of the server in question, the packets are the same. Packets 686 describe server BEAKER to the client node, and packets 688 show that the end of the server list has been reached.

Logging In

Appendix B shows a trace of some of the packets exchanged during a login sequence between a client (node 02-80-C8-00-00-05) and a protected server (PIGGY) in a normal network, and the corresponding packets exchanged between the client, Connection Server 800 (running on node BEAKER, network address 42-45-41-4B-45-52 in the example) and Service Server 450 (running on node PIGGY2, address 50-49-47-47-59-32 in the example). Note that for illustrative purposes, Connection Server 800 and Service Server 450 have been separated onto two separate nodes; in normal use, they would run on a single node. Appendix B is in two columns: the left column shows a packet trace in a normal setting where server PIGGY is functional, and the right column shows the corresponding trace in a network where PIGGY has failed, and the Integrity Server is emulating the services of server PIGGY. Corresponding packets are arranged next to each other.

In the regular case, packet 700 goes from the client node to the server and requests "Create Service Connection." Packet 700 is emulated by two packets 702 and 704, which respectively correspond to packets 471 and 472 of FIG. 2. Note that packet 702 from the client is identical to the regular packet 700, except that the destination address 706 has been replaced in the stand-in case 702 by the network/node/socket address 707 broadcast by node BEAKER in its role of standing-in for node PIGGY, 628, 632 of packet 620 of FIG. 4. No software on client 104 was altered to detect and respond to this change of address for PIGGY. Connection Server 800 receives packet 702 and generates a new packet 704 to forward to Service Server 450 by altering the destination address.

In the regular case, server PIGGY responds with a "Create Service Connection Reply" packet 708. In the stand-in case, Service Server 450 responds with a "Create Service Connection Reply" packet 710 (corresponding to packet 473 of FIG. 2), which Connection Server 800 receives and forwards as packet 712 (corresponding to packet 474).

Packets 716–720 on pages 3–4 of Appendix B show the Connection Server 800 altering the contents of a packet to preserve the illusion of emulating PIGGY. Packet 718 is a reply giving information about server PIGGY to the client. In the packet 718 generated by Service Server 450, the server's name 722 is the true name of the Service Server node, PIGGY2. But in packet 720, Connection Server 800 has altered the server name content 724 of the packet to read "PIGGY."

The remainder of Appendix B shows other packets exchanged between the client node and server PIGGY in the left column, and the corresponding packets exchanged among the client node and servers BEAKER and PIGGY2 in their role of standing-in for failed server PIGGY.

Implementation of NCP Packet Filters

Referring to FIG. 4, the Connection Server 800 portion of the Integrity Server has a packet filter 810–819 tailored to each type of packet in the protocol (for instance, many of the packets in the NCP protocol were listed in FIG. 3). Packet filters can be implemented either in C programs or in a script language specially designed for the purpose.

The upper layers of Packet Management route each packet (either request 470 or reply 473) received by Connection Server 800 to its Packet Filter 810–819, with a count of the packet length. The packet filter can look at the packet type to determine if the packet is a request or a response packet, and alter the packet data and/or length depending on the contents and whether the packet is a request or response, as shown in Appendix B. A filter provides routing information to higher layers of Packet Management. A request packet can have a routing code of PacketFilter (route data to the Service Server, but get response back through the filter), PacketRoute (route data, but don't send response through filter), or PacketReturnToSender (don't route data; return directly to sender without sending to server). All response packets are routed PacketRoute.

For each protected server, the system manager can assign a Netware compatible instruction file (.NCF) to be automatically executed as a part of stand-in initiation and a 58-character login message to be automatically sent to users who log in to the stand-in server. The instruction file can be used to provide queue initialization or other system-specific activity to expedite bringing up stand-in services. A second .NCF instruction file may be provided to provide "standdown" instructions to reverse the original instructions and return the services to the original server.

One alternate embodiment for establishing communications between client 104 and the integrity server 100, acting as a failed server 202, uses a NetWare hook into the existing NCP communications socket. When one of servers 202 fails, the Integrity Server inserts a hook into the Net Ware operating system to receive all NCP communications, and publishes the name of the failed server using the same socket as the NCP socket of the Integrity Server. All NCP communications received in the NCP socket are forwarded to Packet Management for filtering by the Integrity Server, and are then forwarded to the NewWare operating system by returning from the NetWare hook (in contrast to sending the new packet using a communications socket). The alternate approach eliminates the requirement for publishing the address of the failed server at an alternate socket, as well as eliminating the requirement for transmitting the packet to the Service Server.

Other embodiments are within the following claims.

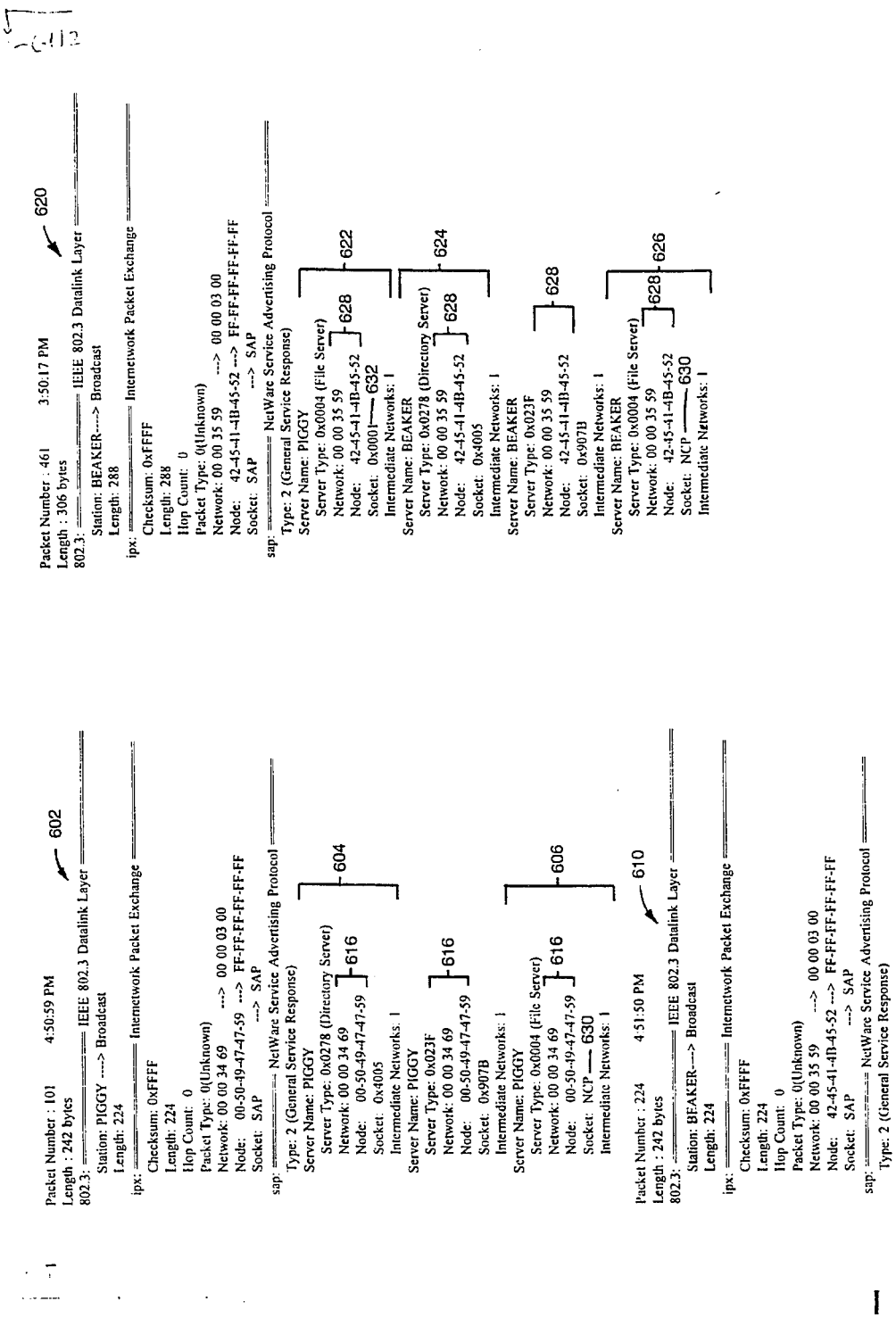
Appendix A: page 1

Appendix A: page 2

```
                              Node:    00-00-00-00-00-01
                              Socket:  NCP
                              Intermediate Networks: 1

Packet Number : 406      4:52:56 PM                                    ← 643
Length : 114 bytes
802.3:                           IEEE 802.3 Datalink Layer
       Station: SNUFFY----> This_Workstation
       Length: 96
ipx:                             Internetwork Packet Exchange
       Checksum: 0xFFFF
       Length: 96
       Hop Count: 0
       Packet Type: 0(Unknown)
       Network: 00 00 03 00      ---> 00 00 03 00
       Node:    00-40-C0-49-83-4D ---> 00-00-C0-DE-26-5F
       Socket:  SAP               ---> 0x400A
sap:                             NetWare Service Advertising Protocol
       Type: 4 (Nearest Service Response)
       Server Name: SNUFFY
           Server Type: 0x0004 (File Server)
           Network: 00 00 30 27
           Node:    00-00-00-00-00-01
           Socket:  NCP
           Intermediate Networks: 1

Packet Number : 407      4:52:56 PM                                    ← 645
Length : 114 bytes
802.3:                           IEEE 802.3 Datalink Layer
       Station: BEAKER----> This_Workstation
       Length: 96
ipx:                             Internetwork Packet Exchange
       Checksum: 0xFFFF
       Length: 96
       Hop Count: 0
       Packet Type: 0(Unknown)
       Network: 00 00 35 59      ---> 00 00 03 00
       Node:    42-45-41-4B-45-52 ---> 00-00-C0-DE-26-5F
       Socket:  SAP               ---> 0x400A
sap:                             NetWare Service Advertising Protocol
       Server Name: BEAKER
           Server Type: 0x0004 (File Server)
           Network: 00 00 35 59
           Node:    42-45-41-4B-45-52
           Socket:  NCP
           Intermediate Networks: 1

Packet Number : 408      4:52:56 PM                                    ← 646
Length : 114 bytes
802.3:                           IEEE 802.3 Datalink Layer
       Station: PIGGY----> This_Workstation
       Length: 96
ipx:                             Internetwork Packet Exchange Node:    00-00-00-00-00-01
                              Socket:  NCP
                              Intermediate Networks: 1

Packet Number : 777      3:52:45 PM                                    ← 643
Length : 114 bytes
802.3:                           IEEE 802.3 Datalink Layer
       Station: SNUFFY----> This_Workstation
       Length: 96
ipx:                             Internetwork Packet Exchange
       Checksum: 0xFFFF
       Length: 96
       Hop Count: 0
       Packet Type: 0(Unknown)
       Network: 00 00 03 00      ---> 00 00 03 00
       Node:    00-40-C0-49-83-4D ---> 00-00-C0-DE-26-5F
       Socket:  SAP               ---> 0x400A
sap:                             NetWare Service Advertising Protocol
       Type: 4 (Nearest Service Response)
       Server Name: SNUFFY
           Server Type: 0x0004 (File Server)
           Network: 00 00 30 27
           Node:    00-00-00-00-00-01
           Socket:  NCP
           Intermediate Networks: 1

Packet Number : 778      3:52:45 PM                                    ← 648
Length : 114 bytes
802.3:                           IEEE 802.3 Datalink Layer
       Station: BEAKER----> This_Workstation
       Length: 96
ipx:                             Internetwork Packet Exchange
       Checksum: 0xFFFF
       Length: 96
       Hop Count: 0
       Packet Type: 0(Unknown)
       Network: 00 00 35 59      ---> 00 00 03 00
       Node:    42-45-41-4B-45-52 ---> 00-00-C0-DE-26-5F
       Socket:  SAP               ---> 0x400A
sap:                             NetWare Service Advertising Protocol
       Type: 4 (Nearest Service Response)
       Server Name: PIGGY                                               ⎤
           Server Type: 0x0004 (File Server)                            |
           Network: 00 00 35 59                                         ⎬ 649
           Node:    42-45-41-4B-45-52                                   |
           Socket:  0x0001                                              ⎦
           Intermediate Networks: 1
```

Appendix A: page 3

```
Checksum: 0xFFFF
Length: 96
Hop Count: 0
Packet Type: 0(Unknown)
Network: 00 00 34 69      --> 00 00 03 00
Node:   00-50-49-47-47-59 --> 00-00-C0-DE-26-5F
Socket: SAP               --> 0x400A
sap:                              NetWare Service Advertising Protocol
  Type: 4 (Nearest Service Response)
  Server Name: PIGGY
  Server Type: 0x0004 (File Server)
    Network: 00 00 34 69
    Node:    00-50-49-47-47-59
    Socket:  NCP
    Intermediate Networks: 1
```

Packet Number : 479      4:53:06 PM                               ← 660
Length : 66 bytes
802.3: ═══════════════════ IEEE 802.3 Datalink Layer
  Station: This_Workstation---> ROBIN
  Length: 48
ipx: ═══════════════════════ Internetwork Packet Exchange
  Checksum: 0xFFFF
  Length: 48
  Hop Count: 0
  Packet Type: 17(NCP)
  Network: 00 00 03 00       --> 00 00 31 10
  Node:    00-00-C0-DE-26-5F --> 00-00-00-00-00-01
  Socket:  0x4003            --> NCP
ncp: ═══════════════════════ NetWare Core Protocol             ← 662
  NCP Request: Scan Bindery Object
  Request Type: 0x2222 (Request)
  Sequence Number: 7
  Connection Number Low: 6
  Task Number: 1
  Connection Number High: 0
  Function Code: 23
  Subfunction Length: 9 bytes
  Subfunction Code: 55
  Last Object Seen: 0xFFFFFFFF
  Search Object Type: 4 (File Server)
  Search Object Name: Length: 1
                      Value : *

Packet Number : 480      4:53:06 PM                               ← 664
Length : 114 bytes
802.3: ═══════════════════ IEEE 802.3 Datalink Layer
  Station: ROBIN---> This_Workstation
  Length: 96
ipx: ═══════════════════════ Internetwork Packet Exchange
  Checksum: 0xFFFF
  Length: 95
  Hop Count: 0
  Packet Type: 17(NCP)

---

Packet Number : 852      3:52:56 PM                               ← 660
Length : 66 bytes
802.3: ═══════════════════ IEEE 802.3 Datalink Layer
  Station: This_Workstation---> ROBIN
  Length: 48
ipx: ═══════════════════════ Internetwork Packet Exchange
  Checksum: 0xFFFF
  Length: 48
  Hop Count: 0
  Packet Type: 17(NCP)
  Network: 00 00 03 00       --> 00 00 31 10
  Node:    00-00-C0-DE-26-5F --> 00-00-00-00-00-01
  Socket:  0x4003            --> NCP
ncp: ═══════════════════════ NetWare Core Protocol
  NCP Request: Scan Bindery Object
  Request Type: 0x2222 (Request)
  Sequence Number: 7
  Connection Number Low: 2
  Task Number: 1
  Connection Number High: 0
  Function Code: 23
  Subfunction Length: 9 bytes                                     ← 662
  Subfunction Code: 55
  Last Object Seen: 0xFFFFFFFF
  Search Object Type: 4 (File Server)
  Search Object Name: Length: 1
                      Value : *

Packet Number : 853      3:52:56 PM                               ← 664
Length : 114 bytes
802.3: ═══════════════════ IEEE 802.3 Datalink Layer
  Station: ROBIN---> This_Workstation
  Length: 96
ipx: ═══════════════════════ Internetwork Packet Exchange
  Checksum: 0xFFFF
  Length: 95
  Hop Count: 0
  Packet Type: 17(NCP)

Appendix A: page 4

Network: 00 00 31 10          ---> 00 00 03 00
Node:    00-00-00-00-00-01 ---> 00-00-C0-DE-26-5F
Socket:  NCP                  ---> 0x4003
ncp: ═══════════════ NetWare Core Protocol ═══════════════
  NCP Reply: Scan Bindery Object
  Reply Type: 0x3333 (Reply)
  Sequence Number: 7
  Connection Number Low: 6
  Task Number: 1
  Connection Number High: 0
  Completion Code: 0 (Success)
  Connection Status: 0x00 ── 670
  Object ID: 0xAC000035 ──
  Object Type: 4 (File Server) ── 666
  Object Name: ROBIN ──
  Object Flag: 0x01 (Dynamic)
  Security: 64 (Anyone read, File Server write)
  Object has Properties: 255 (Yes)

Packet Number : 481    4:53:06 PM                    ── 668
Length : 66 bytes
802.3: ═══════════════ IEEE 802.3 Datalink Layer ═══════════════
  Station: This_Workstation---> ROBIN
  Length: 48
ipx: ═══════════════ Internetwork Packet Exchange ═══════════════
  Checksum: 0xFFFF
  Length: 48
  Hop Count: 0
  Packet Type: 17(NCP)
  Network: 00 00 03 00         ---> 00 00 31 10
  Node:    00-00-C0-DE-26-5F ---> 00-00-00-00-00-01
  Socket:  0x4003              ---> NCP
ncp: ═══════════════ NetWare Core Protocol ═══════════════
  NCP Request: Scan Bindery Object
  Request Type: 0x2222 (Request)
  Sequence Number: 8
  Connection Number Low: 6
  Task Number: 1
  Connection Number High: 0
  Function Code: 23
  Subfunction Length: 9 bytes
  Subfunction Code: 55
  Last Object Seen: 0xAC000035 ── 672
  Search Object Type: 4 (File Server)
  Search Object Name: Length: 1
                   Value : *
                                              ── 676
Packet Number : 482    4:53:06 PM
Length : 114 bytes
802.3: ═══════════════ IEEE 802.3 Datalink Layer ═══════════════
  Station: ROBIN----> This_Workstation
  Length: 96
ipx: ═══════════════ Internetwork Packet Exchange ═══════════════
  Checksum: 0xFFFF Network: 00 00 31 10          ---> 00 00 03 00
Node:    00-00-00-00-00-01 ---> 00-00-C0-DE-26-5F
Socket:  NCP                  ---> 0x4003
ncp: ═══════════════ NetWare Core Protocol ═══════════════
  NCP Reply: Scan Bindery Object
  Reply Type: 0x3333 (Reply)
  Sequence Number: 7
  Connection Number Low: 2
  Task Number: 1
  Connection Number High: 0
  Completion Code: 0 (Success)
  Connection Status: 0x00 ── 670
  Object ID: 0xAA00003B ──
  Object Type: 4 (File Server) ── 666
  Object Name: ROBIN ──
  Object Flag: 0x01 (Dynamic)
  Security: 64 (Anyone read, File Server write)
  Object has Properties: 255 (Yes)

Packet Number : 854    3:52:56 PM                    ── 668
Length : 66 bytes
802.3: ═══════════════ IEEE 802.3 Datalink Layer ═══════════════
  Station: This_Workstation---> ROBIN
  Length: 48
ipx: ═══════════════ Internetwork Packet Exchange ═══════════════
  Checksum: 0xFFFF
  Length: 48
  Hop Count: 0
  Packet Type: 17(NCP)
  Network: 00 00 03 00         ---> 00 00 31 10
  Node:    00-00-C0-DE-26-5F ---> 00-00-00-00-00-01
  Socket:  0x4003              ---> NCP
ncp: ═══════════════ NetWare Core Protocol ═══════════════
  NCP Request: Scan Bindery Object
  Request Type: 0x2222 (Request)
  Sequence Number: 8
  Connection Number Low: 2
  Task Number: 1
  Connection Number High: 0
  Function Code: 23
  Subfunction Length: 9 bytes
  Subfunction Code: 55
  Last Object Seen: 0xAA00003B ── 672
  Search Object Type: 4 (File Server)
  Search Object Name: Length: 1
                   Value : *
                                              ── 676
Packet Number : 855    3:52:56 PM
Length : 114 bytes
802.3: ═══════════════ IEEE 802.3 Datalink Layer ═══════════════
  Station: ROBIN----> This_Workstation
  Length: 96
ipx: ═══════════════ Internetwork Packet Exchange ═══════════════
  Checksum: 0xFFFF Appendix A: page 5

```
Length: 95
Hop Count: 0
Packet Type: 17(NCP)
Network: 00 00 31 10        --> 00 00 03 00
Node:    00-00-00-00-00-01  --> 00-00-C0-DE-26-5F
Socket:  NCP                --> 0x4003
ncp: ================= NetWare Core Protocol =================
     NCP Reply: Scan Bindery Object
     Reply Type: 0x3333 (Reply)
     Sequence Number: 8
     Connection Number Low: 6
     Task Number: 1
     Connection Number High: 0
     Completion Code: 0 (Success)
     Connection Status: 0x00
     Object ID: 0xA6000015
     Object Type: 4 (File Server)  674
     Object Name: SNUFFY
     Object Flag: 0x01 (Dynamic)
     Security: 64 (Anyone read, File Server write)
     Object has Properties: 255 (Yes)

Packet Number : 483    4:53:06 PM
Length : 66 bytes
802.3: ================= IEEE 802.3 Datalink Layer =================
       Station: This_Workstation----> ROBIN
       Length: 48
ipx: ================= Internetwork Packet Exchange =================
     Checksum: 0xFFFF
     Length: 48
     Hop Count: 0
     Packet Type: 17(NCP)
     Network: 00 00 03 00        --> 00 00 31 10
     Node:    00-00-C0-DE-26-5F  --> 00-00-00-00-00-01
     Socket:  0x4003             --> NCP
ncp: ================= NetWare Core Protocol =================
     NCP Request: Scan Bindery Object
     Request Type: 0x2222 (Request)
     Sequence Number: 9
     Connection Number Low: 6
     Task Number: 1
     Connection Number High: 0
     Function Code: 23
     Subfunction Length: 9 bytes
     Subfunction Code: 55
     Last Object Seen: 0xA6000015
     Search Object Type: 4 (File Server)
     Search Object Name: Length: 1
                         Value : *

Packet Number : 484    4:53:06 PM
Length : 114 bytes
802.3: ================= IEEE 802.3 Datalink Layer =================
       Station: ROBIN----> This_Workstation
```
← 678

```
Length: 95
Hop Count: 0
Packet Type: 17(NCP)
Network: 00 00 31 10        --> 00 00 03 00
Node:    00-00-00-00-00-01  --> 00-00-C0-DE-26-5F
Socket:  NCP                --> 0x4003
ncp: ================= NetWare Core Protocol =================
     NCP Reply: Scan Bindery Object
     Reply Type: 0x3333 (Reply)
     Sequence Number: 8
     Connection Number Low: 2
     Task Number: 1
     Connection Number High: 0
     Completion Code: 0 (Success)
     Connection Status: 0x00
     Object ID: 0xB2000012
     Object Type: 4 (File Server)  674
     Object Name: SNUFFY
     Object Flag: 0x01 (Dynamic)
     Security: 64 (Anyone read, File Server write)
     Object has Properties: 255 (Yes)

Packet Number : 856    3:52:56 PM
Length : 66 bytes
802.3: ================= IEEE 802.3 Datalink Layer =================
       Station: This_Workstation----> ROBIN
       Length: 48
ipx: ================= Internetwork Packet Exchange =================
     Checksum: 0xFFFF
     Length: 48
     Hop Count: 0
     Packet Type: 17(NCP)
     Network: 00 00 03 00        --> 00 00 31 10
     Node:    00-00-C0-DE-26-5F  --> 00-00-00-00-00-01
     Socket:  0x4003             --> NCP
ncp: ================= NetWare Core Protocol =================
     NCP Request: Scan Bindery Object
     Request Type: 0x2222 (Request)
     Sequence Number: 9
     Connection Number Low: 2
     Task Number: 1
     Connection Number High: 0
     Function Code: 23
     Subfunction Length: 9 bytes
     Subfunction Code: 55
     Last Object Seen: 0xB2000012
     Search Object Type: 4 (File Server)
     Search Object Name: Length: 1
                         Value : *

Packet Number : 857    3:52:56 PM
Length : 114 bytes
802.3: ================= IEEE 802.3 Datalink Layer =================
       Station: ROBIN----> This_Workstation
```
← 680

Appendix A: page 6

Length: 96
ipx: ═══════════ Internetwork Packet Exchange ═══════════
  Checksum: 0xFFFF
  Length: 95
  Hop Count: 0
  Packet Type: 17(NCP)
  Network: 00 00 31 10    --> 00 00 03 00
  Node: 00-00-00-00-00-01 --> 00-00-C0-DE-26-5F
  Socket: NCP             --> 0x4003
ncp: ═══════════ NetWare Core Protocol ═══════════
  NCP Reply: Scan Bindery Object
  Reply Type: 0x3333 (Reply)
  Sequence Number: 9
  Connection Number Low: 6
  Task Number: 1
  Connection Number High: 0
  Completion Code: 0 (Success)
  Connection Status: 0x00
  Object ID: 0xA1000074
  Object Type: 4 (File Server) ⎤─682
  Object Name: PIGGY            ⎦
  Object Flag: 0x01 (Dynamic)
  Security: 64 (Anyone read, File Server write)
  Object has Properties: 255 (Yes)

Packet Number : 485    4:53:06 PM
Length : 66 bytes
802.3: ═══════════ IEEE 802.3 Datalink Layer ═══════════
  Station: This Workstation---> ROBIN
  Length: 48
ipx: ═══════════ Internetwork Packet Exchange ═══════════
  Checksum: 0xFFFF
  Length: 48
  Hop Count: 0
  Packet Type: 17(NCP)
  Network: 00 00 03 00    --> 00 00 31 10
  Node: 00-00-C0-DE-26-5F --> 00-00-00-00-00-01
  Socket: 0x4003          --> NCP
ncp: ═══════════ NetWare Core Protocol ═══════════
  NCP Request: Scan Bindery Object
  Request Type: 0x2222 (Request)
  Sequence Number: 10
  Connection Number Low: 6
  Task Number: 1
  Connection Number High: 0
  Function Code: 23
  Subfunction Length: 9 bytes
  Subfunction Code: 55
  Last Object Seen: 0xA1000074
  Search Object Type: 4 (File Server)
  Search Object Name Length: 1
         Value : *

Packet Number : 486    4:53:06 PM

Length: 96
ipx: ═══════════ Internetwork Packet Exchange ═══════════
  Checksum: 0xFFFF
  Length: 95
  Hop Count: 0
  Packet Type: 17(NCP)
  Network: 00 00 31 10    --> 00 00 03 00
  Node: 00-00-00-00-00-01 --> 00-00-C0-DE-26-5F
  Socket: NCP             --> 0x4003
ncp: ═══════════ NetWare Core Protocol ═══════════
  NCP Reply: Scan Bindery Object
  Reply Type: 0x3333 (Reply)
  Sequence Number: 9
  Connection Number Low: 2
  Task Number: 1
  Connection Number High: 0
  Completion Code: 0 (Success)
  Connection Status: 0x00
  Object ID: 0xA2000038
  Object Type: 4 (File Server) ⎤─684
  Object Name: PIGGY            ⎦
  Object Flag: 0x01 (Dynamic)
  Security: 64 (Anyone read, File Server write)
  Object has Properties: 255 (Yes)

Packet Number : 858    3:52:56 PM
Length : 66 bytes
802.3: ═══════════ IEEE 802.3 Datalink Layer ═══════════
  Station: This Workstation---> ROBIN
  Length: 48
ipx: ═══════════ Internetwork Packet Exchange ═══════════
  Checksum: 0xFFFF
  Length: 48
  Hop Count: 0
  Packet Type: 17(NCP)
  Network: 00 00 03 00    --> 00 00 31 10
  Node: 00-00-C0-DE-26-5F --> 00-00-00-00-00-01
  Socket: 0x4003          --> NCP
ncp: ═══════════ NetWare Core Protocol ═══════════
  NCP Request: Scan Bindery Object
  Request Type: 0x2222 (Request)
  Sequence Number: 10
  Connection Number Low: 2
  Task Number: 1
  Connection Number High: 0
  Function Code: 23
  Subfunction Length: 9 bytes
  Subfunction Code: 55
  Last Object Seen: 0xA2000038
  Search Object Type: 4 (File Server)
  Search Object Name Length: 1
         Value : *

Packet Number : 859    3:52:56 PM

Appendix A: page 7

Length : 114 bytes
802.3: ═══════════ IEEE 802.3 Datalink Layer ═══════════
    Station: ROBIN----> This_Workstation
    Length: 96
ipx: ═══════════ Internetwork Packet Exchange ═══════════
    Checksum: 0xFFFF
    Length: 95
    Hop Count: 0
    Packet Type: 17(NCP)
    Network: 00 00 31 10         --> 00 00 03 00
    Node:    00-00-00-00-00-01   --> 00-00-C0-DE-26-5F
    Socket: NCP                  --> 0x4003
ncp: ═══════════ NetWare Core Protocol ═══════════            ← 686
    NCP Reply: Scan Bindery Object
    Reply Type: 0x3333 (Reply)
    Sequence Number: 10
    Connection Number Low: 6
    Task Number: 1
    Connection Number High: 0
    Completion Code: 0 (Success)
    Connection Status: 0x00
    Object ID: 0xB300002A
    Object Type: 4 (File Server)
    Object Name: BEAKER
    Object Flag: 0x01 (Dynamic)
    Security: 64 (Anyone read, File Server write)
    Object has Properties: 255 (Yes)

Packet Number : 487    4:53:06 PM
Length : 66 bytes
802.3: ═══════════ IEEE 802.3 Datalink Layer ═══════════
    Station: This_Workstation----> ROBIN
    Length: 48
ipx: ═══════════ Internetwork Packet Exchange ═══════════
    Checksum: 0xFFFF
    Length: 48
    Hop Count: 0
    Packet Type: 17(NCP)
    Network: 00 00 03 00         --> 00 00 31 10
    Node:    00-00-C0-DE-26-5F   --> 00-00-00-00-00-01
    Socket: 0x4003               --> NCP
ncp: ═══════════ NetWare Core Protocol ═══════════
    NCP Request: Scan Bindery Object
    Request Type: 0x2222 (Request)
    Sequence Number: 11
    Connection Number Low: 6
    Task Number: 1
    Connection Number High: 0
    Function Code: 23
    Subfunction Length: 9 bytes
    Subfunction Code: 55
    Last Object Seen: 0xB300002A
    Search Object Type: 4 (File Server)
    Search Object Name: Length: 1

Length : 114 bytes
802.3: ═══════════ IEEE 802.3 Datalink Layer ═══════════
    Station: ROBIN----> This_Workstation
    Length: 96
ipx: ═══════════ Internetwork Packet Exchange ═══════════
    Checksum: 0xFFFF
    Length: 95
    Hop Count: 0
    Packet Type: 17(NCP)
    Network: 00 00 31 10         --> 00 00 03 00
    Node:    00-00-00-00-00-01   --> 00-00-C0-DE-26-5F
    Socket: NCP                  --> 0x4003
ncp: ═══════════ NetWare Core Protocol ═══════════            ← 686
    NCP Reply: Scan Bindery Object
    Reply Type: 0x3333 (Reply)
    Sequence Number: 10
    Connection Number Low: 2
    Task Number: 1
    Connection Number High: 0
    Completion Code: 0 (Success)
    Connection Status: 0x00
    Object ID: 0x9F000051
    Object Type: 4 (File Server)
    Object Name: BEAKER
    Object Flag: 0x01 (Dynamic)
    Security: 64 (Anyone read, File Server write)
    Object has Properties: 255 (Yes)

Packet Number : 861    3:52:56 PM
Length : 66 bytes
802.3: ═══════════ IEEE 802.3 Datalink Layer ═══════════
    Station: This_Workstation----> ROBIN
    Length: 48
ipx: ═══════════ Internetwork Packet Exchange ═══════════
    Checksum: 0xFFFF
    Length: 48
    Hop Count: 0
    Packet Type: 17(NCP)
    Network: 00 00 03 00         --> 00 00 31 10
    Node:    00-00-C0-DE-26-5F   --> 00-00-00-00-00-01
    Socket: 0x4003               --> NCP
ncp: ═══════════ NetWare Core Protocol ═══════════
    NCP Request: Scan Bindery Object
    Request Type: 0x2222 (Request)
    Sequence Number: 11
    Connection Number Low: 2
    Task Number: 1
    Connection Number High: 0
    Function Code: 23
    Subfunction Length: 9 bytes
    Subfunction Code: 55
    Last Object Seen: 0x9F000051
    Search Object Type: 4 (File Server)
    Search Object Name: Length: 1

Appendix A: page 8

Value : *

Packet Number : 488    4:53:06 PM
Length : 64 bytes
802.3: ═══════════ IEEE 802.3 Datalink Layer ═══════════  ← 688
  Station: ROBIN----> This_Workstation
  Length: 38
ipx: ═══════════ Internetwork Packet Exchange ═══════════
  Checksum: 0xFFFF
  Length: 38
  Hop Count: 0
  Packet Type: 17(NCP)
  Network: 00 00 31 10       ---> 00 00 03 00
  Node:    00-00-00-00-00-01 ---> 00-00-C0-DE-26-5F
  Socket:  NCP                ---> 0x4003
ncp: ═══════════ NetWare Core Protocol ═══════════
  NCP Reply: Scan Bindery Object
  Reply Type: 0x3333 (Reply)
  Sequence Number: 11
  Connection Number Low: 6
  Task Number: 1
  Connection Number High: 0
  Completion Code: 252 (No Such Object)
  Connection Status: 0x00

Value : *

Packet Number : 862    3:52:56 PM
Length : 64 bytes
802.3: ═══════════ IEEE 802.3 Datalink Layer ═══════════  ← 688
  Station: ROBIN----> This_Workstation
  Length: 38
ipx: ═══════════ Internetwork Packet Exchange ═══════════
  Checksum: 0xFFFF
  Length: 38
  Hop Count: 0
  Packet Type: 17(NCP)
  Network: 00 00 31 10       ---> 00 00 03 00
  Node:    00-00-00-00-00-01 ---> 00-00-C0-DE-26-5F
  Socket:  NCP                ---> 0x4003
ncp: ═══════════ NetWare Core Protocol ═══════════
  NCP Reply: Scan Bindery Object
  Reply Type: 0x3333 (Reply)
  Sequence Number: 11
  Connection Number Low: 2
  Task Number: 1
  Connection Number High: 0
  Completion Code: 252 (No Such Object)
  Connection Status: 0x00

Appendix A: page 9

```
Packet Number : 2          8:56:10 PM                                            ← 700
Length : 64 bytes                            IEEE 802.3 Datalink Layer
802.3:
        Station: 02-80-C8-00-00-05---> PIGGY
        Length: 38                           Internetwork Packet Exchange
ipx:
        Checksum: 0xFFFF
        Length: 37
        Hop Count: 0
        Packet Type: 17(NCP)
        Network: 00 00 03 00        --> 00 00 34 69
        Node:    02-80-C8-00-00-05  --> 00-50-49-47-47-59           ⎤
        Socket:  0x4003             --> NCP                         ⎦ 706
ncp:                                         NetWare Core Protocol
        NCP Request: Create Service Connection
        Request Type: 0x1111 (Create Service Connection)
        Sequence Number: 0
        Connection Number: 255

Packet Number : 3          8:56:10 PM                                            ← 708
Length : 64 bytes                            IEEE 802.3 Datalink Layer
802.3:
        Station: PIGGY---> 02-80-C8-00-00-05
        Length: 38                           Internetwork Packet Exchange
ipx:
        Checksum: 0xFFFF
        Length: 38
        Hop Count: 0
        Packet Type: 17(NCP)
        Network: 00 00 34 69        --> 00 00 03 00
        Node:    00-50-49-47-47-59  --> 02-80-C8-00-00-05
        Socket:  NCP                --> 0x4003
ncp:                                         NetWare Core Protocol
        NCP Reply: Create Service Connection
        Reply Type: 0x3333 (Reply)

Packet Number : 2          9:08:31 PM                                            ← 702
Length : 64 bytes                            IEEE 802.3 Datalink Layer
802.3:
        Station: 02-80-C8-00-00-05---> BEAKER
        Length: 38                           Internetwork Packet Exchange
ipx:
        Checksum: 0xFFFF
        Length: 37
        Hop Count: 0
        Packet Type: 17(NCP)
        Network: 00 00 03 00        --> 00 00 35 59                 ⎤
        Node:    02-80-C8-00-00-05  --> 42-45-41-4B-45-52           ⎥ 707
        Socket:  0x4003             --> 0x0001                      ⎦
ncp:                                         NetWare Core Protocol
        NCP Request: Create Service Connection
        Request Type: 0x1111 (Create Service Connection)
        Sequence Number: 0
        Connection Number: 255

Packet Number : 3          9:08:31 PM                                            ← 704
Length : 64 bytes                            IEEE 802.3 Datalink Layer
802.3:
        Station: BEAKER---> PIGGY2
        Length: 38                           Internetwork Packet Exchange
ipx:
        Checksum: 0xFFFF
        Length: 37
        Hop Count: 1
        Packet Type: 17(NCP)
        Network: 00 00 35 59        --> 00 00 34 69
        Node:    42-45-41-4B-45-52  --> 50-49-47-47-59-32
        Socket:  0x40A9             --> NCP
ncp:                                         NetWare Core Protocol
        NCP Request: Create Service Connection
        Request Type: 0x1111 (Create Service Connection)
        Sequence Number: 0
        Connection Number: 255

Packet Number : 4          9:08:31 PM                                            ← 710
Length : 64 bytes                            IEEE 802.3 Datalink Layer
802.3:
        Station: PIGGY2---> BEAKER
        Length: 38                           Internetwork Packet Exchange
ipx:
        Checksum: 0xFFFF
        Length: 38
        Hop Count: 0
        Packet Type: 17(NCP)
        Network: 00 00 34 69        --> 00 00 35 59
        Node:    50-49-47-47-59-32  --> 42-45-41-4B-45-52
        Socket:  NCP                --> 0x40A9
ncp:                                         NetWare Core Protocol
        NCP Reply: Create Service Connection
        Reply Type: 0x3333 (Reply)
```

Appendix B: page 1

Sequence Number: 0
Connection Number Low: 1
Task Number: 1
Connection Number High: 0
Completion Code: 0 (Success)
Connection Status: 0x00

Packet Number : 4    8:56:10 PM
Length : 64 bytes
802.3: ══════════════ IEEE 802.3 Datalink Layer ══════════════
       Station: 02-80-C8-00-00-05----> PIGGY
       Length: 40
ipx:   ══════════════ Internetwork Packet Exchange ══════════════
       Checksum: 0xFFFF
       Length: 40
       Hop Count: 0
       Packet Type: 17(NCP)
       Network: 00 00 03 00       ---> 00 00 34 69
       Node:    02-80-C8-00-00-05 ---> 00-50-49-47-47-59
       Socket:  0x4003            ---> NCP
ncp:   ══════════════ NetWare Core Protocol ══════════════
       NCP Request: Get File Server Info
       Request Type: 0x2222 (Request)
       Sequence Number: 1
       Connection Number Low: 1
       Task Number: 2
       Connection Number High: 0
       Function Code: 23
       Subfunction Length: 1 bytes
       Subfunction Code: 17

Sequence Number: 0
Connection Number Low: 2
Task Number: 1
Connection Number High: 0
Completion Code: 0 (Success)
Connection Status: 0x00

Packet Number : 5    9:08:31 PM    ←— 712
Length : 64 bytes
802.3: ══════════════ IEEE 802.3 Datalink Layer ══════════════
       Station: BEAKER----> 02-80-C8-00-00-05
       Length: 38
ipx:   ══════════════ Internetwork Packet Exchange ══════════════
       Checksum: 0xFFFF
       Length: 38
       Hop Count: 1
       Packet Type: 17(NCP)
       Network: 00 00 35 59        ---> 00 00 03 00
       Node:    42-45-41-4B-45-52 ---> 02-80-C8-00-00-05
       Socket:  0x0001             ---> 0x4003
ncp:   ══════════════ NetWare Core Protocol ══════════════
       NCP Reply: Create Service Connection
       Reply Type: 0x3333 (Reply)
       Sequence Number: 0
       Connection Number Low: 2
       Task Number: 1
       Connection Number High: 0
       Completion Code: 0 (Success)
       Connection Status: 0x00

Packet Number : 6    9:08:31 PM
Length : 64 bytes
802.3: ══════════════ IEEE 802.3 Datalink Layer ══════════════
       Station: 02-80-C8-00-00-05----> BEAKER
       Length: 40
ipx:   ══════════════ Internetwork Packet Exchange ══════════════
       Checksum: 0xFFFF
       Length: 40
       Hop Count: 0
       Packet Type: 17(NCP)
       Network: 00 00 03 00        ---> 00 00 35 59
       Node:    02-80-C8-00-00-05 ---> 42-45-41-4B-45-52
       Socket:  0x4003             ---> 0x0001
ncp:   ══════════════ NetWare Core Protocol ══════════════
       NCP Request: Get File Server Info
       Request Type: 0x2222 (Request)
       Sequence Number: 1
       Connection Number Low: 2
       Task Number: 2
       Connection Number High: 0
       Function Code: 23
       Subfunction Length: 1 bytes
       Subfunction Code: 17

Appendix B: page 2

Packet Number : 5   8:56:10 PM
Length : 184 bytes
802.3: ═══════════ IEEE 802.3 Datalink Layer ═══════════ ← 716
  Station: PIGGY---> 02-80-C8-00-00-05
  Length: 166
ipx: ═══════════ Internetwork Packet Exchange ═══════════
  Checksum: 0xFFFF
  Length: 166
  Hop Count: 0
  Packet Type: 17(NCP)
  Network: 00 00 34 69        --> 00 00 03 00
  Node: 00-50-49-47-47-59 --> 02-80-C8-00-00-05
  Socket: NCP               --> 0x4003
ncp: ═══════════ NetWare Core Protocol ═══════════
  NCP Reply: Get File Server Info
  Reply Type: 0x3333 (Reply)
  Sequence Number: 1
  Connection Number Low: 1
  Task Number: 1
  Connection Number High: 0
  Completion Code: 0 (Success)
  Connection Status: 0x00
  Server Name: PIGGY
  Major NetWare Version: 3
  Minor NetWare Version: 11
  Maximum Number of Service Connections: 1
  Connections in Use: 0
  Number of Mounted Volumes: 64
  Revision Level: 0
  SFT Level: 2

Packet Number : 7   9:08:31 PM
Length : 64 bytes
802.3: ═══════════ IEEE 802.3 Datalink Layer ═══════════
  Station: BEAKER---> PIGGY2
  Length: 40
ipx: ═══════════ Internetwork Packet Exchange ═══════════
  Checksum: 0xFFFF
  Length: 40
  Hop Count: 1
  Packet Type: 17(NCP)
  Network: 00 00 35 59        --> 00 00 34 69
  Node: 42-45-41-4B-45-52 --> 50-49-47-47-59-32
  Socket: 0x40A9            --> NCP
ncp: ═══════════ NetWare Core Protocol ═══════════
  NCP Request: Get File Server Info
  Request Type: 0x2222 (Request)
  Sequence Number: 1
  Connection Number Low: 2
  Task Number: 2
  Connection Number High: 0
  Function Code: 23
  Subfunction Length: 1 bytes
  Subfunction Code: 17

Packet Number : 8   9:08:31 PM
Length : 184 bytes
802.3: ═══════════ IEEE 802.3 Datalink Layer ═══════════ ← 718
  Station: PIGGY2---> BEAKER
  Length: 166
ipx: ═══════════ Internetwork Packet Exchange ═══════════
  Checksum: 0xFFFF
  Length: 166
  Hop Count: 0
  Packet Type: 17(NCP)
  Network: 00 00 34 69        --> 00 00 35 59
  Node: 50-49-47-47-59-32 --> 42-45-41-4B-45-52
  Socket: NCP               --> 0x40A9
ncp: ═══════════ NetWare Core Protocol ═══════════
  NCP Reply: Get File Server Info
  Reply Type: 0x3333 (Reply)
  Sequence Number: 1
  Connection Number Low: 2
  Task Number: 1
  Connection Number High: 0
  Completion Code: 0 (Success) ← 722
  Connection Status: 0x00
  Server Name: PIGGY2
  Major NetWare Version: 4
  Minor NetWare Version: 1
  Maximum Number of Service Connections: 2
  Connections in Use: 0
  Number of Mounted Volumes: 64
  Revision Level: 2
  SFT Level: 2

Appendix B: page 3

TTS Level: 1
Max Connections Used: 1
Accounting Version: 1
VAP Version: 1
Queuing Version: 1
Print Server Version: 0
Virtual Console Version: 1
Security Restriction Version: 1
Internet Bridge Support Version: 1

Packet Number : 6    8:56:10 PM
Length : 74 bytes
802.3: ══════════ IEEE 802.3 Datalink Layer ══════════
    Station: 02-80-C8-00-00-05 ---> PIGGY TTS Level: 1
Max Connections Used: 1
Accounting Version: 1
VAP Version: 1
Queuing Version: 1
Print Server Version: 0
Virtual Console Version: 1
Security Restriction Version: 1
Internet Bridge Support Version: 1

Packet Number : 9    9:08:31 PM        ← 720
Length : 184 bytes
802.3: ══════════ IEEE 802.3 Datalink Layer ══════════
    Station: BEAKER----> 02-80-C8-00-00-05
    Length: 166
ipx: ══════════ Internetwork Packet Exchange ══════════
    Checksum: 0xFFFF
    Length: 166
    Hop Count: 1
    Packet Type: 17(NCP)
    Network: 00 00 35 59      --> 00 00 03 00
    Node:  00-50-49-47-47-59 --> 02-80-C8-00-00-05
    Socket: 0x0001            --> 0x4003
ncp: ══════════ NetWare Core Protocol ══════════
    NCP Reply: Get File Server Info
    Reply Type: 0x3333 (Reply)
    Sequence Number: 1
    Connection Number Low: 2
    Task Number: 1
    Connection Number High: 0
    Completion Code: 0 (Success)
    Connection Status: 0x00
    Server Name: PIGGY ─── 724
    Major NetWare Version: 3
    Minor NetWare Version: 11
    Maximum Number of Service Connections: 2
    Connections in Use: 0
    Number of Mounted Volumes: 64
    Revision Level: 0
    SFT Level: 2
    TTS Level: 1
    Max Connections Used: 1
    Accounting Version: 1
    VAP Version: 1
    Queuing Version: 1
    Print Server Version: 0
    Virtual Console Version: 1
    Security Restriction Version: 1
    Internet Bridge Support Version: 1

Packet Number : 10    9:08:31 PM
Length : 74 bytes
802.3: ══════════ IEEE 802.3 Datalink Layer ══════════
    Station: 02-80-C8-00-00-05----> BEAKER Appendix B: page 4

6
```
      Length: 56            ══ Internetwork Packet Exchange ══
ipx:  Checksum: 0xFFFF
      Length: 55
      Hop Count: 0
      Packet Type: 17(NCP)
      Network: 00 00 03 00         --> 00 00 34 69
      Node:    02-80-C8-00-00-05 --> 00-50-49-47-47-59
      Socket:  0x4003              --> NCP
ncp:                    ══ NetWare Core Protocol ══
      NCP Request: Packet Burst Connection
      Request Type: 0x2222 (Request)
      Sequence Number: 2
      Connection Number Low: 1
      Task Number: 2
      Connection Number High: 0
      Function Code: 101
      Local Connection ID: 0x9305BF1B
      Local Max Packet Size: 610
      Local Target Socket: 0x4007
      Local Max Send Size: 65535
      Local Max Receive Size: 65535

Packet Number : 7      8:56:10 PM
Length : 64 bytes
802.3: ══════════════════ IEEE 802.3 Datalink Layer ══
      Station: PIGGY-----> 02-80-C8-00-00-05
      Length: 46
ipx:                    ══ Internetwork Packet Exchange ══
      Checksum: 0xFFFF
      Length: 46
      Hop Count: 0
      Packet Type: 17(NCP)
      Network: 00 00 34 69         --> 00 00 03 00
      Node:    00-50-49-47-47-59 --> 02-80-C8-00-00-05
      Socket:  NCP                 --> 0x4003
ncp:                    ══ NetWare Core Protocol ══
      NCP Reply: Packet Burst Connection
      Reply Type: 0x3333 (Reply)
      Sequence Number: 2
      Connection Number Low: 1
      Task Number: 1
      Connection Number High: 0
      Completion Code: 0 (Success)
      Connection Status: 0x00
      Remote Target ID: 0x01000100
      Remote Max Packet Size: 610
```

7
```
Packet Number : 8      8:56:10 PM
Length : 64 bytes
802.3: ══════════════════ IEEE 802.3 Datalink Layer ══
      Station: 02-80-C8-00-00-05-----> PIGGY
      Length: 40
```

```
      Length: 56            ══ Internetwork Packet Exchange ══
ipx:  Checksum: 0xFFFF
      Length: 55
      Hop Count: 0
      Packet Type: 17(NCP)
      Network: 00 00 03 00         --> 00 00 35 59
      Node:    02-80-C8-00-00-05 --> 42-45-41-4B-45-52
      Socket:  0x4003              --> 0x0001
ncp:                    ══ NetWare Core Protocol ══
      NCP Request: Packet Burst Connection
      Request Type: 0x2222 (Request)
      Sequence Number: 2
      Connection Number Low: 2
      Task Number: 2
      Connection Number High: 0
      Function Code: 101
      Local Connection ID: 0x7A04561A
      Local Max Packet Size: 610
      Local Target Socket: 0x4007
      Local Max Send Size: 65535
      Local Max Receive Size: 65535

Packet Number : 11     9:08:31 PM
Length : 74 bytes
802.3: ══════════════════ IEEE 802.3 Datalink Layer ══
      Station: BEAKER-----> 02-80-C8-00-00-05
      Length: 56
ipx:                    ══ Internetwork Packet Exchange ══
      Checksum: 0xFFFF
      Length: 55
      Hop Count: 1
      Packet Type: 17(NCP)
      Network: 00 00 35 59         --> 00 00 03 00
      Node:    42-45-41-4B-45-52 --> 02-80-C8-00-00-05
      Socket:  0x0001              --> 0x4003
ncp:                    ══ NetWare Core Protocol ══
      NCP Reply: Packet Burst Connection
      Reply Type: 0x3333 (Reply)
      Sequence Number: 2
      Connection Number Low: 2
      Task Number: 2
      Connection Number High: 0
      Completion Code: 251 (No Such Property)
      Connection Status: 0x00
Data:
      0: 00 02 4D 00 00 00 00 00 07 00 00 FF FF 00 00 FF  ..M.............
     10: FF Packet Number : 12     9:08:31 PM
Length : 64 bytes
802.3: ══════════════════ IEEE 802.3 Datalink Layer ══
      Station: 02-80-C8-00-00-05-----> BEAKER
      Length: 40
```

Appendix B: page 5

```
ipx: ═══════════════════════ Internetwork Packet Exchange ═══════════════════════
     Checksum: 0xFFFF
     Length: 40
     Hop Count: 0
     Packet Type: 17(NCP)
     Network: 00 00 03 00          --> 00 00 34 69
     Node:    02-80-C8-00-00-05 --> 00-50-49-47-47-59
     Socket:  0x4003                --> NCP
ncp: ═══════════════════════ NetWare Core Protocol ═══════════════════════
     NCP Request: Get Big Packet NCP Max Packet Size
     Request Type: 0x2222 (Request)
     Sequence Number: 3
     Connection Number Low: 1
     Task Number: 2
     Connection Number High: 0
     Function Code: 97
     Proposed Max Size: 1500
     Security Flags: 0x00

Packet Number : 9     8:56:10 PM
Length : 64 bytes
802.3: ═══════════════════════ IEEE 802.3 Datalink Layer ═══════════════════════
     Station: PIGGY---> 02-80-C8-00-00-05
     Length: 44
ipx: ═══════════════════════ Internetwork Packet Exchange ═══════════════════════
     Checksum: 0xFFFF
     Length: 43
     Hop Count: 0
     Packet Type: 17(NCP)
     Network: 00 00 34 69          --> 00 00 03 00 ipx: ═══════════════════════ Internetwork Packet Exchange ═══════════════════════
     Checksum: 0xFFFF
     Length: 40
     Hop Count: 0
     Packet Type: 17(NCP)
     Network: 00 00 03 00          --> 00 00 35 59
     Node:    02-80-C8-00-00-05 --> 42-45-41-4B-45-52
     Socket:  0x4003                --> 0x0001
ncp: ═══════════════════════ NetWare Core Protocol ═══════════════════════
     NCP Request: Get Big Packet NCP Max Packet Size
     Request Type: 0x2222 (Request)
     Sequence Number: 3
     Connection Number Low: 2
     Task Number: 2
     Connection Number High: 0
     Function Code: 97
     Proposed Max Size: 1500
     Security Flags: 0x00

Packet Number : 13     9:08:31 PM
Length : 64 bytes
802.3: ═══════════════════════ IEEE 802.3 Datalink Layer ═══════════════════════
     Station: BEAKER---> PIGGY2
     Length: 40
ipx: ═══════════════════════ Internetwork Packet Exchange ═══════════════════════
     Checksum: 0xFFFF
     Length: 40
     Hop Count: 1
     Packet Type: 17(NCP)
     Network: 00 00 35 59          --> 00 00 34 69
     Node:    42-45-41-4B-45-52 --> 50-49-47-47-59-32
     Socket:  0x40A9                --> NCP
ncp: ═══════════════════════ NetWare Core Protocol ═══════════════════════
     NCP Request: Get Big Packet NCP Max Packet Size
     Request Type: 0x2222 (Request)
     Sequence Number: 2
     Connection Number Low: 2
     Task Number: 2
     Connection Number High: 0
     Function Code: 97
     Proposed Max Size: 1500
     Security Flags: 0x00

Packet Number : 14     9:08:31 PM
Length : 64 bytes
802.3: ═══════════════════════ IEEE 802.3 Datalink Layer ═══════════════════════
     Station: PIGGY2---> BEAKER
     Length: 44
ipx: ═══════════════════════ Internetwork Packet Exchange ═══════════════════════
     Checksum: 0xFFFF
     Length: 43
     Hop Count: 0
     Packet Type: 17(NCP)
     Network: 00 00 34 69          --> 00 00 35 59
```

Appendix B: page 6

17
Node: 00-50-49-47-47-59 ---> 02-80-C8-00-00-05
Socket: NCP ---> 0x4003 ═══ NetWare Core Protocol ═══
NCP Reply: Get Big Packet NCP Max Packet Size
Reply Type: 0x3333 (Reply)
Sequence Number: 3
Connection Number Low: 1
Task Number: 1
Connection Number High: 0
Completion Code: 0 (Success)
Connection Status: 0x00
Accepted Max Size: 1500
Echo Socket: 0x4002
Security Flags: 0x00

Packet Number : 18    8:56:10 PM
Length : 1518 bytes
802.3: ═══ IEEE 802.3 Datalink Layer ═══
Station: PIGGY----> 02-80-C8-00-00-05
Length: 1500
ipx: ═══ Internetwork Packet Exchange ═══
Checksum: 0xFFFF
Length: 1500
Hop Count: 0
Packet Type: 17(NCP)
Network: 00 00 34 69    ---> 00 00 03 00
Node: 00-50-49-47-47-59 ---> 02-80-C8-00-00-05
Socket: 0x4002    ---> 0x4006

Node: 50-49-47-47-59-32 ---> 42-45-41-4B-45-52
Socket: NCP ---> 0x40A9 ═══ NetWare Core Protocol ═══
NCP Reply: Get Big Packet NCP Max Packet Size
Reply Type: 0x3333 (Reply)
Sequence Number: 2
Connection Number Low: 2
Task Number: 1
Connection Number High: 0
Completion Code: 0 (Success)
Connection Status: 0x00
Accepted Max Size: 1500
Echo Socket: 0x4002
Security Flags: 0x00

Packet Number : 15    9:08:31 PM
Length : 64 bytes
802.3: ═══ IEEE 802.3 Datalink Layer ═══
Station: BEAKER----> 02-80-C8-00-00-05
Length: 44
ipx: ═══ Internetwork Packet Exchange ═══
Checksum: 0xFFFF
Length: 43
Hop Count: 1
Packet Type: 17(NCP)
Network: 00 00 35 59    ---> 00 00 03 00
Node: 42-45-41-4B-45-52 ---> 02-80-C8-00-00-05
Socket: 0x0001    ---> 0x4003 ═══ NetWare Core Protocol ═══
NCP Reply: Get Big Packet NCP Max Packet Size
Reply Type: 0x3333 (Reply)
Sequence Number: 3
Connection Number Low: 2
Task Number: 1
Connection Number High: 0
Completion Code: 0 (Success)
Connection Status: 0x00
Accepted Max Size: 1500
Echo Socket: 0x4002
Security Flags: 0x00

Packet Number : 24    9:08:31 PM
Length : 1518 bytes
802.3: ═══ IEEE 802.3 Datalink Layer ═══
Station: BEAKER----> 02-80-C8-00-00-05
Length: 1500
ipx: ═══ Internetwork Packet Exchange ═══
Checksum: 0xFFFF
Length: 1500
Hop Count: 0
Packet Type: 17(NCP)
Network: 00 00 35 59    ---> 00 00 03 00
Node: 42-45-41-4B-45-52 ---> 02-80-C8-00-00-05
Socket: 0x4002    ---> 0x4006

Appendix B: page 7 ncp: ──────── NetWare Core Protocol ────────
Unknown type = 0x3
Data:
```
  0: F4 06 70 00 52 09 CC 02 F4 06 70 00 F4 06 70 00 ..p.R.....p...p.
 10: 54 FF 00 F0 9C 7E 00 F0 6F EF 00 F0 9F 2A FB 27 T....~..o....*.'
 20: 5A 18 38 DC 6F EF 00 F0 6F EF 00 F0 6F EF 00 F0 Z.8.o...o...o...
 30: CB 01 3E 17 57 EF 00 F0 F4 06 70 00 D5 16 EA 2D ..>.W.....p....-
 40: 4D F8 00 F0 41 F8 00 F0 FC 17 38 DC 39 E7 00 F0 M...A.....8.9...
 50: D7 18 38 DC 2E E8 00 F0 41 00 10 24 B0 8D 00 F0 ..8.....A..$....
 60: C7 18 38 DC 9C 00 7F 05 EE 06 70 00 53 FF 00 F0 ..8.......p.S...
 70: F6 70 00 F0 22 05 00 00 00 00 00 94 10 16 01 00 .p.."...........
 80: C6 0A BC 24 B1 02 06 15 87 12 C4 3F 55 01 06 15 ...$.......?U...
 90: 15 19 38 DC 5E 19 38 DC BC 10 16 01 67 02 10 24 ..8.^.8.....g..$
 A0: 62 07 70 00 0A 01 10 24 DA 10 16 01 DA 10 16 01 b.p....$........
 B0: DA 10 16 01 3F 01 06 15 85 02 D7 D3 EA D0 10 16 ....?...........
 C0: 01 FF 00 F0 DA 10 16 01 EE 08 FB 27 DA 10 16 01 ...........'....
 D0: DA 10 16 01 DA 10 16 01 DA 10 16 01 DA 10 16 01 ................
 E0: DA 10 16 01 DA 10 16 01 DA 10 16 01 DA 10 16 01 ................
 F0: DA 10 16 01 DA 10 16 01 DA 10 16 01 59 EC 00 F0 ...........Y....
100: B0 FE 00 F0 65 F0 00 F0 53 FF 00 F0 53 FF 00 F0 ....e...S...S...
110: 53 FF 00 F0 B0 FE 00 F0 53 FF 00 F0 53 FF 00 F0 S.......S...S...
120: 53 FF 00 F0 F7 10 01 C6 53 FF 00 F0 53 FF 00 F0 S.......S...S...
130: 53 FF 00 F0 53 FF 00 F0 53 FF 00 F0 53 FF 00 F0 S...S...S...S...
140: 53 FF 00 F0 53 FF 00 F0 53 FF 00 F0 53 FF 00 F0 S...S...S...S...
150: 53 FF 00 F0 53 FF 00 F0 53 FF 00 F0 53 FF 00 F0 S...S...S...S...
160: 53 FF 00 F0 53 FF 00 F0 53 FF 00 F0 53 FF 00 F0 S...S...S...S...
170: 53 FF 00 F0 53 FF 00 F0 53 FF 00 F0 00 00 00 00 S...S...S.......
180: 00 00 00 00 00 00 00 00 00 00 00 00 EE 06 75 18 ..............u.
190: 00 00 00 00 00 00 00 00 B0 02 CC 02 53 FF 00 F0 ............S...
1A0: 53 FF 00 F0 53 FF 00 F0 53 FF 00 F0 53 FF 00 F0 S...S...S...S...
1B0: 53 FF 00 F0 53 FF 00 F0 53 FF 00 F0 EA 96 00 F0 S...S...S.......
1C0: EA FE 00 F0 C0 03 7F 05 6F EF 00 F0 8F 00 DA 2C ........o......,
1D0: F4 FE 00 F0 02 FF 00 F0 6F EF 00 00 00 00 00 00 ........o.......
1E0: 00 00 00 00 EE 06 75 18 00 00 00 00 00 00 00 00 ......u.........
1F0: 00 00 00 00 00 00 00 00 00 00 00 00 00 00 00 00 ................
200: 00 00 00 00 00 00 00 00 00 00 00 00 00 00 00 00 ................
210: 00 00 00 00 00 00 00 00 00 00 00 00 00 00 00 00 ................
220: 00 00 00 00 00 00 00 00 00 00 00 00 00 00 00 00 ................
230: 00 00 00 00 00 00 00 00 00 00 00 00 00 00 00 00 ................
240: 00 00 00 00 00 00 00 00 00 00 00 00 00 00 00 00 ................
250: 00 00 00 00 00 00 00 00 00 00 00 00 00 00 00 00 ................
260: 00 00 00 00 00 00 00 00 00 00 00 00 00 00 00 00 ................
270: 00 00 00 00 00 00 00 00 00 00 00 00 00 00 00 00 ................
280: 00 00 00 00 00 00 00 00 00 00 00 00 00 00 00 00 ................
290: 00 00 00 00 00 00 00 00 00 00 00 00 00 00 00 00 ................
2A0: 00 00 00 00 00 00 00 00 00 00 00 00 00 00 00 00 ................
2B0: 00 00 00 00 00 00 00 00 00 00 00 00 00 00 00 00 ................
2C0: 00 00 00 00 00 00 00 00 00 00 00 00 00 00 00 00 ................
2D0: 00 00 00 00 00 00 00 00 00 00 00 00 00 00 00 00 ................
2E0: 00 00 00 00 00 00 00 00 00 00 00 00 00 00 00 00 ................
2F0: 00 00 00 00 00 00 00 00 00 00 00 00 00 00 00 00 ................
300: 00 00 00 00 00 00 00 00 00 00 00 00 00 00 00 00 ................
310: 00 00 00 00 00 00 00 00 00 00 00 00 00 00 00 00 ................
320: 00 00 00 00 00 00 00 00 00 00 00 00 00 00 00 00 ................
``` ncp: ──────── NetWare Core Protocol ────────
Unknown type = 0x3
Data:
```
  0: F4 06 70 00 52 09 CC 02 F4 06 70 00 F4 06 70 00 ..p.R.....p...p.
 10: 54 FF 00 F0 9C 7E 00 F0 6F EF 00 F0 9F 2A FB 27 T....~..o....*.'
 20: 5A 18 38 DC 6F EF 00 F0 6F EF 00 F0 6F EF 00 F0 Z.8.o...o...o...
 30: CB 01 3E 17 57 EF 00 F0 F4 06 70 00 D5 16 EA 2D ..>.W.....p....-
 40: 4D F8 00 F0 41 F8 00 F0 FC 17 38 DC 39 E7 00 F0 M...A.....8.9...
 50: D7 18 38 DC 2E E8 00 F0 41 00 10 24 B0 8D 00 F0 ..8.....A..$....
 60: C7 18 38 DC 9C 00 7F 05 EE 06 70 00 53 FF 00 F0 ..8.......p.S...
 70: F6 70 00 F0 22 05 00 00 00 00 00 94 10 16 01 00 .p.."...........
 80: C6 0A BC 24 B1 02 06 15 87 12 C4 3F 55 01 06 15 ...$.......?U...
 90: 15 19 38 DC 5E 19 38 DC BC 10 16 01 67 02 10 24 ..8.^.8.....g..$
 A0: 62 07 70 00 0A 01 10 24 DA 10 16 01 DA 10 16 01 b.p....$........
 B0: DA 10 16 01 3F 01 06 15 85 02 D7 D3 EA D0 10 16 ....?...........
 C0: 01 FF 00 F0 DA 10 16 01 EE 08 FB 27 DA 10 16 01 ...........'....
 D0: DA 10 16 01 DA 10 16 01 DA 10 16 01 DA 10 16 01 ................
 E0: DA 10 16 01 DA 10 16 01 DA 10 16 01 DA 10 16 01 ................
 F0: DA 10 16 01 DA 10 16 01 DA 10 16 01 59 EC 00 F0 ...........Y....
100: B0 FE 00 F0 65 F0 00 F0 53 FF 00 F0 53 FF 00 F0 ....e...S...S...
110: 53 FF 00 F0 B0 FE 00 F0 53 FF 00 F0 53 FF 00 F0 S.......S...S...
120: 53 FF 00 F0 F7 10 01 C6 53 FF 00 F0 53 FF 00 F0 S.......S...S...
130: 53 FF 00 F0 53 FF 00 F0 53 FF 00 F0 53 FF 00 F0 S...S...S...S...
140: 53 FF 00 F0 53 FF 00 F0 53 FF 00 F0 53 FF 00 F0 S...S...S...S...
150: 53 FF 00 F0 53 FF 00 F0 53 FF 00 F0 53 FF 00 F0 S...S...S...S...
160: 53 FF 00 F0 53 FF 00 F0 53 FF 00 F0 53 FF 00 F0 S...S...S...S...
170: 53 FF 00 F0 53 FF 00 F0 53 FF 00 F0 00 00 00 00 S...S...S.......
180: 00 00 00 00 00 00 00 00 00 00 00 00 EE 06 75 18 ..............u.
190: 00 00 00 00 00 00 00 00 B0 02 CC 02 53 FF 00 F0 ............S...
1A0: 53 FF 00 F0 53 FF 00 F0 53 FF 00 F0 53 FF 00 F0 S...S...S...S...
1B0: 53 FF 00 F0 53 FF 00 F0 53 FF 00 F0 EA 96 00 F0 S...S...S.......
1C0: EA FE 00 F0 C0 03 7F 05 6F EF 00 F0 8F 00 DA 2C ........o......,
1D0: F4 FE 00 F0 02 FF 00 F0 6F EF 00 00 00 00 00 00 ........o.......
1E0: 00 00 00 00 EE 06 75 18 00 00 00 00 00 00 00 00 ......u.........
1F0: 00 00 00 00 00 00 00 00 00 00 00 00 00 00 00 00 ................
200: 00 00 00 00 00 00 00 00 00 00 00 00 00 00 00 00 ................
210: 00 00 00 00 00 00 00 00 00 00 00 00 00 00 00 00 ................
220: 00 00 00 00 00 00 00 00 00 00 00 00 00 00 00 00 ................
230: 00 00 00 00 00 00 00 00 00 00 00 00 00 00 00 00 ................
240: 00 00 00 00 00 00 00 00 00 00 00 00 00 00 00 00 ................
250: 00 00 00 00 00 00 00 00 00 00 00 00 00 00 00 00 ................
260: 00 00 00 00 00 00 00 00 00 00 00 00 00 00 00 00 ................
270: 00 00 00 00 00 00 00 00 00 00 00 00 00 00 00 00 ................
280: 00 00 00 00 00 00 00 00 00 00 00 00 00 00 00 00 ................
290: 00 00 00 00 00 00 00 00 00 00 00 00 00 00 00 00 ................
2A0: 00 00 00 00 00 00 00 00 00 00 00 00 00 00 00 00 ................
2B0: 00 00 00 00 00 00 00 00 00 00 00 00 00 00 00 00 ................
2C0: 00 00 00 00 00 00 00 00 00 00 00 00 00 00 00 00 ................
2D0: 00 00 00 00 00 00 00 00 00 00 00 00 00 00 00 00 ................
2E0: 00 00 00 00 00 00 00 00 00 00 00 00 00 00 00 00 ................
2F0: 00 00 00 00 00 00 00 00 00 00 00 00 00 00 00 00 ................
300: 00 00 00 00 00 00 00 00 00 00 00 00 00 00 00 00 ................
310: 00 00 00 00 00 00 00 00 00 00 00 00 00 00 00 00 ................
320: 00 00 00 00 00 00 00 00 00 00 00 00 00 00 00 00 ................
```

Appendix B: page 8

Appendix B: page 9

Socket: 0x4002   --> 0x4006
ncp: ──────────── ──────────── NetWare Core Protocol
      Unknown type = 0x4
Data:
```
  0: F4 06 70 00 52 09 CC 02 F4 06 70 00 F4 06 70 00 |.p.R....p...p.
 10: 54 FF 00 F0 9C 7E 00 F0 6F EF 00 F0 9F 2A FB 27 |T....~..o....*.'
 20: 5A 18 38 DC 6F EF 00 F0 6F EF 00 F0 6F EF 00 F0 |Z.8.o...o...o...
 30: CB 01 3E 17 57 EF 00 F0 F4 06 70 00 D5 16 EA 2D |..>.W.....p....-
 40: 4D F8 00 F0 41 F8 00 F0 FC 17 38 DC 39 E7 00 F0 |M...A.....8.9...
 50: D7 18 38 DC 2E E8 00 F0 41 00 10 24 B0 8D 00 F0 |..8.....A..$....
 60: C7 18 38 DC 9C 00 7F 05 EE 06 70 00 53 FF 00 F0 |..8.......p.S...
 70: F6 70 00 F0 22 05 00 00 00 00 00 94 10 16 01 00 |.p.."...........
 80: C6 0A BC 24 BI 02 06 15 87 12 C4 3F 55 01 06 15 |...$.......?U...
 90: 15 19 38 DC 5E 19 38 DC 10 16 01 67 02 10 24 18 |..8.^.8....g..$.
 A0: 62 07 70 00 0A 01 10 24 DA 10 16 01 DA 10 16 01 |b.p....$........
 B0: DA 10 16 01 3F 01 06 15 85 02 D7 D3 EA D0 10 16 |....?...........
 C0: 01 FF 00 F0 DA 10 16 01 EE 08 FB 27 DA 10 16 01 |...........'....
 D0: DA 10 16 01 DA 10 16 01 DA 10 16 01 DA 10 16 01 |................
 E0: DA 10 16 01 DA 10 16 01 DA 10 16 01 DA 10 16 01 |................
 F0: DA 10 16 01 DA 10 16 01 DA 10 16 01 59 EC 00 F0 |...........Y...
100: B0 FE 00 F0 65 F0 00 F0 53 FF 00 F0 53 FF 00 F0 |....e...S...S...
110: 53 FF 00 F0 B0 FE 00 F0 53 FF 00 F0 53 FF 00 F0 |S.......S...S...
120: 53 FF 00 F0 53 FF 00 F0 F7 10 01 C6 53 FF 00 F0 |S...S.......S...
130: 53 FF 00 F0 53 FF 00 F0 53 FF 00 F0 53 FF 00 F0 |S...S...S...S...
140: 53 FF 00 F0 53 FF 00 F0 53 FF 00 F0 53 FF 00 F0 |S...S...S...S...
150: 53 FF 00 F0 53 FF 00 F0 53 FF 00 F0 53 FF 00 F0 |S...S...S...S...
160: 53 FF 00 F0 53 FF 00 F0 53 FF 00 F0 53 FF 00 F0 |S...S...S...S...
170: 53 FF 00 F0 53 FF 00 F0 53 FF 00 F0 00 00 00 00 |S...S...S.......
180: 00 00 00 00 00 00 00 00 00 00 00 00 EE 06 75 18 |..............u.
190: 00 00 00 00 00 00 00 00 B0 02 CC 02 53 FF 00 F0 |............S...
1A0: 53 FF 00 F0 53 FF 00 F0 53 FF 00 F0 53 FF 00 F0 |S...S...S...S...
1B0: 53 FF 00 F0 53 FF 00 F0 EA 96 00 F0 00 DA 2C 01 |S...S.........,.
1C0: EA FE 00 F0 C0 03 7F 05 6F EF 00 F0 8F 00 F0 00 |........o.......
1D0: F4 FE 00 F0 02 FF 00 F0 6F EF 00 F0 00 00 00 00 |........o.......
1E0: 00 00 00 00 EE 06 75 18 00 00 00 00 00 00 00 00 |......u.........
1F0: 00 00 00 00 00 00 00 00 00 00 00 00 00 00 00 00 |................
200: 00 00 00 00 00 00 00 00 00 00 00 00 00 00 00 00 |................
210: 00 00 00 00 00 00 00 00 00 00 00 00 00 00 00 00 |................
220: 00 00 00 00 00 00 00 00 00 00 00 00 00 00 00 00 |................
230: 00 00 00 00 00 00 00 00 00 00 00 00 00 00 00 00 |................
240: 00 00 00 00 00 00 00 00 00 00 00 00 00 00 00 00 |................
250: 00 00 00 00 00 00 00 00 00 00 00 00 00 00 00 00 |................
260: 00 00 00 00 00 00 00 00 00 00 00 00 00 00 00 00 |................
270: 00 00 00 00 00 00 00 00 00 00 00 00 00 00 00 00 |................
280: 00 00 00 00 00 00 00 00 00 00 00 00 00 00 00 00 |................
290: 00 00 00 00 00 00 00 00 00 00 00 00 00 00 00 00 |................
2A0: 00 00 00 00 00 00 00 00 00 00 00 00 00 00 00 00 |................
2B0: 00 00 00 00 00 00 00 00 00 00 00 00 00 00 00 00 |................
2C0: 00 00 00 00 00 00 00 00 00 00 00 00 00 00 00 00 |................
2D0: 00 00 00 00 00 00 00 00 00 00 00 00 00 00 00 00 |................
2E0: 00 00 00 00 00 00 00 00 00 00 00 00 00 00 00 00 |................
2F0: 00 00 00 00 00 00 00 00 00 00 00 00 00 00 00 00 |................
300: 00 00 00 00 00 00 00 00 00 00 00 00 00 00 00 00 |................
310: 00 00 00 00 00 00 00 00 00 00 00 00 00 00 00 00 |................
```

Socket: 0x4002   --> 0x4006
ncp: ──────────── ──────────── NetWare Core Protocol
      Unknown type = 0x4
Data:
```
  0: F4 06 70 00 52 09 CC 02 F4 06 70 00 F4 06 70 00 |.p.R....p...p.
 10: 54 FF 00 F0 9C 7E 00 F0 6F EF 00 F0 9F 2A FB 27 |T....~..o....*.'
 20: 5A 18 38 DC 6F EF 00 F0 6F EF 00 F0 6F EF 00 F0 |Z.8.o...o...o...
 30: CB 01 3E 17 57 EF 00 F0 F4 06 70 00 D5 16 EA 2D |..>.W.....p....-
 40: 4D F8 00 F0 41 F8 00 F0 FC 17 38 DC 39 E7 00 F0 |M...A.....8.9...
 50: D7 18 38 DC 2E E8 00 F0 41 00 10 24 B0 8D 00 F0 |..8.....A..$....
 60: C7 18 38 DC 9C 00 7F 05 EE 06 70 00 53 FF 00 F0 |..8.......p.S...
 70: F6 70 00 F0 22 05 00 00 00 00 00 94 10 16 01 00 |.p.."...........
 80: C6 0A BC 24 BI 02 06 15 87 12 C4 3F 55 01 06 15 |...$.......?U...
 90: 15 19 38 DC 5E 19 38 DC 10 16 01 67 02 10 24 18 |..8.^.8....g..$.
 A0: 62 07 70 00 0A 01 10 24 DA 10 16 01 DA 10 16 01 |b.p....$........
 B0: DA 10 16 01 3F 01 06 15 85 02 D7 D3 EA D0 10 16 |....?...........
 C0: 01 FF 00 F0 DA 10 16 01 EE 08 FB 27 DA 10 16 01 |...........'....
 D0: DA 10 16 01 DA 10 16 01 DA 10 16 01 DA 10 16 01 |................
 E0: DA 10 16 01 DA 10 16 01 DA 10 16 01 DA 10 16 01 |................
 F0: DA 10 16 01 DA 10 16 01 DA 10 16 01 59 EC 00 F0 |...........Y...
100: B0 FE 00 F0 65 F0 00 F0 53 FF 00 F0 53 FF 00 F0 |....e...S...S...
110: 53 FF 00 F0 B0 FE 00 F0 53 FF 00 F0 53 FF 00 F0 |S.......S...S...
120: 53 FF 00 F0 53 FF 00 F0 F7 10 01 C6 53 FF 00 F0 |S...S.......S...
130: 53 FF 00 F0 53 FF 00 F0 53 FF 00 F0 53 FF 00 F0 |S...S...S...S...
140: 53 FF 00 F0 53 FF 00 F0 53 FF 00 F0 53 FF 00 F0 |S...S...S...S...
150: 53 FF 00 F0 53 FF 00 F0 53 FF 00 F0 53 FF 00 F0 |S...S...S...S...
160: 53 FF 00 F0 53 FF 00 F0 53 FF 00 F0 53 FF 00 F0 |S...S...S...S...
170: 53 FF 00 F0 53 FF 00 F0 53 FF 00 F0 00 00 00 00 |S...S...S.......
180: 00 00 00 00 00 00 00 00 00 00 00 00 EE 06 75 18 |..............u.
190: 00 00 00 00 00 00 00 00 B0 02 CC 02 53 FF 00 F0 |............S...
1A0: 53 FF 00 F0 53 FF 00 F0 53 FF 00 F0 53 FF 00 F0 |S...S...S...S...
1B0: 53 FF 00 F0 53 FF 00 F0 EA 96 00 F0 00 DA 2C 01 |S...S.........,.
1C0: EA FE 00 F0 C0 03 7F 05 6F EF 00 F0 8F 00 F0 00 |........o.......
1D0: F4 FE 00 F0 02 FF 00 F0 6F EF 00 F0 00 00 00 00 |........o.......
1E0: 00 00 00 00 EE 06 75 18 00 00 00 00 00 00 00 00 |......u.........
1F0: 00 00 00 00 00 00 00 00 00 00 00 00 00 00 00 00 |................
200: 00 00 00 00 00 00 00 00 00 00 00 00 00 00 00 00 |................
210: 00 00 00 00 00 00 00 00 00 00 00 00 00 00 00 00 |................
220: 00 00 00 00 00 00 00 00 00 00 00 00 00 00 00 00 |................
230: 00 00 00 00 00 00 00 00 00 00 00 00 00 00 00 00 |................
240: 00 00 00 00 00 00 00 00 00 00 00 00 00 00 00 00 |................
250: 00 00 00 00 00 00 00 00 00 00 00 00 00 00 00 00 |................
260: 00 00 00 00 00 00 00 00 00 00 00 00 00 00 00 00 |................
270: 00 00 00 00 00 00 00 00 00 00 00 00 00 00 00 00 |................
280: 00 00 00 00 00 00 00 00 00 00 00 00 00 00 00 00 |................
290: 00 00 00 00 00 00 00 00 00 00 00 00 00 00 00 00 |................
2A0: 00 00 00 00 00 00 00 00 00 00 00 00 00 00 00 00 |................
2B0: 00 00 00 00 00 00 00 00 00 00 00 00 00 00 00 00 |................
2C0: 00 00 00 00 00 00 00 00 00 00 00 00 00 00 00 00 |................
2D0: 00 00 00 00 00 00 00 00 00 00 00 00 00 00 00 00 |................
2E0: 00 00 00 00 00 00 00 00 00 00 00 00 00 00 00 00 |................
2F0: 00 00 00 00 00 00 00 00 00 00 00 00 00 00 00 00 |................
300: 00 00 00 00 00 00 00 00 00 00 00 00 00 00 00 00 |................
310: 00 00 00 00 00 00 00 00 00 00 00 00 00 00 00 00 |................
```

Appendix B: page 10

```
320: 00 00 00 00 00 00 00 00 00 00 00 00 00 00 00 00  |................|
330: 00 00 00 00 00 00 00 00 00 00 00 00 00 00 00 00  |................|
340: 00 00 00 00 00 00 00 00 00 00 00 00 00 00 00 00  |................|
350: 00 00 00 00 00 00 00 00 00 00 00 00 00 00 00 00  |................|
360: 00 00 00 00 00 00 00 00 00 00 00 00 00 00 00 00  |................|
370: 00 00 00 00 00 00 00 00 00 00 00 00 00 00 00 00  |................|
380: 00 00 00 00 00 00 00 00 00 00 4B FF 00 F0 4B FF  |..........K...K.|
390: 00 00 00 00 00 00 00 30 80 C9 93 00 00 19 FF 19 FF  |.......0........|
3A0: 00 F0 82 02 00 00 30 FF C9 93 00 F0 00 00 DA 6F  |......0........o|
3B0: 00 F0 46 02 00 00 20 FF C9 93 00 F0 00 00 DA 6F  |..F...  .......o|
3C0: 18 6E 4B 6C 50 00 FF 05 50 00 50 BF 46 00 77 06  |.nKlP...P.P.F.w.|
3D0: 06 02 00 7C EE 34 01 00 18 6C 32 7E 00 00 50 D1  |...|.4...l2~..P.|
3E0: 32 FF 00 00 78 03 33 00 A5 04 00 F0 02 02 23 00  |2...x.3.......#.|
3F0: 88 13 00 00 F2 7D 31 03 00 F0 46 02 F8 03 00 00  |.....}1...F.....|
400: 00 00 00 00 78 03 BC 03 C4 03 27 C2 00 80        |....x.....'...|
410: 02 00 00 A0 00 00 32 00 32 00 2F 35 61 1E 64 20  |......2.2./5a.d |
420: 6D 32 69 17 6E 31 20 39 2F 35 62 30 0D 1C 20 39  |m2i.n1 9/5b0. 9 |
430: 70 19 69 17 67 22 67 22 79 15 00 00 01 80 00     |p.i.g"g"y......|

460: 03 29 00 76 07 06 1A 00 CF 52 0D 00 00 00 00 00  |.).v.....R......|
470: 00 01 80 00 14 14 14 34 01 01 01 01 1E 00 3E 00  |.......4......>.|
480: 18 13 00 60 09 13 0D 00 50 01 00 07 0F 07 00 00  |...`....P.......|
490: 00 00 00 10 12 B2 07 27 1F 70 F7 FF FF 01 00 00  |.......'.p......|
500: 00 00 00 20 20 53 59 53 27 00 00 00 00 00 00 00  |   SYS'........|
510: 00 00 00 88 E8 1A 02 00 56 9F 00 00 4D 53 DF 02  |........V...MS..|
520: 25 02 26 1B FF 6C F6 0F 08 00 00 00 00 00 00 00  |%.&..l..........|
530: 00 00 00 6A 1A 0C 00 FA 94 00 00 33 38 36 53     |...j.......386S|
540: 50 41 52 54 50 41 52 52 26 00 00 00 00 00 00 PARTPAR&
550: 00 00 00 36 79 12 1D F5 AA 00 10 77 01 7E 30 32  |...6y......w.~02|
560: 36 36 31 30 44 4F 43 20 00 00 00 00 00 00 6610DOC
570: 00 00 93 5B 59 1B 00 C4 6C 00 00                 |...[Y...l..|
```

Packet Number : 26        9:08:32 PM
Length : 64 bytes
802.3:                    IEEE 802.3 Datalink Layer
  Station: 02-80-C8-00-00-05----> BEAKER
  Length: 42
ipx:                      Internetwork Packet Exchange
  Checksum: 0xFFFF
  Length: 41
  Hop Count: 0
  Packet Type: 17(NCP)
  Network: 00 00 03 00        --> 00 00 35 59
  Node: 02-80-C8-00-00-05     --> 42-45-41-4B-45-52
  Socket: 0x4003              --> 0x0001
ncp:                      NetWare Core Protocol
  NCP Request: Ping for NDS Packet Number : 20        8:56:10 PM
Length : 64 bytes
802.3:                    IEEE 802.3 Datalink Layer
  Station: 02-80-C8-00-00-05----> PIGGY
  Length: 42
ipx:                      Internetwork Packet Exchange
  Checksum: 0xFFFF
  Length: 41
  Hop Count: 0
  Packet Type: 17(NCP)
  Network: 00 00 03 00        --> 00 00 34 69
  Node: 02-80-C8-00-00-05     --> 00-50-49-47-47-59
  Socket: 0x4003              --> NCP
ncp:                      NetWare Core Protocol
  NCP Request: Ping for NDS Appendix B: page 11

```
Request Type: 0x2222 (Request)
Sequence Number: 4
Connection Number Low: 1
Task Number: 2
Connection Number High: 0
Function Code: 104
Subfunction Code: 1

Packet Number : 21      8:56:10 PM
Length : 156 bytes
802.3: ========== IEEE 802.3 Datalink Layer ==========
    Station: PIGGY---> 02-80-C8-00-00-05
    Length: 138
ipx: ========== Internetwork Packet Exchange ==========
    Checksum: 0xFFFF
    Length: 138
    Hop Count: 0
    Packet Type: 17(NCP)
    Network: 00 00 34 69        ---> 00 00 03 00
    Node:    00-50-49-47-47-59 ---> 02-80-C8-00-00-05
    Socket: NCP                 ---> 0x4003
ncp: ========== NetWare Core Protocol ==========
    NCP Reply:
    Reply Type: 0x3333 (Reply)
    Sequence Number: 4
    Connection Number Low: 1
    Task Number: 1
    Connection Number High: 0
    Completion Code: 0 (Success)
    Connection Status: 0x00
    Version: 9

Request Type: 0x2222 (Request)
Sequence Number: 4
Connection Number Low: 2
Task Number: 2
Connection Number High: 0
Function Code: 104
Subfunction Code: 1

Packet Number : 27      9:08:32 PM
Length : 64 bytes
802.3: ========== IEEE 802.3 Datalink Layer ==========
    Station: BEAKER---> PIGGY2
    Length: 42
ipx: ========== Internetwork Packet Exchange ==========
    Checksum: 0xFFFF
    Length: 41
    Hop Count: 1
    Packet Type: 17(NCP)
    Network: 00 00 35 59        ---> 00 00 34 69
    Node:    42-45-41-4B-45-52 ---> 50-49-47-47-59-32
    Socket: 0x40A9              ---> NCP
ncp: ========== NetWare Core Protocol ==========
    NCP Request: Ping for NDS
    Request Type: 0x2222 (Request)
    Sequence Number: 3
    Connection Number Low: 2
    Task Number: 2
    Connection Number High: 0
    Function Code: 104
    Subfunction Code: 1

Packet Number : 28      9:08:32 PM
Length : 156 bytes
802.3: ========== IEEE 802.3 Datalink Layer ==========
    Station: PIGGY2---> BEAKER
    Length: 138
ipx: ========== Internetwork Packet Exchange ==========
    Checksum: 0xFFFF
    Length: 138
    Hop Count: 0
    Packet Type: 17(NCP)
    Network: 00 00 34 69        ---> 00 00 35 59
    Node:    50-49-47-47-59-32 ---> 42-45-41-4B-45-52
    Socket: NCP                 ---> 0x40A9
ncp: ========== NetWare Core Protocol ==========
    NCP Reply:
    Reply Type: 0x3333 (Reply)
    Sequence Number: 3
    Connection Number Low: 2
    Task Number: 1
    Connection Number High: 0
    Completion Code: 0 (Success)
    Connection Status: 0x00
    Version: 9
```

Appendix B: page 12

Tree Name:
OUT OF DATA. DECODE ABORTED.
Data:
```
 0: 21 00 00 00 50 49 47 47 59 5F 44 53 5F 5F 5F 5F  !...PIGGY_DS____
10: 5F 5F 5F 5F 5F 5F 5F 5F 5F 5F 5F 5F 5F 5F 5F 5F  _____
20: 5F 5F 5F 5F 5F 00 00 00 00 00 00 00 22 01 00 00
30: 00 00 00 00 00 00 00 00 00 00 00 00 00 00 00 00
40: 00 00 00 00 00 00 00 00 00 00 00 00 00 00 00 00
50: 00 00 00 00 00 00 00 00 00 00 00 00 00 00 00 00
```

Packet Number : 29      Length : 156 bytes      9:08:32 PM
802.3: ============================ IEEE 802.3 Datalink Layer ============================
       Station: BEAKER-----> 02-80-C8-00-00-05
       Length: 138
ipx: ============================ Internetwork Packet Exchange ============================
     Checksum: 0xFFFF
     Length: 138
     Hop Count: 1
     Packet Type: 17(NCP)
     Network: 00 00 35 59                --> 00 00 03 00
     Node:    42-45-41-4B-45-52         --> 02-80-C8-00-00-05
     Socket:  0x0001                    --> 0x4003
ncp: ============================ NetWare Core Protocol ============================
     NCP Reply:
     Reply Type: 0x3333 (Reply)
     Sequence Number: 4
     Connection Number Low: 2
     Task Number: 1
     Connection Number High: 0
     Completion Code: 0 (Success)
     Connection Status: 0x00
     Version: 9
     Tree Name:
     OUT OF DATA. DECODE ABORTED.
Data:
```
 0: 21 00 00 00 50 49 47 47 59 5F 44 53 5F 5F 5F 5F  !...PIGGY_DS____
10: 5F 5F 5F 5F 5F 5F 5F 5F 5F 5F 5F 5F 5F 5F 5F 5F  _____
20: 5F 5F 5F 5F 5F 00 00 00 00 00 00 00 22 01 00 00
30: 00 00 00 00 00 00 00 00 00 00 00 00 00 00 00 00
40: 00 00 00 00 00 00 00 00 00 00 00 00 00 00 00 00
50: 00 00 00 00 00 00 00 00 00 00 00 00 00 00 00 00
```

Packet Number : 30      Length : 64 bytes      9:08:32 PM
802.3: ============================ IEEE 802.3 Datalink Layer ============================
       Station: 02-80-C8-00-00-05-----> BEAKER
       Length: 38
ipx: ============================ Internetwork Packet Exchange ============================
     Checksum: 0xFFFF
     Length: 37
     Hop Count: 0
     Packet Type: 17(NCP)
     Network: 00 00 03 00                --> 00 00 35 59

Tree Name:
OUT OF DATA. DECODE ABORTED.
Data:
```
 0: 21 00 00 00 50 49 47 47 59 5F 44 53 5F 5F 5F 5F  !...PIGGY_DS____
10: 5F 5F 5F 5F 5F 5F 5F 5F 5F 5F 5F 5F 5F 5F 5F 5F  _____
20: 5F 5F 5F 5F 5F 00 00 00 00 00 00 00 22 01 00 00
30: 00 00 00 00 00 00 00 00 00 00 00 00 00 00 00 00
40: 00 00 00 00 00 00 00 00 00 00 00 00 00 00 00 00
50: 00 00 00 00 00 00 00 00 00 00 00 00 00 00 00 00
```

Packet Number : 22      Length : 64 bytes      8:56:10 PM
802.3: ============================ IEEE 802.3 Datalink Layer ============================
       Station: 02-80-C8-00-00-05-----> PIGGY
       Length: 38
ipx: ============================ Internetwork Packet Exchange ============================
     Checksum: 0xFFFF
     Length: 37
     Hop Count: 0
     Packet Type: 17(NCP)
     Network: 00 00 03 00                --> 00 00 34 69

Appendix B: page 13

```
Node:  02-80-C8-00-00-05 ---> 00-50-49-47-47-59
Socket: 0x4003            ---> NCP                = NetWare Core Protocol ncp:  NCP Request: Logout
      Request Type: 0x2222 (Request)
      Sequence Number: 5
      Connection Number Low: 1
      Task Number: 2
      Connection Number High: 0
      Function Code: 25
```

```
22   Packet Number : 23      8:56:10 PM
     Length : 64 bytes
802.3: = IEEE 802.3 Datalink Layer =
     Station: PIGGY---> 02-80-C8-00-00-05
     Length: 38
ipx: = Internetwork Packet Exchange =
     Checksum: 0xFFFF
     Length: 38
     Hop Count: 0
     Packet Type: 17(NCP)
     Network: 00 00 34 69    ---> 00 00 03 00
     Node: 00-50-49-47-47-59 ---> 02-80-C8-00-00-05
     Socket: NCP             ---> 0x4003
ncp: = NetWare Core Protocol =
     NCP Reply: Logout
     Reply Type: 0x3333 (Reply)
     Sequence Number: 5
     Connection Number Low: 1
     Task Number: 1
     Connection Number High: 0
     Completion Code: 0 (Success)
```

```
Node:  02-80-C8-00-00-05 ---> 42-45-41-4B-45-52
Socket: 0x4003            ---> 0x0001           = NetWare Core Protocol ncp:  NCP Request: Logout
      Request Type: 0x2222 (Request)
      Sequence Number: 5
      Connection Number Low: 2
      Task Number: 2
      Connection Number High: 0
      Function Code: 25
```

```
Packet Number : 31       9:08:32 PM
Length : 64 bytes
802.3: = IEEE 802.3 Datalink Layer =
     Station: BEAKER---> PIGGY2
     Length: 38
ipx: = Internetwork Packet Exchange =
     Checksum: 0xFFFF
     Length: 37
     Hop Count: 1
     Packet Type: 17(NCP)
     Network: 00 00 35 59    ---> 00 00 34 69
     Node: 42-45-41-4B-45-52 ---> 50-49-47-47-59-32
     Socket: 0x40A9          ---> NCP
ncp: = NetWare Core Protocol =
     NCP Request: Logout
     Request Type: 0x2222 (Request)
     Sequence Number: 4
     Connection Number Low: 2
     Task Number: 2
     Connection Number High: 0
     Function Code: 25
```

```
Packet Number : 32       9:08:32 PM
Length : 64 bytes
802.3: = IEEE 802.3 Datalink Layer =
     Station: PIGGY2---> BEAKER
     Length: 38
ipx: = Internetwork Packet Exchange =
     Checksum: 0xFFFF
     Length: 38
     Hop Count: 0
     Packet Type: 17(NCP)
     Network: 00 00 34 69    ---> 00 00 35 59
     Node: 50-49-47-47-59-32 ---> 42-45-41-4B-45-52
     Socket: NCP             ---> 0x40A9
ncp: = NetWare Core Protocol =
     NCP Reply: Logout
     Reply Type: 0x3333 (Reply)
     Sequence Number: 4
     Connection Number Low: 2
     Task Number: 1
     Connection Number High: 0
     Completion Code: 0 (Success)
```

Appendix B: page 14

Connection Status: 0x00

```
Packet Number : 33        9:08:32 PM
Length : 64 bytes
802.3: ========== IEEE 802.3 Datalink Layer ==========
       Station: BEAKER---> 02-80-C8-00-00-05
       Length: 38
ipx: ========== Internetwork Packet Exchange ==========
       Checksum: 0xFFFF
       Length: 38
       Hop Count: 1
       Packet Type: 17(NCP)
       Network: 00 00 35 59        --> 00 00 03 00
       Node:    42-45-41-4B-45-52 --> 02-80-C8-00-00-05
       Socket:  0x0001             --> 0x4003
ncp: ========== NetWare Core Protocol ==========
       NCP Reply: Logout
       Reply Type: 0x3333 (Reply)
       Sequence Number: 5
       Connection Number Low: 2
       Task Number: 1
       Connection Number High: 0
       Completion Code: 0 (Success)
       Connection Status: 0x00
```

```
Packet Number : 34        9:08:32 PM
Length : 64 bytes
802.3: ========== IEEE 802.3 Datalink Layer ==========
       Station: 02-80-C8-00-00-05---> BEAKER
       Length: 42
ipx: ========== Internetwork Packet Exchange ==========
       Checksum: 0xFFFF
       Length: 41
       Hop Count: 0
       Packet Type: 17(NCP)
       Network: 00 00 03 00        --> 00 00 35 59
       Node:    02-80-C8-00-00-05 --> 42-45-41-4B-45-52
       Socket:  0x4003             --> 0x0001
ncp: ========== NetWare Core Protocol ==========
       NCP Request: Get Directory Path
       Request Type: 0x2222 (Request)
       Sequence Number: 6
       Connection Number Low: 2
       Task Number: 2
       Connection Number High: 0
       Function Code: 22
       Subfunction Length: 2 bytes
       Subfunction Code: 1
       Target Directory Handle: 0x01
```

```
Packet Number : 35        9:08:32 PM
Length : 64 bytes
802.3: ========== IEEE 802.3 Datalink Layer ==========
       Station: BEAKER---> PIGGY2
```

```
Packet Number : 24        8:56:10 PM
Length : 64 bytes
802.3: ========== IEEE 802.3 Datalink Layer ==========
       Station: 02-80-C8-00-00-05---> PIGGY
       Length: 42
ipx: ========== Internetwork Packet Exchange ==========
       Checksum: 0xFFFF
       Length: 41
       Hop Count: 0
       Packet Type: 17(NCP)
       Network: 00 00 03 00        --> 00 00 34 69
       Node:    02-80-C8-00-00-05 --> 00-50-49-47-47-59
       Socket:  0x4003             --> NCP
ncp: ========== NetWare Core Protocol ==========
       NCP Request: Get Directory Path
       Request Type: 0x2222 (Request)
       Sequence Number: 6
       Connection Number Low: 1
       Task Number: 2
       Connection Number High: 0
       Function Code: 22
       Subfunction Length: 2 bytes
       Subfunction Code: 1
       Target Directory Handle: 0x01
```

Appendix B: page 15

```
Packet Number : 25      8:56:10 PM
Length : 66 bytes
802.3: ════════════════ IEEE 802.3 Datalink Layer ════════════════
       Station: PIGGY----> 02-80-C8-00-00-05
       Length: 48
ipx:   ════════════════ Internetwork Packet Exchange ════════════════
       Checksum: 0xFFFF
       Length: 48
       Hop Count: 0
       Packet Type: 17(NCP)
       Network: 00 00 34 69       --> 00 00 03 00
       Node:    00-50-49-47-47-59 --> 02-80-C8-00-00-05
       Socket:  NCP               --> 0x4003
ncp:   ════════════════ NetWare Core Protocol ════════════════
       NCP Reply: Get Directory Path
       Reply Type: 0x3333 (Reply)
       Sequence Number: 6
       Connection Number Low: 1
       Task Number: 1
       Connection Number High: 0
       Completion Code: 0 (Success)
       Connection Status: 0x00
       Directory Path: Length: 9
                      Value : SYS:LOGIN
```

```
                                                   Length: 42
ipx:   ════════════════ Internetwork Packet Exchange ════════════════
       Checksum: 0xFFFF
       Length: 41
       Hop Count: 1
       Packet Type: 17(NCP)
       Network: 00 00 35 59       --> 00 00 34 69
       Node:    42-45-41-4B-45-52 --> 50-49-47-47-59-32
       Socket:  0x40A9            --> NCP
ncp:   ════════════════ NetWare Core Protocol ════════════════
       NCP Request: Get Directory Path
       Request Type: 0x2222 (Request)
       Sequence Number: 5
       Connection Number Low: 2
       Task Number: 2
       Connection Number High: 0
       Function Code: 22
       Subfunction Length: 2 bytes
       Subfunction Code: 1
       Target Directory Handle: 0x01

Packet Number : 36      9:08:32 PM
Length : 66 bytes
802.3: ════════════════ IEEE 802.3 Datalink Layer ════════════════
       Station: PIGGY2----> BEAKER
       Length: 48
ipx:   ════════════════ Internetwork Packet Exchange ════════════════
       Checksum: 0xFFFF
       Length: 48
       Hop Count: 0
       Packet Type: 17(NCP)
       Network: 00 00 34 69       --> 00 00 35 59
       Node:    50-49-47-47-59-32 --> 42-45-41-4B-45-52
       Socket:  NCP               --> 0x40A9
ncp:   ════════════════ NetWare Core Protocol ════════════════
       NCP Reply: Get Directory Path
       Reply Type: 0x3333 (Reply)
       Sequence Number: 5
       Connection Number Low: 2
       Task Number: 1
       Connection Number High: 0
       Completion Code: 0 (Success)
       Connection Status: 0x00
       Directory Path: Length: 9
                      Value : SYS:LOGIN Packet Number : 37      9:08:32 PM
Length : 66 bytes
802.3: ════════════════ IEEE 802.3 Datalink Layer ════════════════
       Station: BEAKER----> 02-80-C8-00-00-05
       Length: 48
ipx:   ════════════════ Internetwork Packet Exchange ════════════════
       Checksum: 0xFFFF
       Length: 48
```

Appendix B: page 16

Packet Number : 30    8:56:11 PM
Length : 64 bytes
802.3: ══════════ IEEE 802.3 Datalink Layer ══════════
       Station: 02-80-C8-00-00-05-----> PIGGY
       Length: 42
ipx:   ══════════ Internetwork Packet Exchange ══════════
       Checksum: 0xFFFF
       Length: 41
       Hop Count: 0
       Packet Type: 17(NCP)
       Network: 00 00 03 00      --> 00 00 34 69
       Node:  02-80-C8-00-00-05 --> 00-50-49-47-47-59
       Socket: 0x4003            --> NCP
ncp:   ══════════ NetWare Core Protocol ══════════
       NCP Request: Deallocate Directory Handle
       Request Type: 0x2222 (Request)
       Sequence Number: 9
       Connection Number Low: 1
       Task Number: 2
       Connection Number High: 0
       Function Code: 22
       Subfunction Length: 2 bytes
       Subfunction Code: 20
       Directory Handle: 0x01

Hop Count: 1
       Packet Type: 17(NCP)
       Network: 00 00 35 59      --> 00 00 03 00
       Node:  42-45-41-4B-45-52 --> 02-80-C8-00-00-05
       Socket: 0x0001            --> 0x4003
ncp:   ══════════ NetWare Core Protocol ══════════
       NCP Reply: Get Directory Path
       Reply Type: 0x3333 (Reply)
       Sequence Number: 6
       Connection Number Low: 2
       Task Number: 1
       Connection Number High: 0
       Completion Code: 0 (Success)
       Connection Status: 0x00
       Directory Path: Length: 9
                       Value : SYS:LOGIN Packet Number : 46    9:08:32 PM
Length : 64 bytes
802.3: ══════════ IEEE 802.3 Datalink Layer ══════════
       Station: 02-80-C8-00-00-05-----> BEAKER
       Length: 42
ipx:   ══════════ Internetwork Packet Exchange ══════════
       Checksum: 0xFFFF
       Length: 41
       Hop Count: 0
       Packet Type: 17(NCP)
       Network: 00 00 03 00      --> 00 00 35 59
       Node:  02-80-C8-00-00-05 --> 42-45-41-4B-45-52
       Socket: 0x4003            --> 0x0001
ncp:   ══════════ NetWare Core Protocol ══════════
       NCP Request: Deallocate Directory Handle
       Request Type: 0x2222 (Request)
       Sequence Number: 9
       Connection Number Low: 2
       Task Number: 2
       Connection Number High: 0
       Function Code: 22
       Subfunction Length: 2 bytes
       Subfunction Code: 20
       Directory Handle: 0x01

Packet Number : 47    9:08:32 PM
Length : 64 bytes
802.3: ══════════ IEEE 802.3 Datalink Layer ══════════
       Station: BEAKER-----> PIGGY2
       Length: 42
ipx:   ══════════ Internetwork Packet Exchange ══════════
       Checksum: 0xFFFF
       Length: 41
       Hop Count: 1
       Packet Type: 17(NCP)
       Network: 00 00 35 59      --> 00 00 34 69
       Node:  42-45-41-4B-45-52 --> 50-49-47-47-59-32

Appendix B: page 17

```
                                        Socket: 0x40A9              --> NCP
                                   ncp: ═══════════════════════ NetWare Core Protocol ═══════════════════════
                                        NCP Request: Deallocate Directory Handle
                                        Request Type: 0x2222 (Request)
                                        Sequence Number: 8
                                        Connection Number Low: 2
                                        Task Number: 2
                                        Connection Number High: 0
                                        Function Code: 22
                                        Subfunction Length: 2 bytes
                                        Subfunction Code: 20
                                        Directory Handle: 0x01

Packet Number : 48    9:08:32 PM
                                        Length : 64 bytes
                                   802.3: ═══════════════════════ IEEE 802.3 Datalink Layer ═══════════════════
                                        Station: PIGGY2-----> BEAKER
                                        Length: 38
                                   ipx: ═══════════════════════ Internetwork Packet Exchange ═══════════════
                                        Checksum: 0xFFFF
                                        Length: 38
                                        Hop Count: 0
                                        Packet Type: 17(NCP)
                                        Network: 00 00 34 69       --> 00 00 35 59
                                        Node:    50-49-47-47-59-32 --> 42-45-41-4B-45-52
                                        Socket:  NCP               --> 0x40A9
                                   ncp: ═══════════════════════ NetWare Core Protocol ═══════════════════════
                                        NCP Reply: Deallocate Directory Handle
                                        Reply Type: 0x3333 (Reply)
                                        Sequence Number: 8
                                        Connection Number Low: 2
                                        Task Number: 1
                                        Connection Number High: 0
                                        Completion Code: 0 (Success)
                                        Connection Status: 0x00

Packet Number : 49    9:08:32 PM
                                        Length : 64 bytes
                                   802.3: ═══════════════════════ IEEE 802.3 Datalink Layer ═══════════════════
                                        Station: BEAKER-----> 02-80-C8-00-00-05
                                        Length: 38
                                   ipx: ═══════════════════════ Internetwork Packet Exchange ═══════════════
                                        Checksum: 0xFFFF
                                        Length: 38
                                        Hop Count: 1
                                        Packet Type: 17(NCP)
                                        Network: 00 00 35 59       --> 00 00 03 00
                                        Node:    42-45-41-4B-45-52 --> 02-80-C8-00-00-05
                                        Socket:  0x0001            --> 0x4003
                                   ncp: ═══════════════════════ NetWare Core Protocol ═══════════════════════
                                        NCP Reply: Deallocate Directory Handle
                                        Reply Type: 0x3333 (Reply)
                                        Sequence Number: 9
                                        Connection Number Low: 2
```

Packet Number : 31    8:56:11 PM
Length : 64 bytes
802.3: ═══════════════════════ IEEE 802.3 Datalink Layer ═══════════════════
Station: PIGGY-----> 02-80-C8-00-00-05
Length: 38
ipx: ═══════════════════════ Internetwork Packet Exchange ═══════════════
Checksum: 0xFFFF
Length: 38
Hop Count: 0
Packet Type: 17(NCP)
Network: 00 00 34 69       --> 00 00 03 00
Node:    00-50-49-47-47-59 --> 02-80-C8-00-00-05
Socket:  NCP               --> 0x4003
ncp: ═══════════════════════ NetWare Core Protocol ═══════════════════════
NCP Reply: Deallocate Directory Handle
Reply Type: 0x3333 (Reply)
Sequence Number: 9
Connection Number Low: 1
Task Number: 1
Connection Number High: 0
Completion Code: 0 (Success)
Connection Status: 0x00

Appendix B: page 18

Packet Number : 32        8:56:11 PM
Length : 64 bytes
802.3:  ═════════ IEEE 802.3 Datalink Layer ═════════
    Station: 02-80-C8-00-00-05 ---> PIGGY
    Length: 40
ipx:  ═════════ Internetwork Packet Exchange ═════════
    Checksum: 0xFFFF
    Length: 40
    Hop Count: 0
    Packet Type: 17(NCP)
    Network: 00 00 03 00        ---> 00 00 34 69
    Node:    02-80-C8-00-00-05  ---> 00-50-49-47-47-59
    Socket:  0x4003             ---> NCP
ncp:  ═════════ NetWare Core Protocol ═════════
    NCP Request: Get Log Key
    Request Type: 0x2222 (Request)
    Sequence Number: 10
    Connection Number Low: 1
    Task Number: 2
    Connection Number High: 0
    Function Code: 23
    Subfunction Length: 1 bytes
    Subfunction Code: 23

Packet Number : 33        8:56:11 PM

Task Number: 1
Connection Number High: 0
Completion Code: 0 (Success)
Connection Status: 0x00

Packet Number : 50        9:08:32 PM
Length : 64 bytes
802.3:  ═════════ IEEE 802.3 Datalink Layer ═════════
    Station: 02-80-C8-00-00-05 ---> BEAKER
    Length: 40
ipx:  ═════════ Internetwork Packet Exchange ═════════
    Checksum: 0xFFFF
    Length: 40
    Hop Count: 0
    Packet Type: 17(NCP)
    Network: 00 00 03 00        ---> 00 00 35 59
    Node:    02-80-C8-00-00-05  ---> 42-45-41-4B-45-52
    Socket:  0x4003             ---> 0x0001
ncp:  ═════════ NetWare Core Protocol ═════════
    NCP Request: Get Log Key
    Request Type: 0x2222 (Request)
    Sequence Number: 10
    Connection Number Low: 2
    Task Number: 2
    Connection Number High: 0
    Function Code: 23
    Subfunction Length: 1 bytes
    Subfunction Code: 23

Packet Number : 51        9:08:32 PM
Length : 64 bytes
802.3:  ═════════ IEEE 802.3 Datalink Layer ═════════
    Station: BEAKER ---> PIGGY2
    Length: 40
ipx:  ═════════ Internetwork Packet Exchange ═════════
    Checksum: 0xFFFF
    Length: 40
    Hop Count: 1
    Packet Type: 17(NCP)
    Network: 00 00 35 59        ---> 00 00 34 69
    Node:    42-45-41-4B-45-52  ---> 50-49-47-47-59-32
    Socket:  0x40A9             ---> NCP
ncp:  ═════════ NetWare Core Protocol ═════════
    NCP Request: Get Log Key
    Request Type: 0x2222 (Request)
    Sequence Number: 9
    Connection Number Low: 2
    Task Number: 2
    Connection Number High: 0
    Function Code: 23
    Subfunction Length: 1 bytes
    Subfunction Code: 23

Packet Number : 52        9:08:32 PM

Appendix B: page 19

```
Length : 64 bytes
802.3: ================= IEEE 802.3 Datalink Layer =================
       Station: PIGGY----> 02-80-C8-00-00-05
       Length: 46
ipx: ================= Internetwork Packet Exchange =================
     Checksum: 0xFFFF
     Length: 46
     Hop Count: 0
     Packet Type: 17(NCP)
     Network: 00 00 34 69         --> 00 00 03 00
     Node:    00-50-49-47-47-59   --> 02-80-C8-00-00-05
     Socket:  NCP                 --> 0x4003
ncp: ================= NetWare Core Protocol =================
     NCP Reply: Get Log Key
     Reply Type: 0x3333 (Reply)
     Sequence Number: 10
     Connection Number Low: 1
     Task Number: 1
     Connection Number High: 0
     Completion Code: 0 (Success)
     Connection Status: 0x00
     Key: 0x82 0x0A 0x57 0x14 0xAE 0x28 0xAF 0x50

Packet Number : 34        8:56:11 PM
Length : 66 bytes
802.3: ================= IEEE 802.3 Datalink Layer =================
       Station: 02-80-C8-00-00-05 ---> PIGGY
       Length: 48
ipx: ================= Internetwork Packet Exchange =================
     Checksum: 0xFFFF Length : 64 bytes
802.3: ================= IEEE 802.3 Datalink Layer =================
       Station: PIGGY2----> BEAKER
       Length: 46
ipx: ================= Internetwork Packet Exchange =================
     Checksum: 0xFFFF
     Length: 46
     Hop Count: 0
     Packet Type: 17(NCP)
     Network: 00 00 34 69         --> 00 00 35 59
     Node:    50-49-47-47-59-32   --> 42-45-41-4B-45-52
     Socket:  NCP                 --> 0x40A9
ncp: ================= NetWare Core Protocol =================
     NCP Reply: Get Log Key
     Reply Type: 0x3333 (Reply)
     Sequence Number: 9
     Connection Number Low: 2
     Task Number: 1
     Connection Number High: 0
     Completion Code: 0 (Success)
     Connection Status: 0x00
     Key: 0xDB 0x94 0xB6 0x28 0x6C 0x50 0x2B 0xED Packet Number : 53        9:08:32 PM
Length : 64 bytes
802.3: ================= IEEE 802.3 Datalink Layer =================
       Station: BEAKER----> 02-80-C8-00-00-05
       Length: 46
ipx: ================= Internetwork Packet Exchange =================
     Checksum: 0xFFFF
     Length: 46
     Hop Count: 1
     Packet Type: 17(NCP)
     Network: 00 00 35 59         --> 00 00 03 00
     Node:    42-45-41-4B-45-52   --> 02-80-C8-00-00-05
     Socket:  0x0001              --> 0x4003
ncp: ================= NetWare Core Protocol =================
     NCP Reply: Get Log Key
     Reply Type: 0x3333 (Reply)
     Sequence Number: 10
     Connection Number Low: 2
     Task Number: 1
     Connection Number High: 0
     Completion Code: 0 (Success)
     Connection Status: 0x00
     Key: 0xDB 0x94 0xB6 0x28 0x6C 0x50 0x2B 0xED Packet Number : 54        9:08:32 PM
Length : 66 bytes
802.3: ================= IEEE 802.3 Datalink Layer =================
       Station: 02-80-C8-00-00-05 ---> BEAKER
       Length: 48
ipx: ================= Internetwork Packet Exchange =================
     Checksum: 0xFFFF
```

Appendix B: page 20

```
                                    Length: 48
                                    Hop Count: 0
                                    Packet Type: 17(NCP)
                                    Network: 00 00 03 00       --> 00 00 35 59
                                    Node:   02-80-C8-00-00-05 --> 42-45-41-4B-45-52
                                    Socket: 0x4003              --> 0x0001
                               ncp:  ═══════ NetWare Core Protocol ═══════
                                    NCP Request: Get Bindery Object ID
                                    Request Type: 0x2222 (Request)
                                    Sequence Number: 11
                                    Connection Number Low: 2
                                    Task Number: 2
                                    Connection Number High: 0
                                    Function Code: 23
                                    Subfunction Length: 9 bytes
                                    Subfunction Code: 53
                                    Object Type: 1 (User)
                                    Object Name: Length: 5
                                                Value : admin Packet Number : 55        9:08:32 PM
                            Length : 66 bytes
                            802.3: ═══════ IEEE 802.3 Datalink Layer ═══════
                                    Station: BEAKER---> PIGGY2
                                    Length: 48
                            ipx:   ═══════ Internetwork Packet Exchange ═══════
                                    Checksum: 0xFFFF
                                    Length: 48
                                    Hop Count: 1
                                    Packet Type: 17(NCP)
                                    Network: 00 00 35 59       --> 00 00 34 69
                                    Node:   42-45-41-4B-45-52 --> 50-49-47-47-59-32
                                    Socket: 0x40A9              --> NCP
                               ncp:  ═══════ NetWare Core Protocol ═══════
                                    NCP Request: Get Bindery Object ID
                                    Request Type: 0x2222 (Request)
                                    Sequence Number: 10
                                    Connection Number Low: 2
                                    Task Number: 2
                                    Connection Number High: 0
                                    Function Code: 23
                                    Subfunction Length: 9 bytes
                                    Subfunction Code: 53
                                    Object Type: 1 (User)
                                    Object Name: Length: 5
                                                Value : admin Packet Number : 56        9:08:32 PM
                            Length : 110 bytes
                            802.3: ═══════ IEEE 802.3 Datalink Layer ═══════
                                    Station: PIGGY2---> BEAKER
                                    Length: 92
                            ipx:   ═══════ Internetwork Packet Exchange ═══════
                                    Checksum: 0xFFFF
```

```
                                    Length: 48
                                    Hop Count: 0
                                    Packet Type: 17(NCP)
                                    Network: 00 00 03 00       --> 00 00 34 69
                                    Node:   02-80-C8-00-00-05 --> 00-50-49-47-47-59
                                    Socket: 0x4003              --> NCP
                               ncp:  ═══════ NetWare Core Protocol ═══════
                                    NCP Request: Get Bindery Object ID
                                    Request Type: 0x2222 (Request)
                                    Sequence Number: 11
                                    Connection Number Low: 1
                                    Task Number: 2
                                    Connection Number High: 0
                                    Function Code: 23
                                    Subfunction Length: 9 bytes
                                    Subfunction Code: 53
                                    Object Type: 1 (User)
                                    Object Name: Length: 5
                                                Value : admin Packet Number : 35        8:56:11 PM
                            Length : 110 bytes
                            802.3: ═══════ IEEE 802.3 Datalink Layer ═══════
                                    Station: PIGGY---> 02-80-C8-00-00-05
                                    Length: 92
                            ipx:   ═══════ Internetwork Packet Exchange ═══════
                                    Checksum: 0xFFFF
```

Appendix B: page 21

```
Length: 92
Hop Count: 0
Packet Type: 17(NCP)
Network: 00 00 34 69        --> 00 00 03 00
Node:    00-50-49-47-47-59  --> 02-80-C8-00-00-05
Socket:  NCP                --> 0x4003
ncp:                  ═════ NetWare Core Protocol ═════
  NCP Reply: Get Bindery Object ID
  Reply Type: 0x3333 (Reply)
  Sequence Number: 11
  Connection Number Low: 1
  Task Number: 1
  Connection Number High: 0
  Completion Code: 0 (Success)
  Connection Status: 0x00
  Object ID: 0x9E000001
  Object Type: 1 (User)
  Object Name: ADMIN
```

```
35  Packet Number : 36      8:56:11 PM
    Length : 74 bytes
802.3: ═════════════════════ IEEE 802.3 Datalink Layer ═════════════════════
    Station: 02-80-C8-00-00-05 ---> PIGGY
    Length: 56
ipx: ═════════════════════ Internetwork Packet Exchange ═════════════════════
    Checksum: 0xFFFF
    Length: 56
    Hop Count: 0
```

```
Length: 92
Hop Count: 0
Packet Type: 17(NCP)
Network: 00 00 34 69        --> 00 00 35 59
Node:    50-49-47-47-59-32  --> 42-45-41-4B-45-52
Socket:  NCP                --> 0x40A9
ncp:                  ═════ NetWare Core Protocol ═════
  NCP Reply: Get Bindery Object ID
  Reply Type: 0x3333 (Reply)
  Sequence Number: 10
  Connection Number Low: 2
  Task Number: 1
  Connection Number High: 0
  Completion Code: 0 (Success)
  Connection Status: 0x00
  Object ID: 0x9E000001
  Object Type: 1 (User)
  Object Name: ADMIN
```

```
Packet Number : 57       9:08:32 PM
Length : 110 bytes
802.3: ═════════════════════ IEEE 802.3 Datalink Layer ═════════════════════
    Station: BEAKER ---> 02-80-C8-00-00-05
    Length: 92
ipx: ═════════════════════ Internetwork Packet Exchange ═════════════════════
    Checksum: 0xFFFF
    Length: 92
    Hop Count: 1
    Packet Type: 17(NCP)
    Network: 00 00 35 59        --> 00 00 03 00
    Node:    42-45-41-4B-45-52  --> 02-80-C8-00-00-05
    Socket:  0x0001             --> 0x4003
ncp:                  ═════ NetWare Core Protocol ═════
  NCP Reply: Get Bindery Object ID
  Reply Type: 0x3333 (Reply)
  Sequence Number: 11
  Connection Number Low: 2
  Task Number: 1
  Connection Number High: 0
  Completion Code: 0 (Success)
  Connection Status: 0x00
  Object ID: 0x9E000001
  Object Type: 1 (User)
  Object Name: ADMIN
```

```
Packet Number : 58       9:08:32 PM
Length : 74 bytes
802.3: ═════════════════════ IEEE 802.3 Datalink Layer ═════════════════════
    Station: 02-80-C8-00-00-05 ---> BEAKER
    Length: 56
ipx: ═════════════════════ Internetwork Packet Exchange ═════════════════════
    Checksum: 0xFFFF
    Length: 56
    Hop Count: 0
```

Appendix B: page 22

```
Packet Type: 17(NCP)
Network: 00 00 03 00            --> 00 00 34 69
Node:    02-80-C8-00-00-05 --> 00-50-49-47-47-59
Socket:  0x4003             --> NCP
ncp: ========================= NetWare Core Protocol =========================
    NCP Request: Keyed Login
    Request Type: 0x2222 (Request)
    Sequence Number: 12
    Connection Number Low: 1
    Task Number: 2
    Connection Number High: 0
    Function Code: 23
    Subfunction Length: 17 bytes
    Subfunction Code: 24
    Key: 0xE1 0x6B 0xF0 0xDD 0x15 0x44 0xD1 0xAF
    Object Type: 1 (User)
    Object Name: Length: 5
        Value : admin
```

36

```
Packet Number : 37        8:56:11 PM
Length : 64 bytes
802.3: ========================= IEEE 802.3 Datalink Layer =========================
    Station: PIGGY----> 02-80-C8-00-00-05
    Length: 38
ipx: ========================= Internetwork Packet Exchange =========================
    Checksum: 0xFFFF
```

```
Packet Type: 17(NCP)
Network: 00 00 03 00            --> 00 00 35 59
Node:    02-80-C8-00-00-05 --> 42-45-41-4B-45-52
Socket:  0x4003             --> 0x0001
ncp: ========================= NetWare Core Protocol =========================
    NCP Request: Keyed Login
    Request Type: 0x2222 (Request)
    Sequence Number: 12
    Connection Number Low: 2
    Task Number: 2
    Connection Number High: 0
    Function Code: 23
    Subfunction Length: 17 bytes
    Subfunction Code: 24
    Key: 0xB3 0xA8 0xF6 0x58 0xB1 0x79 0x59 0x66
    Object Type: 1 (User)
    Object Name: Length: 5
        Value : admin
```

```
Packet Number : 59        9:08:32 PM
Length : 74 bytes
802.3: ========================= IEEE 802.3 Datalink Layer =========================
    Station: BEAKER----> PIGGY2
    Length: 56
ipx: ========================= Internetwork Packet Exchange =========================
    Checksum: 0xFFFF
    Length: 56
    Hop Count: 1
    Packet Type: 17(NCP)
    Network: 00 00 35 59            --> 00 00 34 69
    Node:    42-45-41-4B-45-52 --> 50-49-47-47-59-32
    Socket:  0x40A9             --> NCP
ncp: ========================= NetWare Core Protocol =========================
    NCP Request: Keyed Login
    Request Type: 0x2222 (Request)
    Sequence Number: 11
    Connection Number Low: 2
    Task Number: 2
    Connection Number High: 0
    Function Code: 23
    Subfunction Length: 17 bytes
    Subfunction Code: 24
    Key: 0xB3 0xA8 0xF6 0x58 0xB1 0x79 0x59 0x66
    Object Type: 1 (User)
    Object Name: Length: 5
        Value : admin
```

```
Packet Number : 60        9:08:32 PM
Length : 64 bytes
802.3: ========================= IEEE 802.3 Datalink Layer =========================
    Station: PIGGY2----> BEAKER
    Length: 38
ipx: ========================= Internetwork Packet Exchange =========================
    Checksum: 0xFFFF
```

Appendix B: page 23

Length: 38
Hop Count: 0
Packet Type: 17(NCP)
Network: 00 00 34 69 ---> 00 00 03 00
Node: 00-50-49-47-47-59 ---> 02-80-C8-00-00-05
Socket: NCP ---> 0x4003
ncp: ================ NetWare Core Protocol ================
NCP Reply: Keyed Login
Reply Type: 0x3333 (Reply)
Sequence Number: 12
Connection Number Low: 1
Task Number: 1
Connection Number High: 0
Completion Code: 0 (Success)
Connection Status: 0x00

Length: 38
Hop Count: 0
Packet Type: 17(NCP)
Network: 00 00 34 69 ---> 00 00 35 59
Node: 50-49-47-47-59-32 ---> 42-45-41-4B-45-52
Socket: NCP ---> 0x40A9
ncp: ================ NetWare Core Protocol ================
NCP Reply: Keyed Login
Reply Type: 0x3333 (Reply)
Sequence Number: 11
Connection Number Low: 2
Task Number: 1
Connection Number High: 0
Completion Code: 0 (Success)
Connection Status: 0x00

Packet Number: 61          9:08:32 PM
Length: 64 bytes
802.3: ================ IEEE 802.3 Datalink Layer ================
Station: BEAKER----> 02-80-C8-00-00-05
Length: 38
ipx: ================ Internetwork Packet Exchange ================
Checksum: 0xFFFF
Length: 38
Hop Count: 1
Packet Type: 17(NCP)
Network: 00 00 35 59 ---> 00 00 03 00
Node: 42-45-41-4B-45-52 ---> 02-80-C8-00-00-05
Socket: 0x0001 ---> 0x4003
ncp: ================ NetWare Core Protocol ================

Packet Number: 37          8:56:11 PM
Length: 64 bytes
802.3: ================ IEEE 802.3 Datalink Layer ================
Station: 02-80-C8-00-00-05----> PIGGY
Length: 44
ipx: ================ Internetwork Packet Exchange ================
Checksum: 0xFFFF
Length: 44
Hop Count: 0
Packet Type: 17(NCP)
Network: 00 00 03 00 ---> 00 00 34 69
Node: 02-80-C8-00-00-05 ---> 00-50-49-47-47-59
Socket: 0x4003 ---> NCP
ncp: ================ NetWare Core Protocol ================
NCP Request: Get Station Logged Info Packet Number: 62          9:08:32 PM
Length: 64 bytes
802.3: ================ IEEE 802.3 Datalink Layer ================
Station: 02-80-C8-00-00-05----> BEAKER
Length: 44
ipx: ================ Internetwork Packet Exchange ================
Checksum: 0xFFFF
Length: 44
Hop Count: 0
Packet Type: 17(NCP)
Network: 00 00 03 00 ---> 00 00 35 59
Node: 02-80-C8-00-00-05 ---> 42-45-41-4B-45-52
Socket: 0x4003 ---> 0x0001
ncp: ================ NetWare Core Protocol ================
NCP Request: Get Station Logged Info Appendix B: page 24

```
Request Type: 0x2222 (Request)
Sequence Number: 13
Connection Number Low: 1
Task Number: 2
Connection Number High: 0
Function Code: 23
Subfunction Struct Length: 1280 bytes
Subfunction Code: 28
Target Connection: 1
```

```
Packet Number : 39         8:56:11 PM
Length : 118 bytes
802.3: ============ IEEE 802.3 Datalink Layer ============
       Station: PIGGY----> 02-80-C8-00-00-05
       Length: 100
ipx:   ============ Internetwork Packet Exchange ============
       Checksum: 0xFFFF
       Length: 100
       Hop Count: 0
       Packet Type: 17(NCP)
       Network: 00 00 34 69         --> 00 00 03 00
       Node:    00-50-49-47-47-59   --> 02-80-C8-00-00-05
       Socket:  NCP                 --> 0x4003
ncp:   ============ NetWare Core Protocol ============
       NCP Reply: Get Station Logged Info
       Reply Type: 0x3333 (Reply)
       Sequence Number: 13
       Connection Number Low: 1
       Task Number: 1
```

38

```
Request Type: 0x2222 (Request)
Sequence Number: 13
Connection Number Low: 2
Task Number: 2
Connection Number High: 0
Function Code: 23
Subfunction Struct Length: 1280 bytes
Subfunction Code: 28
Target Connection: 2
```

```
Packet Number : 63         9:08:32 PM
Length : 64 bytes
802.3: ============ IEEE 802.3 Datalink Layer ============
       Station: BEAKER---> PIGGY2
       Length: 44
ipx:   ============ Internetwork Packet Exchange ============
       Checksum: 0xFFFF
       Length: 44
       Hop Count: 1
       Packet Type: 17(NCP)
       Network: 00 00 35 59         --> 00 00 34 69
       Node:    42-45-41-4B-45-52   --> 50-49-47-47-59-32
       Socket:  0x40A9              --> NCP
ncp:   ============ NetWare Core Protocol ============
       NCP Request: Get Station Logged Info
       Request Type: 0x2222 (Request)
       Sequence Number: 12
       Connection Number Low: 2
       Task Number: 2
       Connection Number High: 0
       Function Code: 23
       Subfunction Struct Length: 1280 bytes
       Subfunction Code: 28
       Target Connection: 2
```

```
Packet Number : 64         9:08:32 PM
Length : 118 bytes
802.3: ============ IEEE 802.3 Datalink Layer ============
       Station: PIGGY2---> BEAKER
       Length: 100
ipx:   ============ Internetwork Packet Exchange ============
       Checksum: 0xFFFF
       Length: 100
       Hop Count: 0
       Packet Type: 17(NCP)
       Network: 00 00 34 69         --> 00 00 35 59
       Node:    50-49-47-47-59-32   --> 42-45-41-4B-45-52
       Socket:  NCP                 --> 0x40A9
ncp:   ============ NetWare Core Protocol ============
       NCP Reply: Get Station Logged Info
       Reply Type: 0x3333 (Reply)
       Sequence Number: 12
       Connection Number Low: 2
       Task Number: 1
```

Appendix B: page 25

Connection Number High: 0
Completion Code: 0 (Success)
Connection Status: 0x00
User ID: 0x0100009E
User Type: 1 (User)
User Name: admin
Login Time: Thursday, August 25, 1994 1:06:59 PM Packet Number : 40    8:56:11 PM
Length : 64 bytes
802.3: ══════════ IEEE 802.3 Datalink Layer ══════════
       Station: 02-80-C8-00-00-05 ---> PIGGY
       Length: 44
ipx:  ══════════ Internetwork Packet Exchange ══════════
       Checksum: 0xFFFF
       Length: 44
       Hop Count: 0
       Packet Type: 17(NCP)
       Network: 00 00 03 00        ---> 00 00 34 69
       Node:    02-80-C8-00-00-05 ---> 00-50-49-47-47-59
       Socket:  0x4003              ---> NCP
ncp:  ══════════ NetWare Core Protocol ══════════
       NCP Request: Get Internet Address
       Request Type: 0x2222 (Request)
       Sequence Number: 14
       Connection Number Low: 1
       Task Number: 2

Connection Number High: 0
Completion Code: 0 (Success)
Connection Status: 0x00
User ID: 0x0100009E
User Type: 1 (User)
User Name: admin
Login Time: Thursday, August 25, 1994 1:19:20 PM Packet Number : 65    9:08:32 PM
Length : 118 bytes
802.3: ══════════ IEEE 802.3 Datalink Layer ══════════
       Station: BEAKER ---> 02-80-C8-00-00-05
       Length: 100
ipx:  ══════════ Internetwork Packet Exchange ══════════
       Checksum: 0xFFFF
       Length: 100
       Hop Count: 1
       Packet Type: 17(NCP)
       Network: 00 00 35 59        ---> 00 00 03 00
       Node:    42-45-41-4B-45-52 ---> 02-80-C8-00-00-05
       Socket:  0x0001              ---> 0x4003
ncp:  ══════════ NetWare Core Protocol ══════════
       NCP Reply: Get Station Logged Info
       Reply Type: 0x3333 (Reply)
       Sequence Number: 13
       Connection Number Low: 2
       Task Number: 1
       Connection Number High: 0
       Completion Code: 0 (Success)
       Connection Status: 0x00
       User ID: 0x0100009E
       User Type: 1 (User)
       User Name: admin
       Login Time: Thursday, August 25, 1994 1:19:20 PM Packet Number : 66    9:08:32 PM
Length : 64 bytes
802.3: ══════════ IEEE 802.3 Datalink Layer ══════════
       Station: 02-80-C8-00-00-05 ---> BEAKER
       Length: 44
ipx:  ══════════ Internetwork Packet Exchange ══════════
       Checksum: 0xFFFF
       Length: 44
       Hop Count: 0
       Packet Type: 17(NCP)
       Network: 00 00 03 00        ---> 00 00 35 59
       Node:    02-80-C8-00-00-05 ---> 42-45-41-4B-45-52
       Socket:  0x4003              ---> 0x0001
ncp:  ══════════ NetWare Core Protocol ══════════
       NCP Request: Get Internet Address
       Request Type: 0x2222 (Request)
       Sequence Number: 14
       Connection Number Low: 2
       Task Number: 2

Appendix B: page 26

Connection Number High: 0
Function Code: 23
Subfunction Struct Length: 1280 bytes
Subfunction Code: 26
Target Connection: 1

Packet Number : 41        8:56:11 PM
Length : 70 bytes
802.3: ═══════════ IEEE 802.3 Datalink Layer ═══════════
    Station: PIGGY-----> 02-80-C8-00-00-05
    Length: 52
ipx: ═══════════ Internetwork Packet Exchange ═══════════
    Checksum: 0xFFFF
    Length: 51
    Hop Count: 0
    Packet Type: 17(NCP)
    Network: 00 00 34 69        ---> 00 00 03 00
    Node:    00-50-49-47-47-59 ---> 02-80-C8-00-00-05
    Socket:  NCP                ---> 0x4003
ncp: ═══════════ NetWare Core Protocol ═══════════
    NCP Reply: Get Internet Address
    Reply Type: 0x3333 (Reply)
    Sequence Number: 14
    Connection Number Low: 1
    Task Number: 1
    Connection Number High: 0
    Completion Code: 0 (Success)
    Connection Status: 0x00
    Network Address: 0x00 0x00 0x03 0x00

40

Connection Number High: 0
Function Code: 23
Subfunction Struct Length: 1280 bytes
Subfunction Code: 26
Target Connection: 2

Packet Number : 67        9:08:32 PM
Length : 64 bytes
802.3: ═══════════ IEEE 802.3 Datalink Layer ═══════════
    Station: BEAKER-----> PIGGY2
    Length: 44
ipx: ═══════════ Internetwork Packet Exchange ═══════════
    Checksum: 0xFFFF
    Length: 44
    Hop Count: 1
    Packet Type: 17(NCP)
    Network: 00 00 35 59        ---> 00 00 34 69
    Node:    42-45-41-4B-45-52 ---> 50-49-47-47-59-32
    Socket:  0x40A9             ---> NCP
ncp: ═══════════ NetWare Core Protocol ═══════════
    NCP Request: Get Internet Address
    Request Type: 0x2222 (Request)
    Sequence Number: 13
    Connection Number Low: 2
    Task Number: 2
    Connection Number High: 0
    Function Code: 23
    Subfunction Struct Length: 1280 bytes
    Subfunction Code: 26
    Target Connection: 2

Packet Number : 68        9:08:32 PM
Length : 70 bytes
802.3: ═══════════ IEEE 802.3 Datalink Layer ═══════════
    Station: PIGGY2-----> BEAKER
    Length: 52
ipx: ═══════════ Internetwork Packet Exchange ═══════════
    Checksum: 0xFFFF
    Length: 51
    Hop Count: 0
    Packet Type: 17(NCP)
    Network: 00 00 34 69        ---> 00 00 35 59
    Node:    50-49-47-47-59-32 ---> 42-45-41-4B-45-52
    Socket:  NCP                ---> 0x40A9
ncp: ═══════════ NetWare Core Protocol ═══════════
    NCP Reply: Get Internet Address
    Reply Type: 0x3333 (Reply)
    Sequence Number: 13
    Connection Number Low: 2
    Task Number: 1
    Connection Number High: 0
    Completion Code: 0 (Success)
    Connection Status: 0x00
    Network Address: 0x00 0x00 0x34 0x69

Appendix B: page 27

Network Node Address: 0x02 0x80 0xC8 0x00 0x00 0x05
Network Socket: 832
Connection Type: 2 (NCP)

41  Packet Number: 42        8:56:11 PM
    Length: 82 bytes
    802.3: ══════════ IEEE 802.3 Datalink Layer ══════════
           Station: 02-80-C8-00-00-05---> PIGGY
           Length: 64
    ipx: ══════════ Internetwork Packet Exchange ══════════
           Checksum: 0xFFFF
           Length: 64
           Hop Count: 0
           Packet Type: 17(NCP)
           Network: 00 00 03 00        ---> 00 00 34 69
           Node:    02-80-C8-00-00-05  ---> 00-50-49-47-47-59
           Socket:  0x4003             ---> NCP
    ncp: ══════════ NetWare Core Protocol ══════════
           NCP Request: Read Property Value
           Request Type: 0x2222 (Request)
           Sequence Number: 15
           Connection Number Low: 1
           Task Number: 2
           Connection Number High: 0
           Function Code: 23
           Subfunction Length: 25 bytes
           Subfunction Code: 61

Network Node Address: 0x50 0x49 0x47 0x47 0x59 0x32
Network Socket: 43328
Connection Type: 2 (NCP)

Packet Number: 69        9:08:32 PM
Length: 70 bytes
802.3: ══════════ IEEE 802.3 Datalink Layer ══════════
       Station: BEAKER---> 02-80-C8-00-00-05
       Length: 52
ipx: ══════════ Internetwork Packet Exchange ══════════
       Checksum: 0xFFFF
       Length: 51
       Hop Count: 1
       Packet Type: 17(NCP)
       Network: 00 00 35 59        ---> 00 00 03 00
       Node:    42-45-41-4B-45-52  ---> 02-80-C8-00-00-05
       Socket:  0x0001             ---> 0x4003
ncp: ══════════ NetWare Core Protocol ══════════
       NCP Reply: Get Internet Address
       Reply Type: 0x3333 (Reply)
       Sequence Number: 14
       Connection Number Low: 2
       Task Number: 1
       Connection Number High: 0
       Completion Code: 0 (Success)
       Connection Status: 0x00
       Network Address: 0x00 0x00 0x35 0x59
       Network Node Address: 0x42 0x45 0x41 0x4B 0x45 0x52
       Network Socket: 43328
       Connection Type: 2 (NCP)

Packet Number: 70        9:08:32 PM
Length: 82 bytes
802.3: ══════════ IEEE 802.3 Datalink Layer ══════════
       Station: 02-80-C8-00-00-05---> BEAKER
       Length: 64
ipx: ══════════ Internetwork Packet Exchange ══════════
       Checksum: 0xFFFF
       Length: 64
       Hop Count: 0
       Packet Type: 17(NCP)
       Network: 00 00 03 00        ---> 00 00 35 59
       Node:    02-80-C8-00-00-05  ---> 42-45-41-4B-45-52
       Socket:  0x4003             ---> 0x0001
ncp: ══════════ NetWare Core Protocol ══════════
       NCP Request: Read Property Value
       Request Type: 0x2222 (Request)
       Sequence Number: 15
       Connection Number Low: 2
       Task Number: 2
       Connection Number High: 0
       Function Code: 23
       Subfunction Length: 25 bytes
       Subfunction Code: 61

Appendix B: page 28

Object Type: 1 (User)
Object Name: Length: 5
    Value : admin
Segment Number: 1
Property Name: Length: 14
    Value : IDENTIFICATION Packet Number : 71       9:08:32 PM
Length : 82 bytes
802.3: ━━━━━━━━━━━━ IEEE 802.3 Datalink Layer ━━━━━━━━━━━━
    Station: BEAKER----> PIGGY2
    Length: 64
ipx: ━━━━━━━━━━━━ Internetwork Packet Exchange ━━━━━━━━━━━━
    Checksum: 0xFFFF
    Length: 64
    Hop Count: 1
    Packet Type: 17(NCP)
    Network: 00 00 35 59    ---> 00 00 34 69
    Node: 42-45-41-4B-45-52 ---> 50-49-47-47-59-32
    Socket: 0x40A9          ---> NCP
ncp: ━━━━━━━━━━━━ NetWare Core Protocol ━━━━━━━━━━━━
    NCP Request: Read Property Value
    Request Type: 0x2222 (Request)
    Sequence Number: 14
    Connection Number Low: 2
    Task Number: 2
    Connection Number High: 0
    Function Code: 23
    Subfunction Length: 25 bytes
    Subfunction Code: 61
    Object Type: 1 (User)
    Object Name: Length: 5
        Value : admin
    Segment Number: 1
    Property Name: Length: 14
        Value : IDENTIFICATION Packet Number : 72       9:08:32 PM
Length : 64 bytes
802.3: ━━━━━━━━━━━━ IEEE 802.3 Datalink Layer ━━━━━━━━━━━━
    Station: PIGGY2----> BEAKER
    Length: 38
ipx: ━━━━━━━━━━━━ Internetwork Packet Exchange ━━━━━━━━━━━━
    Checksum: 0xFFFF
    Length: 38
    Hop Count: 0
    Packet Type: 17(NCP)
    Network: 00 00 34 69    ---> 00 00 35 59
    Node: 50-49-47-47-59-32 ---> 42-45-41-4B-45-52
    Socket: NCP             ---> 0x40A9
ncp: ━━━━━━━━━━━━ NetWare Core Protocol ━━━━━━━━━━━━
    NCP Reply: Read Property Value
    Reply Type: 0x3333 (Reply)
    Sequence Number: 14

Packet Number : 43       8:56:11 PM
Length : 64 bytes
802.3: ━━━━━━━━━━━━ IEEE 802.3 Datalink Layer ━━━━━━━━━━━━
    Station: PIGGY----> 02-80-C8-00-00-05
    Length: 38
ipx: ━━━━━━━━━━━━ Internetwork Packet Exchange ━━━━━━━━━━━━
    Checksum: 0xFFFF
    Length: 38
    Hop Count: 0
    Packet Type: 17(NCP)
    Network: 00 00 34 69    ---> 00 00 03 00
    Node: 00-50-49-47-47-59 ---> 02-80-C8-00-00-05
    Socket: NCP             ---> 0x4003
ncp: ━━━━━━━━━━━━ NetWare Core Protocol ━━━━━━━━━━━━
    NCP Reply: Read Property Value
    Reply Type: 0x3333 (Reply)
    Sequence Number: 15

Appendix B: page 29

```
Connection Number Low: 1
Task Number: 1
Connection Number High: 0
Completion Code: 251 (No Such Property)
Connection Status: 0x00
```

```
Packet Number : 44        8:56:11 PM
Length : 84 bytes         ========= IEEE 802.3 Datalink Layer =========
802.3:
        Station: 02-80-C8-00-00-05 ---> PIGGY
        Length: 66        ========= Internetwork Packet Exchange =========
ipx:
        Checksum: 0xFFFF
        Length: 65
        Hop Count: 0
        Packet Type: 17(NCP)
        Network: 00 00 03 00        ---> 00 00 34 69
        Node:    02-80-C8-00-00-05  ---> 00-50-49-47-47-59
        Socket:  0x4003             ---> NCP
ncp:                                ========= NetWare Core Protocol =========
        NCP Request: Search for File
        Request Type: 0x2222 (Request)
        Sequence Number: 16
        Connection Number Low: 1
        Task Number: 2
        Connection Number High: 0
        Function Code: 64
        Last Search Index: 65535
        Directory Handle: 0x00
        Search Attributes: 0x06 (Normal, System, Hidden Files)
        File Name: Length: 23
```

43

```
Connection Number Low: 2
Task Number: 1
Connection Number High: 0
Completion Code: 251 (No Such Property)
Connection Status: 0x00
```

```
Packet Number : 73        9:08:32 PM
Length : 64 bytes         ========= IEEE 802.3 Datalink Layer =========
802.3:
        Station: BEAKER ---> 02-80-C8-00-00-05
        Length: 38        ========= Internetwork Packet Exchange =========
ipx:
        Checksum: 0xFFFF
        Length: 38
        Hop Count: 1
        Packet Type: 17(NCP)
        Network: 00 00 35 59        ---> 00 00 03 00
        Node:    42-45-41-4B-45-52  ---> 02-80-C8-00-00-05
        Socket:  0x0001             ---> 0x4003
ncp:                                ========= NetWare Core Protocol =========
        NCP Reply: Read Property Value
        Reply Type: 0x3333 (Reply)
        Sequence Number: 15
        Connection Number Low: 2
        Task Number: 1
        Connection Number High: 0
        Completion Code: 251 (No Such Property)
        Connection Status: 0x00
```

```
Packet Number : 74        9:08:32 PM
Length : 84 bytes         ========= IEEE 802.3 Datalink Layer =========
802.3:
        Station: 02-80-C8-00-00-05 ---> BEAKER
        Length: 66        ========= Internetwork Packet Exchange =========
ipx:
        Checksum: 0xFFFF
        Length: 65
        Hop Count: 0
        Packet Type: 17(NCP)
        Network: 00 00 03 00        ---> 00 00 35 59
        Node:    02-80-C8-00-00-05  ---> 42-45-41-4B-45-52
        Socket:  0x4003             ---> 0x0001
ncp:                                ========= NetWare Core Protocol =========
        NCP Request: Search for File
        Request Type: 0x2222 (Request)
        Sequence Number: 16
        Connection Number Low: 2
        Task Number: 2
        Connection Number High: 0
        Function Code: 64
        Last Search Index: 65535
        Directory Handle: 0x00
        Search Attributes: 0x06 (Normal, System, Hidden Files)
        File Name: Length: 23
```

Appendix B: page 30

Value : SYS:\PUBLIC\NETS\LOG.DAT     9:08:32 PM

Packet Number : 75
Length : 100 bytes
802.3: ═══════════════ IEEE 802.3 Datalink Layer ═══════════════
Station: BEAKER----> PIGGY2
Length: 82
ipx: ═══════════════ Internetwork Packet Exchange ═══════════════
Checksum: 0xFFFF
Length: 82
Hop Count: 1
Packet Type: 17(NCP)
Network: 00 00 35 59      ---> 00 00 34 69
Node:    42-45-41-4B-45-52 ---> 50-49-47-47-59-32
Socket:  0x40A9            ---> NCP
ncp: ═══════════════ NetWare Core Protocol ═══════════════
NCP Request: Search for File
Request Type: 0x2222 (Request)
Sequence Number: 15
Connection Number Low: 2
Task Number: 2
Connection Number High: 0
Function Code: 64
Last Search Index: 65535
Directory Handle: 0x00
Search Attributes: 0x06 (Normal, System, Hidden Files)
File Name: Length: 40
Value : SYS:\USERS\PIGGY\SYS\PUBLIC\NETS\LOG.DAT Packet Number : 76     9:08:32 PM
Length : 84 bytes
802.3: ═══════════════ IEEE 802.3 Datalink Layer ═══════════════
Station: 02-80-C8-00-00-05----> BEAKER
Length: 66
ipx: ═══════════════ Internetwork Packet Exchange ═══════════════
Checksum: 0xFFFF
Length: 65
Hop Count: 0
Packet Type: 17(NCP)
Network: 00 00 03 00      ---> 00 00 35 59
Node:    02-80-C8-00-00-05 ---> 42-45-41-4B-45-52
Socket:  0x4003            ---> 0x0001
ncp: ═══════════════ NetWare Core Protocol ═══════════════
NCP Request: Search for File
Request Type: 0x2222 (Request)
Sequence Number: 16
Connection Number Low: 2
Task Number: 2
Connection Number High: 0
Function Code: 64
Last Search Index: 65535
Directory Handle: 0x00
Search Attributes: 0x06 (Normal, System, Hidden Files)
File Name: Length: 23

Appendix B: page 31

Value : SYS:\PUBLIC\NET$LOG.DAT

Packet Number : 77     9:08:32 PM
Length : 100 bytes
802.3: ═══════════════ IEEE 802.3 Datalink Layer ═══════════════
  Station: BEAKER----> PIGGY2
  Length: 82
ipx: ═══════════════ Internetwork Packet Exchange ═══════════════
  Checksum: 0xFFFF
  Length: 82
  Hop Count: 1
  Packet Type: 17(NCP)
  Network: 00 00 35 59        ---> 00 00 34 69
  Node:    42-45-41-4B-45-52 ---> 50-49-47-47-59-32
  Socket:  0x40A9              ---> NCP
ncp: ═══════════════ NetWare Core Protocol ═══════════════
  NCP Request: Search for File
  Request Type: 0x2222 (Request)
  Sequence Number: 15
  Connection Number Low: 2
  Task Number: 2
  Connection Number High: 0
  Function Code: 64
  Last Search Index: 65535
  Directory Handle: 0x00
  Search Attributes: 0x06 (Normal, System, Hidden Files)
  File Name: Length: 40
    Value : SYS:\USEFS\PIGGY\SYS\PUBLIC\NET$LOG.DAT Packet Number : 78     9:08:32 PM
Length : 64 bytes
802.3: ═══════════════ IEEE 802.3 Datalink Layer ═══════════════
  Station: PIGGY2----> BEAKER
  Length: 38
ipx: ═══════════════ Internetwork Packet Exchange ═══════════════
  Checksum: 0xFFFF
  Length: 38
  Hop Count: 0
  Packet Type: 17(NCP)
  Network: 00 00 34 69        ---> 00 00 35 59
  Node:    50-49-47-47-59-32 ---> 42-45-41-4B-45-52
  Socket:  NCP                 ---> 0x40A9
ncp: ═══════════════ NetWare Core Protocol ═══════════════
  NCP Message: Request Being Processed
  Reply Type: 0x9999 (Request Being Processed)
  Connection Number Low: 2
  Task Number: 2
  Connection Number High: 0

Packet Number : 79     9:08:32 PM
Length : 64 bytes
802.3: ═══════════════ IEEE 802.3 Datalink Layer ═══════════════
  Station: BEAKER----> 02-80-C8-00-00-05
  Length: 38

Appendix B: page 32

Packet Number : 45    8:56:11 PM
Length : 64 bytes
802.3: ═══════ IEEE 802.3 Datalink Layer ═══════
    Station: PIGGY----> 02-80-C8-00-00-05
    Length: 38
ipx: ═══════ Internetwork Packet Exchange ═══════
    Checksum: 0xFFFF
    Length: 38
    Hop Count: 0
    Packet Type: 17(NCP)
    Network: 00 00 34 69      --> 00 00 03 00
    Node: 00-50-49-47-47-59 --> 02-80-C8-00-00-05
    Socket: NCP              --> 0x4003
ncp: ═══════ NetWare Core Protocol ═══════
    NCP Reply: Search for File
    Reply Type: 0x3333 (Reply)
    Sequence Number: 16
    Connection Number Low: 1
    Task Number: 1
    Connection Number High: 0
    Completion Code: 255 (Failure)
    Connection Status: 0x00 ipx: ═══════ Internetwork Packet Exchange ═══════
    Checksum: 0xFFFF
    Length: 38
    Hop Count: 1
    Packet Type: 17(NCP)
    Network: 00 00 35 59      --> 00 00 03 00
    Node: 42-45-41-4B-45-52 --> 02-80-C8-00-00-05
    Socket: 0x0001            --> 0x4003
ncp: ═══════ NetWare Core Protocol ═══════
    NCP Message: Request Being Processed
    Reply Type: 0x9999 (Request Being Processed)
    Connection Number Low: 2
    Task Number: 2
    Connection Number High: 0

Packet Number : 80    9:08:32 PM
Length : 64 bytes
802.3: ═══════ IEEE 802.3 Datalink Layer ═══════
    Station: PIGGY2----> BEAKER
    Length: 38
ipx: ═══════ Internetwork Packet Exchange ═══════
    Checksum: 0xFFFF
    Length: 38
    Hop Count: 0
    Packet Type: 17(NCP)
    Network: 00 00 34 69      --> 00 00 35 59
    Node: 50-49-47-47-59-32 --> 42-45-41-4B-45-52
    Socket: NCP              --> 0x40A9
ncp: ═══════ NetWare Core Protocol ═══════
    NCP Reply: Search for File
    Reply Type: 0x3333 (Reply)
    Sequence Number: 15
    Connection Number Low: 2
    Task Number: 1
    Connection Number High: 0
    Completion Code: 156 (Invalid Path)
    Connection Status: 0x00

Packet Number : 81    9:08:32 PM
Length : 64 bytes
802.3: ═══════ IEEE 802.3 Datalink Layer ═══════
    Station: BEAKER----> 02-80-C8-00-00-05
    Length: 38
ipx: ═══════ Internetwork Packet Exchange ═══════
    Checksum: 0xFFFF
    Length: 38
    Hop Count: 1
    Packet Type: 17(NCP)
    Network: 00 00 35 59      --> 00 00 03 00
    Node: 42-45-41-4B-45-52 --> 02-80-C8-00-00-05
    Socket: 0x0001            --> 0x4003
ncp: ═══════ NetWare Core Protocol ═══════
    NCP Reply: Search for File
    Reply Type: 0x3333 (Reply)

Appendix B: page 33

```
Packet Number : 50   8:56:11 PM
Length : 84 bytes
802.3:  ================ IEEE 802.3 Datalink Layer ================
        Station: 02-80-C8-00-00-05---> PIGGY
        Length: 66
ipx:    ================ Internetwork Packet Exchange ================
        Checksum: 0xFFFF
        Length: 66
        Hop Count: 0
        Packet Type: 17(NCP)
        Network: 00 00 03 00      ---> 00 00 34 69
        Node:    02-80-C8-00-00-05 ---> 00-50-49-47-47-59
        Socket:  0x4003           ---> NCP
ncp:    ================ NetWare Core Protocol ================
        NCP Request: Search for File
        Request Type: 0x2222 (Request)
        Sequence Number: 19
        Connection Number Low: 1
        Task Number: 2
        Connection Number High: 0
        Function Code: 64
        Last Search Index: 65535
        Directory Handle: 0x00
        Search Attributes: 0x06 (Normal, System, Hidden Files)
        File Name: Length: 24
            Value : SYS:\MAIL\9E00000I\LOGIN Sequence Number: 16
Connection Number Low: 2
Task Number: 1
Connection Number High: 0
Completion Code: 156 (Invalid Path)
Connection Status: 0x00

Packet Number : 90   9:08:32 PM
Length : 84 bytes
802.3:  ================ IEEE 802.3 Datalink Layer ================
        Station: 02-80-C8-00-00-05---> BEAKER
        Length: 66
ipx:    ================ Internetwork Packet Exchange ================
        Checksum: 0xFFFF
        Length: 66
        Hop Count: 0
        Packet Type: 17(NCP)
        Network: 00 00 03 00      ---> 00 00 35 59
        Node:    02-80-C8-00-00-05 ---> 42-45-41-4B-45-52
        Socket:  0x4003           ---> 0x0001
ncp:    ================ NetWare Core Protocol ================
        NCP Request: Search for File
        Request Type: 0x2222 (Request)
        Sequence Number: 19
        Connection Number Low: 2
        Task Number: 2
        Connection Number High: 0
        Function Code: 64
        Last Search Index: 65535
        Directory Handle: 0x00
        Search Attributes: 0x06 (Normal, System, Hidden Files)
        File Name: Length: 24
            Value : SYS:\MAIL\9E00000I\LOGIN Packet Number : 91   9:08:32 PM
Length : 102 bytes
802.3:  ================ IEEE 802.3 Datalink Layer ================
        Station: BEAKER----> PIGGY2
        Length: 84
ipx:    ================ Internetwork Packet Exchange ================
        Checksum: 0xFFFF
        Length: 83
        Hop Count: 1
        Packet Type: 17(NCP)
        Network: 00 00 35 59      ---> 00 00 34 69
        Node:    42-45-41-4B-45-52 ---> 50-49-47-47-59-32
        Socket:  0x40A9           ---> NCP
ncp:    ================ NetWare Core Protocol ================
        NCP Request: Search for File
        Request Type: 0x2222 (Request)
        Sequence Number: 18
        Connection Number Low: 2
        Task Number: 2
        Connection Number High: 0
```

Appendix B: page 34

Function Code: 64
Last Search Index: 65535
Directory Handle: 0x00
Search Attributes: 0x06 (Normal, System, Hidden Files)
File Name: Length: 41
    Value : SYS:\USEFS\PIGGY\SYS\MAIL\9E00001\LOGIN Packet Number : 122      9:08:32 PM
Length : 70 bytes
802.3: ———————————— IEEE 802.3 Datalink Layer ————————————
    Station: 02-80-C8-00-00-05 ---> BEAKER
    Length: 52
ipx: ———————————— Internetwork Packet Exchange ————————————
    Checksum: 0xFFFF
    Length: 52
    Hop Count: 0
    Packet Type: 17(NCP)
    Network: 00 00 03 00        ---> 00 00 35 59
    Node:    02-80-C8-00-00-05  ---> 42-45-41-4B-45-52
    Socket:  0x4003             ---> 0x0001
ncp: ———————————— NetWare Core Protocol ————————————
    NCP Request: Scan Bindery Object
    Request Type: 0x2222 (Request)
    Sequence Number: 27
    Connection Number Low: 2
    Task Number: 2
    Connection Number High: 0
    Function Code: 23
    Subfunction Length: 13 bytes
    Subfunction Code: 55
    Last Object Seen: 4294967295
    Search Object Type: 65535 (All)
    Search Object Name: Length: 5
        Value : PIGGY Packet Number : 123      9:08:32 PM
Length : 70 bytes
802.3: ———————————— IEEE 802.3 Datalink Layer ————————————
    Station: BEAKER---> PIGGY2
    Length: 52
ipx: ———————————— Internetwork Packet Exchange ————————————
    Checksum: 0xFFFF
    Length: 52
    Hop Count: 1
    Packet Type: 17(NCP)
    Network: 00 00 35 59        ---> 00 00 34 69
    Node:    42-45-41-4B-45-52  ---> 50-49-47-47-59-32
    Socket:  0x40A9             ---> NCP
ncp: ———————————— NetWare Core Protocol ————————————
    NCP Request: Scan Bindery Object
    Request Type: 0x2222 (Request)
    Sequence Number: 26
    Connection Number Low: 2
    Task Number: 2

Packet Number : 80       8:56:11 PM
Length : 70 bytes
802.3: ———————————— IEEE 802.3 Datalink Layer ————————————
    Station: 02-80-C8-00-00-05 ---> PIGGY
    Length: 52
ipx: ———————————— Internetwork Packet Exchange ————————————
    Checksum: 0xFFFF
    Length: 52
    Hop Count: 0
    Packet Type: 17(NCP)
    Network: 00 00 03 00        ---> 00 00 34 69
    Node:    02-80-C8-00-00-05  ---> 00-50-49-47-47-59
    Socket:  0x4003             ---> NCP
ncp: ———————————— NetWare Core Protocol ————————————
    NCP Request: Scan Bindery Object
    Request Type: 0x2222 (Request)
    Sequence Number: 30
    Connection Number Low: 1
    Task Number: 2
    Connection Number High: 0
    Function Code: 23
    Subfunction Length: 13 bytes
    Subfunction Code: 55
    Last Object Seen: 4294967295
    Search Object Type: 65535 (All)
    Search Object Name: Length: 5
        Value : PIGGY Appendix B: page 35

```
Packet Number : 81      8:56:11 PM
Length : 114 bytes
802.3: ══════════ IEEE 802.3 Datalink Layer ══════════
    Station: PIGGY ----> 02-80-C8-00-00-05
    Length: 96
ipx: ══════════ Internetwork Packet Exchange ══════════
    Checksum: 0xFFFF
    Length: 95
    Hop Count: 0
    Packet Type: 17(NCP)
    Network: 00 00 34 69          --> 00 00 03 00
    Node:    00-50-49-47-47-59 --> 02-80-C8-00-00-05
    Socket:  NCP                  --> 0x4003
ncp: ══════════ NetWare Core Protocol ══════════
    NCP Reply: Scan Bindery Object
    Reply Type: 0x3333 (Reply)
    Sequence Number: 30
    Connection Number Low: 1
    Task Number: 1
    Connection Number High: 0
    Completion Code: 0 (Success)
    Connection Status: 0x00
    Object ID: 0x9A000001
    Object Type: 4 (File Server)
    Object Name: PIGGY
    Object Flag: 0x00 (Static)
    Security: 64 (Anyone read, File Server write)
    Object has Properties: 255 (Yes)
        Connection Number High: 0
        Function Code: 23
        Subfunction Length: 13 bytes
        Subfunction Code: 55
        Last Object Seen: 4294967295
        Search Object Type: 65535 (All)
        Search Object Name: Length: 5
                           Value : PIGGY Packet Number : 124     9:08:32 PM
Length : 114 bytes
802.3: ══════════ IEEE 802.3 Datalink Layer ══════════
    Station: PIGGY2 ----> BEAKER
    Length: 96
ipx: ══════════ Internetwork Packet Exchange ══════════
    Checksum: 0xFFFF
    Length: 95
    Hop Count: 0
    Packet Type: 17(NCP)
    Network: 00 00 34 69            --> 00 00 35 59
    Node:    50-49-47-47-59-32 --> 42-45-41-4B-45-52
    Socket:  NCP                    --> 0x40A9
ncp: ══════════ NetWare Core Protocol ══════════
    NCP Reply: Scan Bindery Object
    Reply Type: 0x3333 (Reply)
    Sequence Number: 26
    Connection Number Low: 2
    Task Number: 1
    Connection Number High: 0
    Completion Code: 0 (Success)
    Connection Status: 0x00
    Object ID: 0x9A000001
    Object Type: 4 (File Server)
    Object Name: PIGGY
    Object Flag: 0x00 (Static)
    Security: 64 (Anyone read, File Server write)
    Object has Properties: 255 (Yes)

Packet Number : 125     9:08:32 PM
Length : 114 bytes
802.3: ══════════ IEEE 802.3 Datalink Layer ══════════
    Station: BEAKER ----> 02-80-C8-00-00-05
    Length: 96
ipx: ══════════ Internetwork Packet Exchange ══════════
    Checksum: 0xFFFF
    Length: 95
    Hop Count: 1
    Packet Type: 17(NCP)
    Network: 00 00 35 59            --> 00 00 03 00
    Node:    42-45-41-4B-45-52 --> 02-80-C8-00-00-05
    Socket:  0x0001                 --> 0x4003
ncp: ══════════ NetWare Core Protocol ══════════
    NCP Reply: Scan Bindery Object
    Reply Type: 0x3333 (Reply)
```

Appendix B: page 36

Sequence Number: 27
Connection Number Low: 2
Task Number: 1
Connection Number High: 0
Completion Code: 0 (Success)
Connection Status: 0x00
Object ID: 0x9A000001
Object Type: 4 (File Server)
Object Name: PIGGY
Object Flag: 0x00 (Static)
Security: 64 (Anyone read, File Server write)
Object has Properties: 255 (Yes)

Packet Number: 130    9:08:32 PM
Length : 64 bytes
802.3: ══════════ IEEE 802.3 Datalink Layer ══════════
   Station: 02-80-C8-00-00-05 ----> BEAKER
   Length: 42
ipx: ══════════ Internetwork Packet Exchange ══════════
   Checksum: 0xFFFF
   Length: 41
   Hop Count: 0
   Packet Type: 17(NCP)
   Network: 00 00 03 00        --> 00 00 35 59
   Node:    02-80-C8-00-00-05 --> 42-45-41-4B-45-52
   Socket:  0x4003             --> 0x0001
ncp: ══════════ NetWare Core Protocol ══════════
   NCP Request: Deallocate Directory Handle
   Request Type: 0x2222 (Request)
   Sequence Number: 29
   Connection Number Low: 2
   Task Number: 2
   Connection Number High: 0
   Function Code: 22
   Subfunction Length: 2 bytes
   Subfunction Code: 20
   Directory Handle: 0x01

Packet Number: 131    9:08:32 PM
Length : 64 bytes
802.3: ══════════ IEEE 802.3 Datalink Layer ══════════
   Station: BEAKER----> PIGGY2
   Length: 42
ipx: ══════════ Internetwork Packet Exchange ══════════
   Checksum: 0xFFFF
   Length: 41
   Hop Count: 1
   Packet Type: 17(NCP)
   Network: 00 00 35 59        --> 00 00 34 69
   Node:    42-45-41-4B-45-52 --> 50-49-47-47-59-32
   Socket:  0x40A9             --> NCP
ncp: ══════════ NetWare Core Protocol ══════════
   NCP Request: Deallocate Directory Handle
   Request Type: 0x2222 (Request)

Packet Number: 84    8:56:11 PM
Length : 64 bytes
802.3: ══════════ IEEE 802.3 Datalink Layer ══════════
   Station: 02-80-C8-00-00-05 ----> PIGGY
   Length: 42
ipx: ══════════ Internetwork Packet Exchange ══════════
   Checksum: 0xFFFF
   Length: 41
   Hop Count: 0
   Packet Type: 17(NCP)
   Network: 00 00 03 00        --> 00 00 34 69
   Node:    02-80-C8-00-00-05 --> 00-50-49-47-47-59
   Socket:  0x4003             --> NCP
ncp: ══════════ NetWare Core Protocol ══════════
   NCP Request: Deallocate Directory Handle
   Request Type: 0x2222 (Request)
   Sequence Number: 32
   Connection Number Low: 1
   Task Number: 2
   Connection Number High: 0
   Function Code: 22
   Subfunction Length: 2 bytes
   Subfunction Code: 20
   Directory Handle: 0x01

Appendix B: page 37

84  Packet Number : 85        8:56:11 PM
    Length : 64 bytes
    802.3:  ═══════════════ IEEE 802.3 Datalink Layer ═══════════════
            Station: PIGGY ---> 02-80-C8-00-00-05
            Length: 38
    ipx:    ═══════════════ Internetwork Packet Exchange ═══════════════
            Checksum: 0xFFFF
            Length: 38
            Hop Count: 0
            Packet Type: 17(NCP)
            Network: 00 00 34 69        ---> 00 00 03 00
            Node:    00-50-49-47-47-59  ---> 02-80-C8-00-00-05
            Socket:  NCP                ---> 0x4003
    ncp:    ═══════════════ NetWare Core Protocol ═══════════════
            NCP Reply: Deallocate Directory Handle
            Reply Type: 0x3333 (Reply)
            Sequence Number: 32
            Connection Number Low: 1
            Task Number: 1
            Connection Number High: 0
            Completion Code: 0 (Success)
            Connection Status: 0x00

Sequence Number: 28
            Connection Number Low: 2
            Task Number: 2
            Connection Number High: 0
            Function Code: 22
            Subfunction Length: 2 bytes
            Subfunction Code: 20
            Directory Handle: 0x01

Packet Number : 132       9:08:32 PM
    Length : 64 bytes
    802.3:  ═══════════════ IEEE 802.3 Datalink Layer ═══════════════
            Station: PIGGY2 ---> BEAKER
            Length: 38
    ipx:    ═══════════════ Internetwork Packet Exchange ═══════════════
            Checksum: 0xFFFF
            Length: 38
            Hop Count: 0
            Packet Type: 17(NCP)
            Network: 00 00 34 69        ---> 00 00 35 59
            Node:    50-49-47-47-59-32  ---> 42-45-41-4B-45-52
            Socket:  NCP                ---> 0x40A9
    ncp:    ═══════════════ NetWare Core Protocol ═══════════════
            NCP Reply: Deallocate Directory Handle
            Reply Type: 0x3333 (Reply)
            Sequence Number: 28
            Connection Number Low: 2
            Task Number: 1
            Connection Number High: 0
            Completion Code: 0 (Success)
            Connection Status: 0x00

Packet Number : 133       9:08:32 PM
    Length : 64 bytes
    802.3:  ═══════════════ IEEE 802.3 Datalink Layer ═══════════════
            Station: BEAKER ---> 02-80-C8-00-00-05
            Length: 38
    ipx:    ═══════════════ Internetwork Packet Exchange ═══════════════
            Checksum: 0xFFFF
            Length: 38
            Hop Count: 1
            Packet Type: 17(NCP)
            Network: 00 00 35 59        ---> 00 00 03 00
            Node:    42-45-41-4B-45-52  ---> 02-80-C8-00-00-05
            Socket:  0x0001             ---> 0x4003
    ncp:    ═══════════════ NetWare Core Protocol ═══════════════
            NCP Reply: Deallocate Directory Handle
            Reply Type: 0x3333 (Reply)
            Sequence Number: 29
            Connection Number Low: 2
            Task Number: 1
            Connection Number High: 0
            Completion Code: 0 (Success)
            Connection Status: 0x00

Appendix B: page 38

Packet Number : 86      8:56:11 PM
Length : 66 bytes
802.3: ═══════════════ IEEE 802.3 Datalink Layer ═══════════════
    Station: 02-80-C8-00-00-05 ----> PIGGY
    Length: 48
ipx: ═══════════════ Internetwork Packet Exchange ═══════════════
    Checksum: 0xFFFF
    Length: 47
    Hop Count: 0
    Packet Type: 17(NCP)
    Network: 00 00 03 00      --> 00 00 34 69
    Node:    02-80-C8-00-00-05 --> 00-50-49-47-47-59
    Socket:  0x4003            --> NCP
ncp: ═══════════════ NetWare Core Protocol ═══════════════
    NCP Request: Alloc Permanent Dir Handle
    Request Type: 0x2222 (Request)
    Sequence Number: 33
    Connection Number Low: 1
    Task Number: 2
    Connection Number High: 0
    Function Code: 22
    Subfunction Length: 8 bytes
    Subfunction Code: 18
    Source Directory Handle: 0x00
    Handle Name: 0xC6
    Directory Path: Length: 4
        Value : SYS:

Packet Number : 134     9:08:32 PM
Length : 66 bytes
802.3: ═══════════════ IEEE 802.3 Datalink Layer ═══════════════
    Station: 02-80-C8-00-00-05 ----> BEAKER
    Length: 48
ipx: ═══════════════ Internetwork Packet Exchange ═══════════════
    Checksum: 0xFFFF
    Length: 47
    Hop Count: 0
    Packet Type: 17(NCP)
    Network: 00 00 03 00      --> 00 00 35 59
    Node:    02-80-C8-00-00-05 --> 42-45-41-4B-45-52
    Socket:  0x4003            --> 0x0001
ncp: ═══════════════ NetWare Core Protocol ═══════════════
    NCP Request: Alloc Permanent Dir Handle
    Request Type: 0x2222 (Request)
    Sequence Number: 30
    Connection Number Low: 2
    Task Number: 2
    Connection Number High: 0
    Function Code: 22
    Subfunction Length: 8 bytes
    Subfunction Code: 18
    Source Directory Handle: 0x00
    Handle Name: 0xC6
    Directory Path: Length: 4
        Value : SYS:

Packet Number : 135     9:08:32 PM
Length : 82 bytes
802.3: ═══════════════ IEEE 802.3 Datalink Layer ═══════════════
    Station: BEAKER----> PIGGY2
    Length: 64
ipx: ═══════════════ Internetwork Packet Exchange ═══════════════
    Checksum: 0xFFFF
    Length: 64
    Hop Count: 1
    Packet Type: 17(NCP)
    Network: 00 00 35 59       --> 00 00 34 69
    Node:    42-45-41-4B-45-52 --> 50-49-47-47-59-32
    Socket:  0x40A9            --> NCP
ncp: ═══════════════ NetWare Core Protocol ═══════════════
    NCP Request: Alloc Permanent Dir Handle
    Request Type: 0x2222 (Request)
    Sequence Number: 29
    Connection Number Low: 2
    Task Number: 2
    Connection Number High: 0
    Function Code: 22
    Subfunction Length: 25 bytes
    Subfunction Code: 18
    Source Directory Handle: 0x00
    Handle Name: 0xC6
    Directory Path: Length: 21

Appendix B: page 39

86

Packet Number : 87    8:56:11 PM
Length : 64 bytes
802.3: ══════════ IEEE 802.3 Datalink Layer ══════════
  Station: PIGGY ---> 02-80-C8-00-00-05
  Length: 40
ipx: ══════════ Internetwork Packet Exchange ══════════
  Checksum: 0xFFFF
  Length: 40
  Hop Count: 0
  Packet Type: 17(NCP)
  Network: 00 00 34 69      ---> 00 00 03 00
  Node:   00-50-49-47-47-59 ---> 02-80-C8-00-00-05
  Socket: NCP               ---> 0x4003
ncp: ══════════ NetWare Core Protocol ══════════
  NCP Reply: Alloc Permanent Dir Handle
  Reply Type: 0x3333 (Reply)
  Sequence Number: 33
  Connection Number Low: 1
  Task Number: 1
  Connection Number High: 0
  Completion Code: 0 (Success)
  Connection Status: 0x00
  New Directory Handle: 0x02
  Access Rights Mask: 0xFF (Modify Flags/Rename Files, Search, Parental Rights,
           Delete, Create, Open, Write, Read)

Value : SYS:\USIEFS\PIGGY\SYS

Packet Number : 136    9:08:32 PM
Length : 64 bytes
802.3: ══════════ IEEE 802.3 Datalink Layer ══════════
  Station: PIGGY2 ---> BEAKER
  Length: 40
ipx: ══════════ Internetwork Packet Exchange ══════════
  Checksum: 0xFFFF
  Length: 40
  Hop Count: 0
  Packet Type: 17(NCP)
  Network: 00 00 34 69      ---> 00 00 35 59
  Node:   50-49-47-47-59-32 ---> 42-45-41-4B-45-52
  Socket: NCP               ---> 0x40A9
ncp: ══════════ NetWare Core Protocol ══════════
  NCP Reply: Alloc Permanent Dir Handle
  Reply Type: 0x3333 (Reply)
  Sequence Number: 29
  Connection Number Low: 2
  Task Number: 1
  Connection Number High: 0
  Completion Code: 0 (Success)
  Connection Status: 0x00
  New Directory Handle: 0x02
  Access Rights Mask: 0xFF (Modify Flags/Rename Files, Search, Parental Rights,
           Delete, Create, Open, Write, Read)

Packet Number : 137    9:08:32 PM
Length : 64 bytes
802.3: ══════════ IEEE 802.3 Datalink Layer ══════════
  Station: BEAKER ---> 02-80-C8-00-00-05
  Length: 40
ipx: ══════════ Internetwork Packet Exchange ══════════
  Checksum: 0xFFFF
  Length: 40
  Hop Count: 1
  Packet Type: 17(NCP)
  Network: 00 00 35 59      ---> 00 00 03 00
  Node:   42-45-41-4B-45-52 ---> 02-80-C8-00-00-05
  Socket: 0x0001            ---> 0x4003
ncp: ══════════ NetWare Core Protocol ══════════
  NCP Reply: Alloc Permanent Dir Handle
  Reply Type: 0x3333 (Reply)
  Sequence Number: 30
  Connection Number Low: 2
  Task Number: 1
  Connection Number High: 0
  Completion Code: 0 (Success)
  Connection Status: 0x00
  New Directory Handle: 0x02
  Access Rights Mask: 0xFF (Modify Flags/Rename Files, Search, Parental Rights,
           Delete, Create, Open, Write, Read)

Appendix B: page 40

```
Packet Number : 88          8:56:11 PM
Length : 66 bytes
802.3:  ============== IEEE 802.3 Datalink Layer ==============
        Station: 02-80-C8-00-00-05 ----> PIGGY
        Length: 48
ipx:    ============== Internetwork Packet Exchange ==============
        Checksum: 0xFFFF
        Length: 47
        Hop Count: 0
        Packet Type: 17(NCP)
        Network: 00 00 03 00        --> 00 00 34 69
        Node:    02-80-C8-00-00-05  --> 00-50-49-47-47-59
        Socket:  0x4003             --> NCP
ncp:    ============== NetWare Core Protocol ==============
        NCP Request: Alloc Permanent Dir Handle
        Request Type: 0x2222 (Request)
        Sequence Number: 34
        Connection Number Low: 1
        Task Number: 2
        Connection Number High: 0
        Function Code: 22
        Subfunction Length: 8 bytes
        Subfunction Code: 18
        Source Directory Handle: 0x00
        Handle Name: 0x46
        Directory Path: Length: 4
                        Value : SYS:

Packet Number : 138         9:08:32 PM
Length : 66 bytes
802.3:  ============== IEEE 802.3 Datalink Layer ==============
        Station: 02-80-C8-00-00-05 ----> BEAKER
        Length: 48
ipx:    ============== Internetwork Packet Exchange ==============
        Checksum: 0xFFFF
        Length: 47
        Hop Count: 0
        Packet Type: 17(NCP)
        Network: 00 00 03 00        --> 00 00 35 59
        Node:    02-80-C8-00-00-05  --> 42-45-41-4B-45-52
        Socket:  0x4003             --> 0x0001
ncp:    ============== NetWare Core Protocol ==============
        NCP Request: Alloc Permanent Dir Handle
        Request Type: 0x2222 (Request)
        Sequence Number: 31
        Connection Number Low: 2
        Task Number: 2
        Connection Number High: 0
        Function Code: 22
        Subfunction Length: 8 bytes
        Subfunction Code: 18
        Source Directory Handle: 0x00
        Handle Name: 0x46
        Directory Path: Length: 4
                        Value : SYS:

Packet Number : 139         9:08:32 PM
Length : 82 bytes
802.3:  ============== IEEE 802.3 Datalink Layer ==============
        Station: BEAKER ----> PIGGY2
        Length: 64
ipx:    ============== Internetwork Packet Exchange ==============
        Checksum: 0xFFFF
        Length: 64
        Hop Count: 1
        Packet Type: 17(NCP)
        Network: 00 00 35 59        --> 00 00 34 69
        Node:    42-45-41-4B-45-52  --> 50-49-47-47-59-32
        Socket:  0x40A9             --> NCP
ncp:    ============== NetWare Core Protocol ==============
        NCP Request: Alloc Permanent Dir Handle
        Request Type: 0x2222 (Request)
        Sequence Number: 30
        Connection Number Low: 2
        Task Number: 2
        Connection Number High: 0
        Function Code: 22
        Subfunction Length: 25 bytes
        Subfunction Code: 18
        Source Directory Handle: 0x00
        Handle Name: 0x46
        Directory Path: Length: 21
```

Appendix B: page 41

88

Packet Number: 89     8:56:11 PM
Length : 64 bytes
802.3: ═══════════════ IEEE 802.3 Datalink Layer ═══════════════
  Station: PIGGY ----> 02-80-C8-00-00-05
  Length: 40
ipx: ═══════════════ Internetwork Packet Exchange ═══════════════
  Checksum: 0xFFFF
  Length: 40
  Hop Count: 0
  Packet Type: 17(NCP)
  Network: 00 00 34 69        ---> 00 00 03 00
  Node:   00-50-49-47-47-59 ---> 02-80-C8-00-00-05
  Socket: NCP                  ---> 0x4003
ncp: ═══════════════ NetWare Core Protocol ═══════════════
  NCP Reply: Alloc Permanent Dir Handle
  Reply Type: 0x3333 (Reply)
  Sequence Number: 34
  Connection Number Low: 1
  Task Number: 1
  Connection Number High: 0
  Completion Code: 0 (Success)
  Connection Status: 0x00
  New Directory Handle: 0x03
  Access Rights Mask: 0xFF (Modify Flags/Rename Files, Search, Parental Rights,
                            Delete, Create, Open, Write, Read)

Value : SYS:\USERS\PIGGY\SYS

Packet Number: 140     9:08:32 PM
Length : 64 bytes
802.3: ═══════════════ IEEE 802.3 Datalink Layer ═══════════════
  Station: PIGGY2 ----> BEAKER
  Length: 40
ipx: ═══════════════ Internetwork Packet Exchange ═══════════════
  Checksum: 0xFFFF
  Length: 40
  Hop Count: 0
  Packet Type: 17(NCP)
  Network: 00 00 34 69        ---> 00 00 35 59
  Node:   50-49-47-47-59-32 ---> 42-45-41-4B-45-52
  Socket: NCP                  ---> 0x40A9
ncp: ═══════════════ NetWare Core Protocol ═══════════════
  NCP Reply: Alloc Permanent Dir Handle
  Reply Type: 0x3333 (Reply)
  Sequence Number: 30
  Connection Number Low: 2
  Task Number: 1
  Connection Number High: 0
  Completion Code: 0 (Success)
  Connection Status: 0x00
  New Directory Handle: 0x03
  Access Rights Mask: 0xFF (Modify Flags/Rename Files, Search, Parental Rights,
                            Delete, Create, Open, Write, Read)

Packet Number: 141     9:08:32 PM
Length : 64 bytes
802.3: ═══════════════ IEEE 802.3 Datalink Layer ═══════════════
  Station: BEAKER ----> 02-80-C8-00-00-05
  Length: 40
ipx: ═══════════════ Internetwork Packet Exchange ═══════════════
  Checksum: 0xFFFF
  Length: 40
  Hop Count: 1
  Packet Type: 17(NCP)
  Network: 00 00 35 59        ---> 00 00 03 00
  Node:   42-45-41-4B-45-52 ---> 02-80-C8-00-00-05
  Socket: 0x0001               ---> 0x4003
ncp: ═══════════════ NetWare Core Protocol ═══════════════
  NCP Reply: Alloc Permanent Dir Handle
  Reply Type: 0x3333 (Reply)
  Sequence Number: 31
  Connection Number Low: 2
  Task Number: 1
  Connection Number High: 0
  Completion Code: 0 (Success)
  Connection Status: 0x00
  New Directory Handle: 0x03
  Access Rights Mask: 0xFF (Modify Flags/Rename Files, Search, Parental Rights,
                            Delete, Create, Open, Write, Read)

Appendix B: page 42

```
Packet Number : 90        8:56:11 PM
Length : 64 bytes                    IEEE 802.3 Datalink Layer
802.3:
    Station: 02-80-C8-00-00-05 ---> PIGGY
    Length: 42                       Internetwork Packet Exchange
ipx:
    Checksum: 0xFFFF
    Length: 41
    Hop Count: 0
    Packet Type: 17(NCP)
    Network: 00 00 03 00          ---> 00 00 34 69
    Node: 02-80-C8-00-00-05       ---> 00-50-49-47-47-59
    Socket: 0x4003                ---> NCP
ncp:                                 NetWare Core Protocol
    NCP Request: Get Directory Path
    Request Type: 0x2222 (Request)
    Sequence Number: 35
    Connection Number Low: 1
    Task Number: 2
    Connection Number High: 0
    Function Code: 22
    Subfunction Length: 2 bytes
    Subfunction Code: 1
    Target Directory Handle: 0x02

Packet Number : 91        8:56:11 PM
Length : 64 bytes                    IEEE 802.3 Datalink Layer
802.3:
    Station: PIGGY ---> 02-80-C8-00-00-05

Packet Number : 142       9:08:32 PM
Length : 64 bytes                    IEEE 802.3 Datalink Layer
802.3:
    Station: 02-80-C8-00-00-05 ---> BEAKER
    Length: 42                       Internetwork Packet Exchange
ipx:
    Checksum: 0xFFFF
    Length: 41
    Hop Count: 0
    Packet Type: 17(NCP)
    Network: 00 00 03 00          ---> 00 00 35 59
    Node: 02-80-C8-00-00-05       ---> 42-45-41-4B-45-52
    Socket: 0x4003                ---> 0x0001
ncp:                                 NetWare Core Protocol
    NCP Request: Get Directory Path
    Request Type: 0x2222 (Request)
    Sequence Number: 32
    Connection Number Low: 2
    Task Number: 2
    Connection Number High: 0
    Function Code: 22
    Subfunction Length: 2 bytes
    Subfunction Code: 1
    Target Directory Handle: 0x02

Packet Number : 143       9:08:32 PM
Length : 64 bytes                    IEEE 802.3 Datalink Layer
802.3:
    Station: BEAKER ---> PIGGY2
    Length: 42                       Internetwork Packet Exchange
ipx:
    Checksum: 0xFFFF
    Length: 41
    Hop Count: 1
    Packet Type: 17(NCP)
    Network: 00 00 35 59          ---> 00 00 34 69
    Node: 42-45-41-4B-45-52       ---> 50-49-47-47-59-32
    Socket: 0x40A9                ---> NCP
ncp:                                 NetWare Core Protocol
    NCP Request: Get Directory Path
    Request Type: 0x2222 (Request)
    Sequence Number: 31
    Connection Number Low: 2
    Task Number: 2
    Connection Number High: 0
    Function Code: 22
    Subfunction Length: 2 bytes
    Subfunction Code: 1
    Target Directory Handle: 0x02

Packet Number : 144       9:08:32 PM
Length : 78 bytes                    IEEE 802.3 Datalink Layer
802.3:
    Station: PIGGY2 ---> BEAKER
```

Appendix B: page 43

```
                          Length: 44                  =========== Internetwork Packet Exchange ==========
                    ipx:  Checksum: 0xFFFF
                          Length: 43
                          Hop Count: 0
                          Packet Type: 17(NCP)
                          Network: 00 00 34 69       --> 00 00 03 00
                          Node:    00-50-49-47-47-59 --> 02-80-C8-00-00-05
                          Socket:  NCP               --> 0x4003
                    ncp:  =========== NetWare Core Protocol ==========
                          NCP Reply: Get Directory Path
                          Reply Type: 0x3333 (Reply)
                          Sequence Number: 35
                          Connection Number Low: 1
                          Task Number: 1
                          Connection Number High: 0
                          Completion Code: 0 (Success)
                          Connection Status: 0x00
                          Directory Path: Length: 4
                                          Value : SYS:

113  Packet Number : 114   8:56:11 PM
     Length : 66 bytes      ========== IEEE 802.3 Datalink Layer ==========
     802.3:  Station: 02-80-C8-00-00-05 -----> PIGGY
             Length: 48
     ipx:    ========== Internetwork Packet Exchange ==========
             Checksum: 0xFFFF
             Length: 47
```

```
                          Length: 60                  =========== Internetwork Packet Exchange ==========
                    ipx:  Checksum: 0xFFFF
                          Length: 59
                          Hop Count: 0
                          Packet Type: 17(NCP)
                          Network: 00 00 34 69       --> 00 00 35 59
                          Node:    50-49-47-47-59-32 --> 42-45-41-4B-45-52
                          Socket:  NCP               --> 0x40A9
                    ncp:  =========== NetWare Core Protocol ==========
                          NCP Reply: Get Directory Path
                          Reply Type: 0x3333 (Reply)
                          Sequence Number: 31
                          Connection Number Low: 2
                          Task Number: 1
                          Connection Number High: 0
                          Completion Code: 0 (Success)
                          Connection Status: 0x00
                          Directory Path: Length: 20
                                          Value : SYS:IS/EFS/PIGGY/SYS Packet Number : 145    9:08:32 PM
Length : 64 bytes      ========== IEEE 802.3 Datalink Layer ==========
802.3:  Station: BEAKER -----> 02-80-C8-00-00-05
        Length: 44
ipx:    ========== Internetwork Packet Exchange ==========
        Checksum: 0xFFFF
        Length: 43
        Hop Count: 1
        Packet Type: 17(NCP)
        Network: 00 00 35 59       --> 00 00 03 00
        Node:    42-45-41-4B-45-52 --> 02-80-C8-00-00-05
        Socket:  0x0001            --> 0x4003
ncp:    ========== NetWare Core Protocol ==========
        NCP Reply: Get Directory Path
        Reply Type: 0x3333 (Reply)
        Sequence Number: 32
        Connection Number Low: 2
        Task Number: 1
        Connection Number High: 0
        Completion Code: 0 (Success)
        Connection Status: 0x00
        Directory Path: Length: 4
                        Value : SYS:

Packet Number : 190    9:08:33 PM
Length : 66 bytes      ========== IEEE 802.3 Datalink Layer ==========
802.3:  Station: 02-80-C8-00-00-05 -----> BEAKER
        Length: 48
ipx:    ========== Internetwork Packet Exchange ==========
        Checksum: 0xFFFF
        Length: 47
```

Appendix B: page 44

114

```
Hop Count: 0
Packet Type: 17(NCP)
Network: 00 00 03 00        --> 00 00 34 69
Node:   02-80-C8-00-00-05  --> 00-50-49-47-47-59
Socket: 0x4003              --> NCP
```
ncp: ============ NetWare Core Protocol ============
```
NCP Request: Get Effective Dir Rights
Request Type: 0x2222 (Request)
Sequence Number: 47
Connection Number Low: 1
Task Number: 2
Connection Number High: 0
Function Code: 22
Subfunction Length: 8 bytes
Subfunction Code: 3
Directory Handle: 0x02
Directory Path: Length: 5
                Value : ADMIN
```

Packet Number : 115      8:56:11 PM
Length : 64 bytes
802.3: ============ IEEE 802.3 Datalink Layer ============
    Station: PIGGY-----> 02-80-C8-00-00-05
    Length: 38
ipx: ============ Internetwork Packet Exchange ============
    Checksum: 0xFFFF
    Length: 38

---

```
Hop Count: 0
Packet Type: 17(NCP)
Network: 00 00 03 00        --> 00 00 35 59
Node:   02-80-C8-00-00-05  --> 42-45-41-4B-45-52
Socket: 0x4003              --> 0x0001
```
ncp: ============ NetWare Core Protocol ============
```
NCP Request: Get Effective Dir Rights
Request Type: 0x2222 (Request)
Sequence Number: 44
Connection Number Low: 2
Task Number: 2
Connection Number High: 0
Function Code: 22
Subfunction Length: 8 bytes
Subfunction Code: 3
Directory Handle: 0x02
Directory Path: Length: 5
                Value : ADMIN
```

Packet Number : 191      9:08:33 PM
Length : 66 bytes
802.3: ============ IEEE 802.3 Datalink Layer ============
    Station: BEAKER-----> PIGGY2
    Length: 48
ipx: ============ Internetwork Packet Exchange ============
    Checksum: 0xFFFF
    Length: 47
```
Hop Count: 1
Packet Type: 17(NCP)
Network: 00 00 35 59       --> 00 00 34 69
Node:   42-45-41-4B-45-52 --> 50-49-47-47-59-32
Socket: 0x40A9              --> NCP
```
ncp: ============ NetWare Core Protocol ============
```
NCP Request: Get Effective Dir Rights
Request Type: 0x2222 (Request)
Sequence Number: 43
Connection Number Low: 2
Task Number: 2
Connection Number High: 0
Function Code: 22
Subfunction Length: 8 bytes
Subfunction Code: 3
Directory Handle: 0x02
Directory Path: Length: 5
                Value : ADMIN
```

Packet Number : 192      9:08:33 PM
Length : 64 bytes
802.3: ============ IEEE 802.3 Datalink Layer ============
    Station: PIGGY2-----> BEAKER
    Length: 38
ipx: ============ Internetwork Packet Exchange ============
    Checksum: 0xFFFF
    Length: 38

Appendix B: page 45

```
      Hop Count: 0
      Packet Type: 17(NCP)
      Network: 00 00 34 69           --> 00 00 03 00
      Node:   00-50-49-47-47-59 --> 02-80-C8-00-00-05
      Socket: NCP                    --> 0x4003
ncp:  ═══════════════════ NetWare Core Protocol ═══════════════════
      NCP Reply: Get Effective Dir Rights
      Reply Type: 0x3333 (Reply)
      Sequence Number: 47
      Connection Number Low: 1
      Task Number: 1
      Connection Number High: 0
      Completion Code: 156 (Invalid Path)
      Connection Status: 0x00

197   Packet Number: 198    8:56:12 PM
      Length: 64 bytes
      802.3: ═══════════════════ IEEE 802.3 Datalink Layer ═══════════════════
      Station: 02-80-C8-00-00-05---> PIGGY
      Length: 38
ipx:  ═══════════════════ Internetwork Packet Exchange ═══════════════════
      Checksum: 0xFFFF
      Length: 37
      Hop Count: 0
      Packet Type: 17(NCP)
      Network: 00 00 03 00           --> 00 00 34 69
      Node:   02-80-C8-00-00-05 --> 00-50-49-47-47-59
      Socket: 0x4003                 --> NCP
ncp:  ═══════════════════ NetWare Core Protocol ═══════════════════
      NCP Request: Get File Server Date and Time
      Request Type: 0x2222 (Request)

Hop Count: 0
      Packet Type: 17(NCP)
      Network: 00 00 34 69           --> 00 00 35 59
      Node:   50-49-47-47-59-32 --> 42-45-41-4B-45-52
      Socket: NCP                    --> 0x40A9
ncp:  ═══════════════════ NetWare Core Protocol ═══════════════════
      NCP Reply: Get Effective Dir Rights
      Reply Type: 0x3333 (Reply)
      Sequence Number: 43
      Connection Number Low: 2
      Task Number: 1
      Connection Number High: 0
      Completion Code: 156 (Invalid Path)
      Connection Status: 0x00

Packet Number: 193    9:08:33 PM
      Length: 64 bytes
      802.3: ═══════════════════ IEEE 802.3 Datalink Layer ═══════════════════
      Station: BEAKER----> 02-80-C8-00-00-05
      Length: 38
ipx:  ═══════════════════ Internetwork Packet Exchange ═══════════════════
      Checksum: 0xFFFF
      Length: 38
      Hop Count: 1
      Packet Type: 17(NCP)
      Network: 00 00 35 59           --> 00 00 03 00
      Node:   42-45-41-4B-45-52 --> 02-80-C8-00-00-05
      Socket: 0x0001                 --> 0x4003
ncp:  ═══════════════════ NetWare Core Protocol ═══════════════════
      NCP Reply: Get Effective Dir Rights
      Reply Type: 0x3333 (Reply)
      Sequence Number: 44
      Connection Number Low: 2
      Task Number: 1
      Connection Number High: 0
      Completion Code: 156 (Invalid Path)
      Connection Status: 0x00

Packet Number: 350    9:08:33 PM
      Length: 64 bytes
      802.3: ═══════════════════ IEEE 802.3 Datalink Layer ═══════════════════
      Station: 02-80-C8-00-00-05---> BEAKER
      Length: 38
ipx:  ═══════════════════ Internetwork Packet Exchange ═══════════════════
      Checksum: 0xFFFF
      Length: 37
      Hop Count: 0
      Packet Type: 17(NCP)
      Network: 00 00 03 00           --> 00 00 35 59
      Node:   02-80-C8-00-00-05 --> 42-45-41-4B-45-52
      Socket: 0x4003                 --> 0x0001
ncp:  ═══════════════════ NetWare Core Protocol ═══════════════════
      NCP Request: Get File Server Date and Time
      Request Type: 0x2222 (Request)
```

Appendix B: page 46

```
Sequence Number: 89
Connection Number Low: 1
Task Number: 2
Connection Number High: 0
Function Code: 20
```

198  Packet Number : 199    8:56:12 PM
     Length : 64 bytes
     802.3: ──────────── IEEE 802.3 Datalink Layer ────────────
            Station: PIGGY──> 02-80-C8-00-00-05
            Length: 46
     ipx: ──────────── Internetwork Packet Exchange ────────────
            Checksum: 0xFFFF
            Length: 45
            Hop Count: 0
            Packet Type: 17(NCP)
            Network: 00 00 34 69       --> 00 00 03 00
            Node:    00-50-49-47-47-59 --> 02-80-C8-00-00-05
            Socket: NCP                --> 0x4003
     ncp: ──────────── NetWare Core Protocol ────────────
            NCP Reply: Get File Server Date and Time
            Reply Type: 0x3333 (Reply)
            Sequence Number: 89
            Connection Number Low: 1
            Task Number: 1
            Connection Number High: 0
            Completion Code: 0 (Success)
            Connection Status: 0x00
            Date/Time: Thursday, August 25, 1994  1:07:00 PM

```
Sequence Number: 84
Connection Number Low: 2
Task Number: 2
Connection Number High: 0
Function Code: 20
```

Packet Number : 351    9:08:33 PM
Length : 64 bytes
802.3: ──────────── IEEE 802.3 Datalink Layer ────────────
       Station: BEAKER──> PIGGY2
       Length: 38
ipx: ──────────── Internetwork Packet Exchange ────────────
       Checksum: 0xFFFF
       Length: 37
       Hop Count: 1
       Packet Type: 17(NCP)
       Network: 00 00 35 59        --> 00 00 34 69
       Node:    42-45-41-4B-45-52  --> 50-49-47-47-59-32
       Socket: 0x40A9              --> NCP
ncp: ──────────── NetWare Core Protocol ────────────
       NCP Request: Get File Server Date and Time
       Request Type: 0x2222 (Request)
       Sequence Number: 83
       Connection Number Low: 2
       Task Number: 2
       Connection Number High: 0
       Function Code: 20

Packet Number : 352    9:08:33 PM
Length : 64 bytes
802.3: ──────────── IEEE 802.3 Datalink Layer ────────────
       Station: PIGGY2──> BEAKER
       Length: 46
ipx: ──────────── Internetwork Packet Exchange ────────────
       Checksum: 0xFFFF
       Length: 45
       Hop Count: 0
       Packet Type: 17(NCP)
       Network: 00 00 34 69        --> 00 00 35 59
       Node:    50-49-47-47-59-32  --> 42-45-41-4B-45-52
       Socket: NCP                 --> 0x40A9
ncp: ──────────── NetWare Core Protocol ────────────
       NCP Reply: Get File Server Date and Time
       Reply Type: 0x3333 (Reply)
       Sequence Number: 83
       Connection Number Low: 2
       Task Number: 1
       Connection Number High: 0
       Completion Code: 0 (Success)
       Connection Status: 0x00
       Date/Time: Thursday, August 25, 1994  1:19:22 PM Packet Number : 353    9:08:33 PM
Length : 64 bytes Appendix B: page 47

```
199  Packet Number : 200          8:56:12 PM
     Length : 212 bytes
     802.3: ═══════════════ IEEE 802.3 Datalink Layer ═══════════════
            Station: 02-80-C8-00-00-05 ----> PIGGY
            Length: 194
     ipx: ═══════════════ Internetwork Packet Exchange ═══════════════
            Checksum: 0xFFFF
            Length: 194
            Hop Count: 0
            Packet Type: 17(NCP)
            Network: 00 00 03 00          --> 00 00 34 69
            Node:    02-80-C8-00-00-05 --> 00-50-49-47-47-59
            Socket:  0x4003              --> NCP
     ncp: ═══════════════ NetWare Core Protocol ═══════════════
            NCP Request: Write Property Value
            Request Type: 0x2222 (Request)
            Sequence Number: 90
            Connection Number Low: 1
            Task Number: 2
            Connection Number High: 0
            Function Code: 23
            Subfunction Length: 155 bytes
            Subfunction Code: 62
            Object Type: 1 (User)
            Object Name: Length: 5
                         Value : admin
            Segment Number: 1
            More Flag: 0 (No)
            Property Name: Length: 15
                         Value : MISC_LOGIN_INFO
            Property Value:  0: 5E 08 19 0D 07 00 04 1D  ^.......
                             8: 1C FB 7A 0D 6D 39 0A 00  ..z.m9..

Packet Number : 354          9:08:33 PM
     Length : 212 bytes
     802.3: ═══════════════ IEEE 802.3 Datalink Layer ═══════════════
            Station: 02-80-C8-00-00-05 ----> BEAKER
            Length: 194
     ipx: ═══════════════ Internetwork Packet Exchange ═══════════════
            Checksum: 0xFFFF
            Length: 194
            Hop Count: 0
            Packet Type: 17(NCP)
            Network: 00 00 03 00          --> 00 00 35 59
            Node:    02-80-C8-00-00-05 --> 42-45-41-4B-45-52
            Socket:  0x4003              --> 0x0001
     ncp: ═══════════════ NetWare Core Protocol ═══════════════
            NCP Request: Write Property Value
            Request Type: 0x2222 (Request)
            Sequence Number: 85
            Connection Number Low: 2
            Task Number: 2
            Connection Number High: 0
            Function Code: 23
            Subfunction Length: 155 bytes
            Subfunction Code: 62
            Object Type: 1 (User)
            Object Name: Length: 5
                         Value : admin
            Segment Number: 1
            More Flag: 0 (No)
            Property Name: Length: 15
                         Value : MISC_LOGIN_INFO
            Property Value:  0: 1C FB 7A 0D 6D 39 0A 00  ..z.m9..
                             8: 1C FB 7A 0D 6D 39 0A 00  ..z.m9..

802.3: ═══════════════ IEEE 802.3 Datalink Layer ═══════════════
            Station: BEAKER ----> 02-80-C8-00-00-05
            Length: 46
     ipx: ═══════════════ Internetwork Packet Exchange ═══════════════
            Checksum: 0xFFFF
            Length: 45
            Hop Count: 1
            Packet Type: 17(NCP)
            Network: 00 00 35 59          --> 00 00 03 00
            Node:    42-45-41-4B-45-52 --> 02-80-C8-00-00-05
            Socket:  0x0001              --> 0x4003
     ncp: ═══════════════ NetWare Core Protocol ═══════════════
            NCP Reply: Get File Server Date and Time
            Reply Type: 0x3333 (Reply)
            Sequence Number: 84
            Connection Number Low: 2
            Task Number: 1
            Connection Number High: 0
            Completion Code: 0 (Success)
            Connection Status: 0x00
            Date/Time: Thursday, August 25, 1994  1:19:22 PM
```

Appendix B: page 48

```
10: EA 83 00 0E E9 73 E9 73            [....s.s]
18: 01 00 9A 2C 5C 06 81 1C            [...,\...]
20: 58 FB 74 0C C9 4A 00 00            [X.t..J..]
28: 34 FB E9 73 0A 00 10 00            [4..s....]
30: 00 00 E9 73 AC A5 AC A5            [...s....]
38: 5C 06 E9 73 60 FB EA 83            [\..s`...]
40: 01 88 00 0E 41 1E 02 00            [....A...]
48: 0F 00 10 00 00 00 E9 73            [.......s]
50: 50 43 E9 73 00 00 00 00            [PC.s....]
58: 08 00 01 00 7C FB 79 0E            [....|.y.]
60: 3D 34 98 2C 7C FB 25 0F            [=4.,|.%.]
68: 05 00 00 00 00 00 90 F8            [........]
70: E9 73 9E 00 00 01 1E 11            [.s......]
78: 04 00 0B 00 8D 0B 21 31            [......!1]
```

Packet Number : 355     9:08:33 PM
Length : 212 bytes
802.3: ========== IEEE 802.3 Datalink Layer ==========
  Station: BEAKER----> PIGGY2
  Length: 194
ipx: ========== Internetwork Packet Exchange ==========
  Checksum: 0xFFFF
  Length: 194
  Hop Count: 1
  Packet Type: 17(NCP)
  Network: 00 00 35 59       --> 00 00 34 69
  Node:    42-45-41-4B-45-52 --> 50-49-47-47-59-32
  Socket:  0x40A9            --> NCP
ncp: ========== NetWare Core Protocol ==========
  NCP Request: Write Property Value
  Request Type: 0x2222 (Request)
  Sequence Number: 84
  Connection Number Low: 2
  Task Number: 2
  Connection Number High: 0
  Function Code: 23
  Subfunction Code: 62
  Subfunction Length: 155 bytes
  Object Type: 1 (User)
  Object Name: Length: 5
              Value : admin
  Segment Number: 1
  More Flag: 0 (No)
  Property Name: Length: 15
              Value : MISC_LOGIN_INFO
  Property Value:  0: 5E 08 19 0D 13 16 04 1D   [........]
                   8: 1C FB 7A 0D 6D 39 0A 00   [..z.m9..]
                  10: EA 83 00 0E E9 73 E9 73   [....s.s]
                  18: 01 00 9A 2C 5C 06 81 1C   [...,\...]
                  20: 58 FB 74 0C C9 4A 00 00   [X.t..J..]
                  28: 34 FB E9 73 0A 00 10 00   [4..s....]
                  30: 00 00 E9 73 AC A5 AC A5   [...s....]
                  38: 5C 06 E9 73 60 FB EA 83   [\..s`...]
                  40: 01 88 00 0E 41 1E 02 00   [....A...]

Appendix B: page 49

```
48: 0F 00 10 00 00 00 E9 73    |......s|
50: 50 43 E9 73 00 00 00 00    |PCs....|
58: 08 00 01 00 7C FB 79 0E    |....|.y.|
60: 3D 34 98 2C 7C FB 25 0F    |=4.,|.%.|
68: 05 00 00 00 00 00 90 F8    |........|
70: E9 73 9E 00 00 01 1E 11    |.s......|
78: 04 00 0B 00 8D 0B 21 31    |......!1|
```

---

Packet Number : 201   8:56:12 PM
Length : 64 bytes
802.3: ========= IEEE 802.3 Datalink Layer =========
  Station: PIGGY----> 02-80-C8-00-00-05
  Length: 38
ipx: ========= Internetwork Packet Exchange =========
  Checksum: 0xFFFF
  Length: 38
  Hop Count: 0
  Packet Type: 17(NCP)
  Network: 00 00 34 69    --> 00 00 03 00
  Node: 00-50-49-47-59-59 --> 02-80-C8-00-00-05
  Socket: NCP              --> 0x4003
ncp: ========= NetWare Core Protocol =========
  NCP Reply: Write Property Value
  Reply Type: 0x3333 (Reply)
  Sequence Number: 90
  Connection Number Low: 1
  Task Number: 1
  Connection Number High: 0
  Completion Code: 251 (No Such Property)
  Connection Status: 0x00

Packet Number : 356   9:08:33 PM
Length : 64 bytes
802.3: ========= IEEE 802.3 Datalink Layer =========
  Station: PIGGY2----> BEAKER
  Length: 38
ipx: ========= Internetwork Packet Exchange =========
  Checksum: 0xFFFF
  Length: 38
  Hop Count: 0
  Packet Type: 17(NCP)
  Network: 00 00 34 69    --> 00 00 35 59
  Node: 50-49-47-47-59-32 --> 42-45-41-4B-45-52
  Socket: NCP              --> 0x40A9
ncp: ========= NetWare Core Protocol =========
  NCP Reply: Write Property Value
  Reply Type: 0x3333 (Reply)
  Sequence Number: 84
  Connection Number Low: 2
  Task Number: 1
  Connection Number High: 0
  Completion Code: 251 (No Such Property)
  Connection Status: 0x00

Packet Number : 357   9:08:33 PM
Length : 64 bytes
802.3: ========= IEEE 802.3 Datalink Layer =========
  Station: BEAKER----> 02-80-C8-00-00-05
  Length: 38
ipx: ========= Internetwork Packet Exchange =========
  Checksum: 0xFFFF
  Length: 38
  Hop Count: 1
  Packet Type: 17(NCP)
  Network: 00 00 35 59    --> 00 00 03 00
  Node: 42-45-41-4B-45-52 --> 02-80-C8-00-00-05
  Socket: 0x0001           --> 0x4003
ncp: ========= NetWare Core Protocol =========
  NCP Reply: Write Property Value
  Reply Type: 0x3333 (Reply)
  Sequence Number: 85
  Connection Number Low: 2
  Task Number: 1
  Connection Number High: 0
  Completion Code: 251 (No Such Property)
  Connection Status: 0x00

Appendix B: page 50

205

Packet Number : 206          8:56:12 PM
Length : 64 bytes                    ═══ IEEE 802.3 Datalink Layer ═══
802.3: ═══
    Station: 02-80-C8-00-00-05 ---> PIGGY
    Length: 38
ipx: ═══ Internetwork Packet Exchange ═══
    Checksum: 0xFFFF
    Length: 37
    Hop Count: 0
    Packet Type: 17(NCP)
    Network: 00 00 03 00       ---> 00 00 34 69
    Node: 02-80-C8-00-00-05 ---> 00-50-49-47-47-59
    Socket: 0x4003             ---> NCP
ncp: ═══ NetWare Core Protocol ═══
    NCP Request: End Of Job
    Request Type: 0x2222 (Request)
    Sequence Number: 93
    Connection Number Low: 1
    Task Number: 2
    Connection Number High: 0
    Function Code: 24

206

Packet Number : 207          8:56:12 PM
Length : 64 bytes                    ═══ IEEE 802.3 Datalink Layer ═══
802.3: ═══
    Station: PIGGY---> 02-80-C8-00-00-05
    Length: 38
ipx: ═══ Internetwork Packet Exchange ═══
    Checksum: 0xFFFF
    Length: 38
    Hop Count: 0
    Packet Type: 17(NCP)

Packet Number : 366          9:08:33 PM
Length : 64 bytes                    ═══ IEEE 802.3 Datalink Layer ═══
802.3: ═══
    Station: 02-80-C8-00-00-05 ---> BEAKER
    Length: 38
ipx: ═══ Internetwork Packet Exchange ═══
    Checksum: 0xFFFF
    Length: 37
    Hop Count: 0
    Packet Type: 17(NCP)
    Network: 00 00 03 00       ---> 00 00 35 59
    Node: 02-80-C8-00-00-05 ---> 42-45-41-4B-45-52
    Socket: 0x4003             ---> 0x0001
ncp: ═══ NetWare Core Protocol ═══
    NCP Request: End Of Job
    Request Type: 0x2222 (Request)
    Sequence Number: 88
    Connection Number Low: 2
    Task Number: 2
    Connection Number High: 0
    Function Code: 24

Packet Number : 367          9:08:33 PM
Length : 64 bytes                    ═══ IEEE 802.3 Datalink Layer ═══
802.3: ═══
    Station: BEAKER---> PIGGY2
    Length: 38
ipx: ═══ Internetwork Packet Exchange ═══
    Checksum: 0xFFFF
    Length: 37
    Hop Count: 1
    Packet Type: 17(NCP)
    Network: 00 00 35 59       ---> 00 00 34 69
    Node: 42-45-41-4B-45-52 ---> 50-49-47-47-59-32
    Socket: 0x40A9             ---> NCP
ncp: ═══ NetWare Core Protocol ═══
    NCP Request: End Of Job
    Request Type: 0x2222 (Request)
    Sequence Number: 87
    Connection Number Low: 2
    Task Number: 2
    Connection Number High: 0
    Function Code: 24

Packet Number : 368          9:08:33 PM
Length : 64 bytes                    ═══ IEEE 802.3 Datalink Layer ═══
802.3: ═══
    Station: PIGGY2---> BEAKER
    Length: 38
ipx: ═══ Internetwork Packet Exchange ═══
    Checksum: 0xFFFF
    Length: 38
    Hop Count: 0
    Packet Type: 17(NCP)

Appendix B: page 51

Network: 00 00 34 69        ---> 00 00 03 00
Node:    00-50-49-47-47-59  ---> 02-80-C8-00-00-05
Socket:  NCP                ---> 0x4003
ncp: ═══════════════ NetWare Core Protocol ═══════════════
    NCP Reply: End Of Job
    Reply Type: 0x3333 (Reply)
    Sequence Number: 93
    Connection Number Low: 1
    Task Number: 1
    Connection Number High: 0
    Completion Code: 0 (Success)
    Connection Status: 0x00

Network: 00 00 34 69           ---> 00 00 35 59
Node:    50-49-47-47-59-32     ---> 42-45-41-4B-45-52
Socket:  NCP                   ---> 0x40A9
ncp: ═══════════════ NetWare Core Protocol ═══════════════
    NCP Reply: End Of Job
    Reply Type: 0x3333 (Reply)
    Sequence Number: 87
    Connection Number Low: 2
    Task Number: 1
    Connection Number High: 0
    Completion Code: 0 (Success)
    Connection Status: 0x00

Packet Number: 369      9:08:33 PM
Length : 64 bytes
802.3: ═══════════════ IEEE 802.3 Datalink Layer ═══════════════
    Station: BEAKER---> 02-80-C8-00-00-05
    Length: 38
ipx: ═══════════════ Internetwork Packet Exchange ═══════════════
    Checksum: 0xFFFF
    Length: 38
    Hop Count: 1
    Packet Type: 17(NCP)
    Network: 00 00 35 59           ---> 00 00 03 00
    Node:    42-45-41-4B-45-52     ---> 02-80-C8-00-00-05
    Socket:  0x0001                ---> 0x4003
ncp: ═══════════════ NetWare Core Protocol ═══════════════
    NCP Reply: End Of Job
    Reply Type: 0x3333 (Reply)
    Sequence Number: 88
    Connection Number Low: 2
    Task Number: 1
    Connection Number High: 0
    Completion Code: 0 (Success)
    Connection Status: 0x00

Appendix B: page 52

What is claimed is:

1. In a network of computers, the computers comprising one or more server nodes and client nodes requesting services from the server nodes, messages sent between nodes each having a destination address and a message content, a method for providing the services of a protected one of said server nodes to the client nodes, comprising the steps:

when said protected server node becomes unavailable to said client nodes, a connection server connected to another node on the network publishing as its name the name of the unavailable server node, in addition to publishing a name by which the connection server is regularly known;

a client node requesting services from a service server by continuing to request services by the name of the unavailable server node in the same manner as requests were made prior to the protected server node becoming unavailable.

2. In a computer network of nodes, the nodes each having a network address and comprising a server node providing specific services and client nodes requesting services from the server node, messages sent between nodes each having a destination address and a message content, a method for servicing service request messages comprising:

establishing a communication path between a client node and a connection server node, by the client node requesting a connection to an unavailable server node, and the connection server responding to the client's connection request by representing itself as able to provide the services of the unavailable server;

transmitting a first request message from the client node to the connection server requesting a service of the unavailable server;

receiving the first request message at a forwarding channel of the connection server, and forwarding a second request message from the forwarding channel to a service channel of a service server;

servicing the second request message at the service channel, which is configured to provide all services of the unavailable server, and generating a first response message addressed to the forwarding channel; and at the forwarding channel, generating a second response message addressed to the client node.

3. The method of claim 2, wherein:

the connection server represents itself as able to provide the services of the unavailable server by publishing as its name the name of the unavailable server node, in addition to publishing a name by which the connection server is regularly known; and a client node obtaining services from the service server node by requesting services by the name of the unavailable server node.

4. The method of claim 2, where the forwarding channel is implemented by using operating system hooks to intercept, filter, and route communications between multiple clients and the integrity server.

5. The method of any one of claims 1, 2, or 3, wherein:

a plurality of client nodes send messages to and receive messages from said connection server; and said connection server comprises a plurality of channels, a master group of said channels receiving messages from and forwarding messages to said client nodes, and a plurality of helper groups of said channels, each helper group corresponding to a distinct one of said client nodes.

6. The method of claim 5, wherein:

a plurality of client nodes send messages to and receive messages from said connection server; and sequence numbers of said request and response messages are used to route response packets through said connection server to the proper one of said client nodes.

7. The method of any one of claims 1, 2, or 3, wherein:

said connection server and said service server are both implemented by the same single computer of said network.

8. The method of any one of claims 1, 2, 3, or 4, further comprising:

for at least some request message directed by said client node to said unavailable server and received at said first channel, performing the service requested by the request message and sending a reply to said client node without forwarding a corresponding request message to said second channel.

9. The method of claim 8 wherein:

each request message includes a function code determining an action to be performed by the message's destination node; and determination that the service is to be performed without said forwarding is based on the function code of said request message.

10. The method of claim 1, 2, 3, or 4, further comprising:

for at least some message directed by said client node to said unavailable server and received at said first channel, altering the contents of the request message before forwarding a corresponding request message to said second channel.

11. The method of claim 10, wherein:

each request message includes a function code determining an action to be performed by the message's destination node; and portions of the contents of said request message to be altered are determined according to the function code of said request message.

12. The method of claim 10, further comprising:

instances of altering of said messages include at least one instance each of modifying each of a server name, a file pathname, a volume name, and directory service information.

13. The method of claim 10, further comprising:

altering the packet sequence number in said altered packet.

14. The method of any one of claims 1, 2, 3, or 4, further comprising:

after performing said requested service, receiving a response message at a channel of said connection server;

forwarding a response message corresponding to said received response messages to said client node; and for at least one of said messages forwarded by said connection server, altering the contents of the forwarded response message.

15. The method of claim 14, wherein:

each response message includes a function code determining an action to be performed by the message's destination node; and portions of the contents of said response message to be altered are determined according to the function code of said response message.

16. The method of claim 14, further comprising:

instances of altering of said response messages include at least one instance each of modifying each of a server name and a file pathname.

17. The method of claim 14, further comprising:

altering the packet sequence number in said forwarded response packet.

* * * * *